Jan. 20, 1959  A. W. KATH  2,869,178
MACHINE FOR MAKING HARD-SHELL GELATINE CAPSULES
Filed Dec. 7, 1953  38 Sheets-Sheet 1
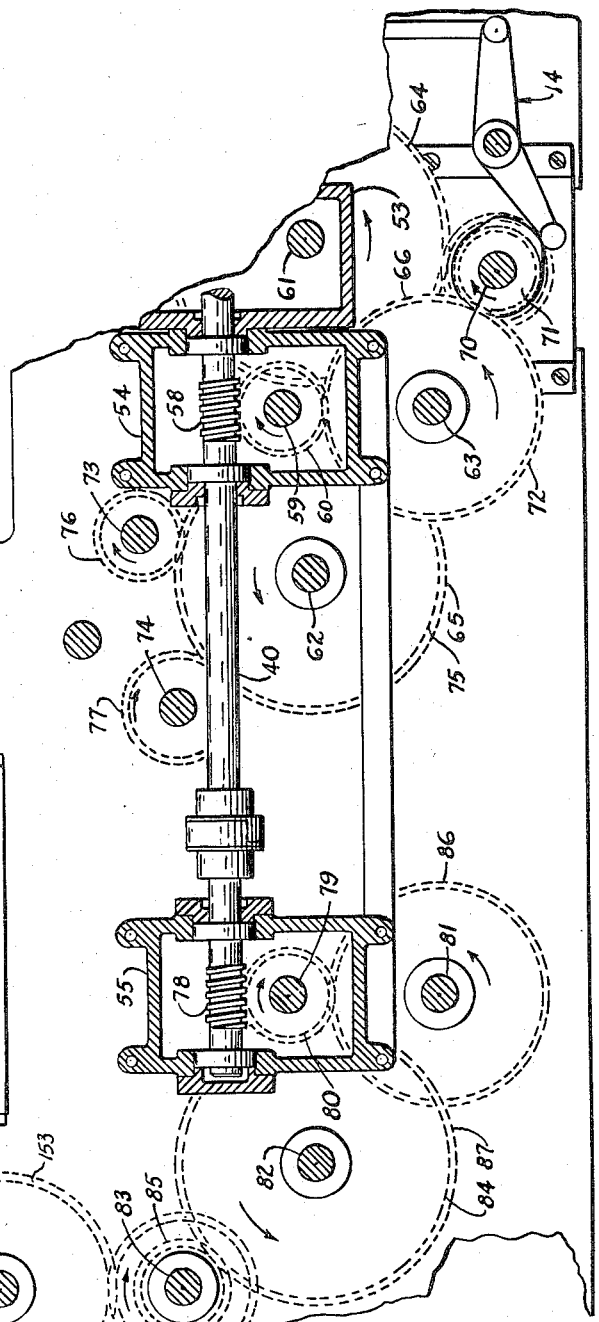
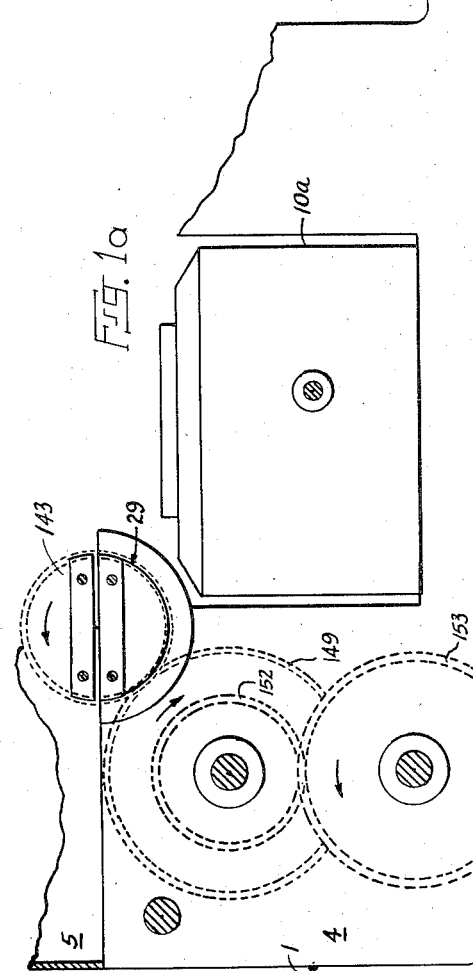
INVENTOR.
ALFRED W. KATH
BY

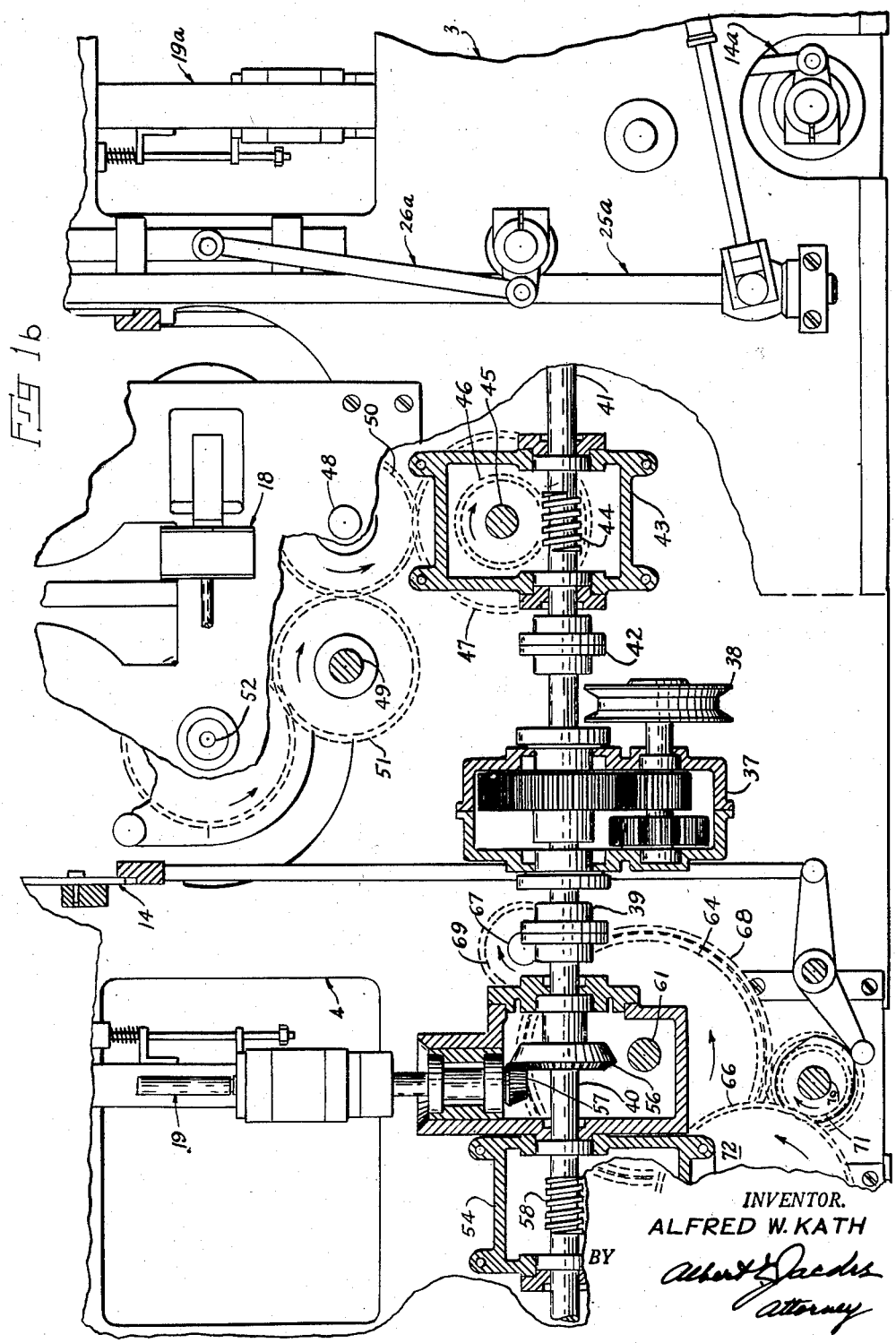

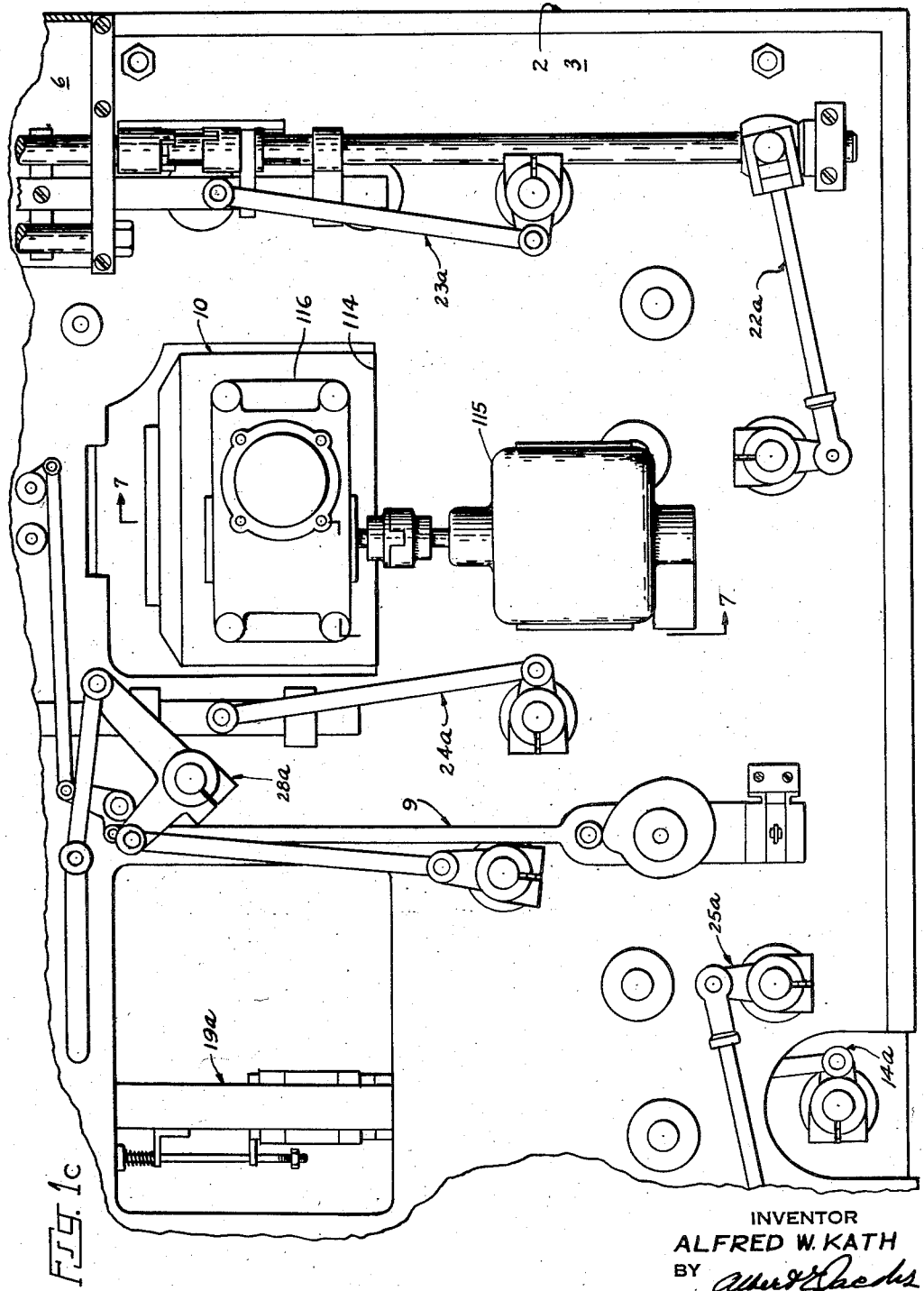

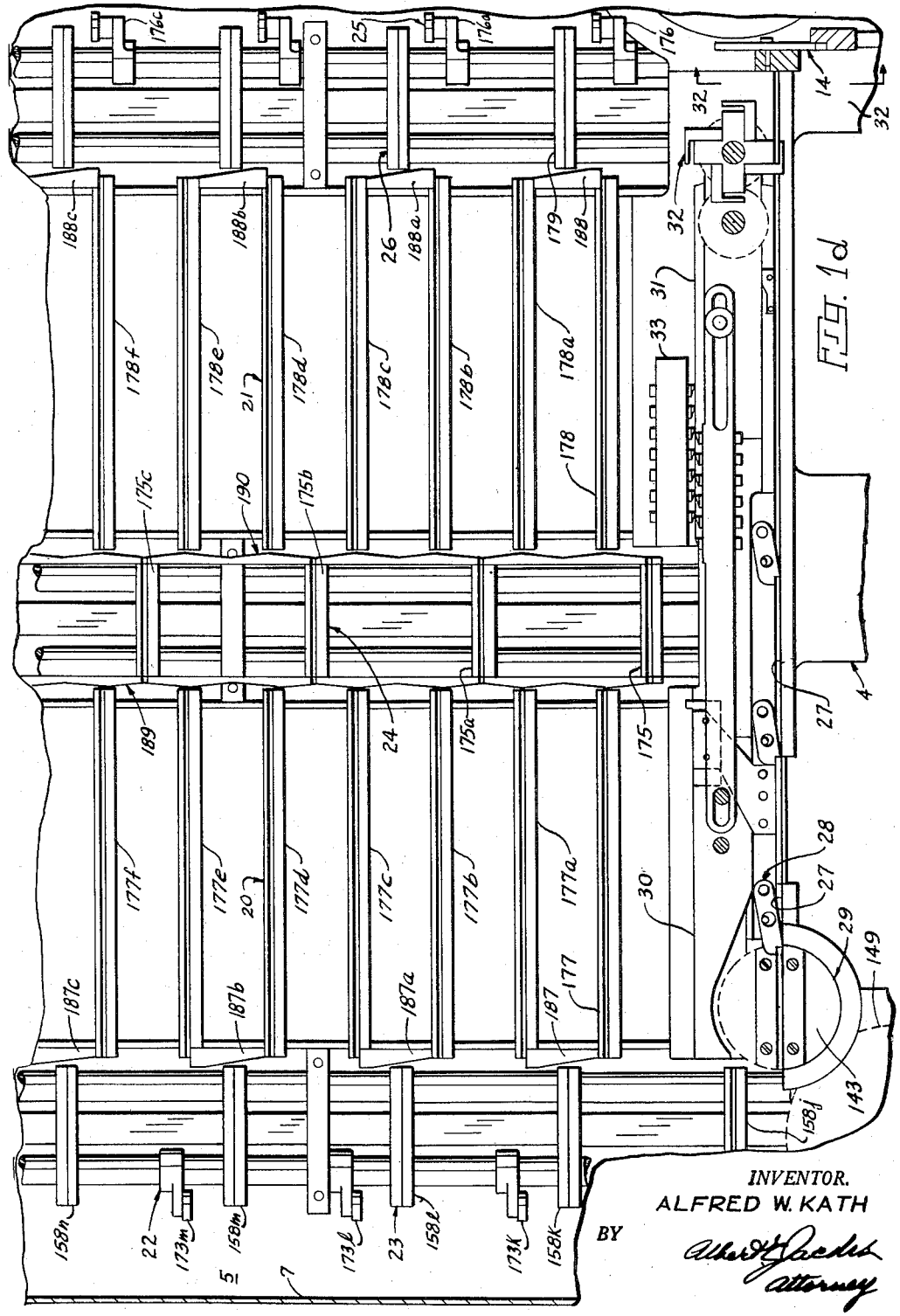

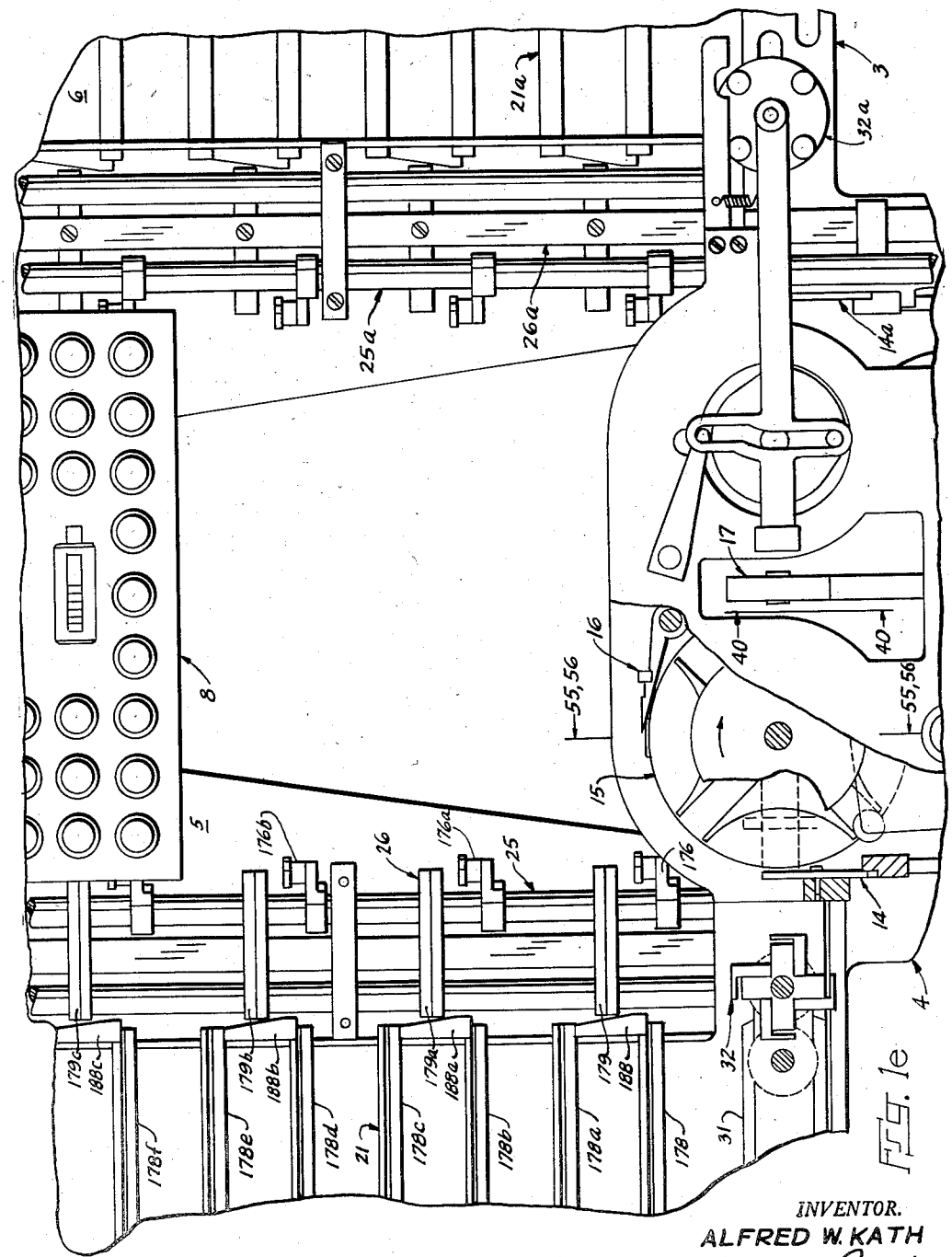

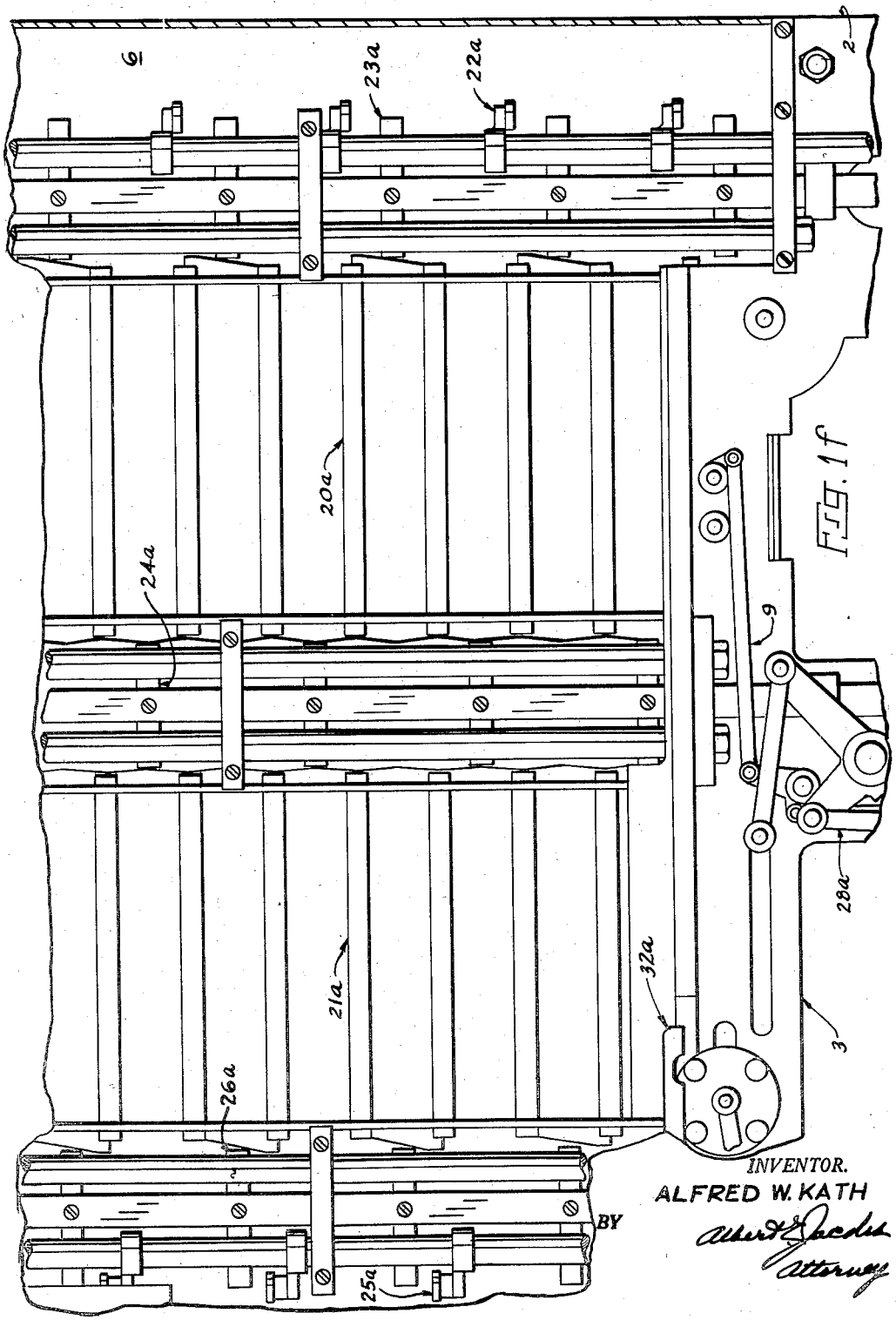

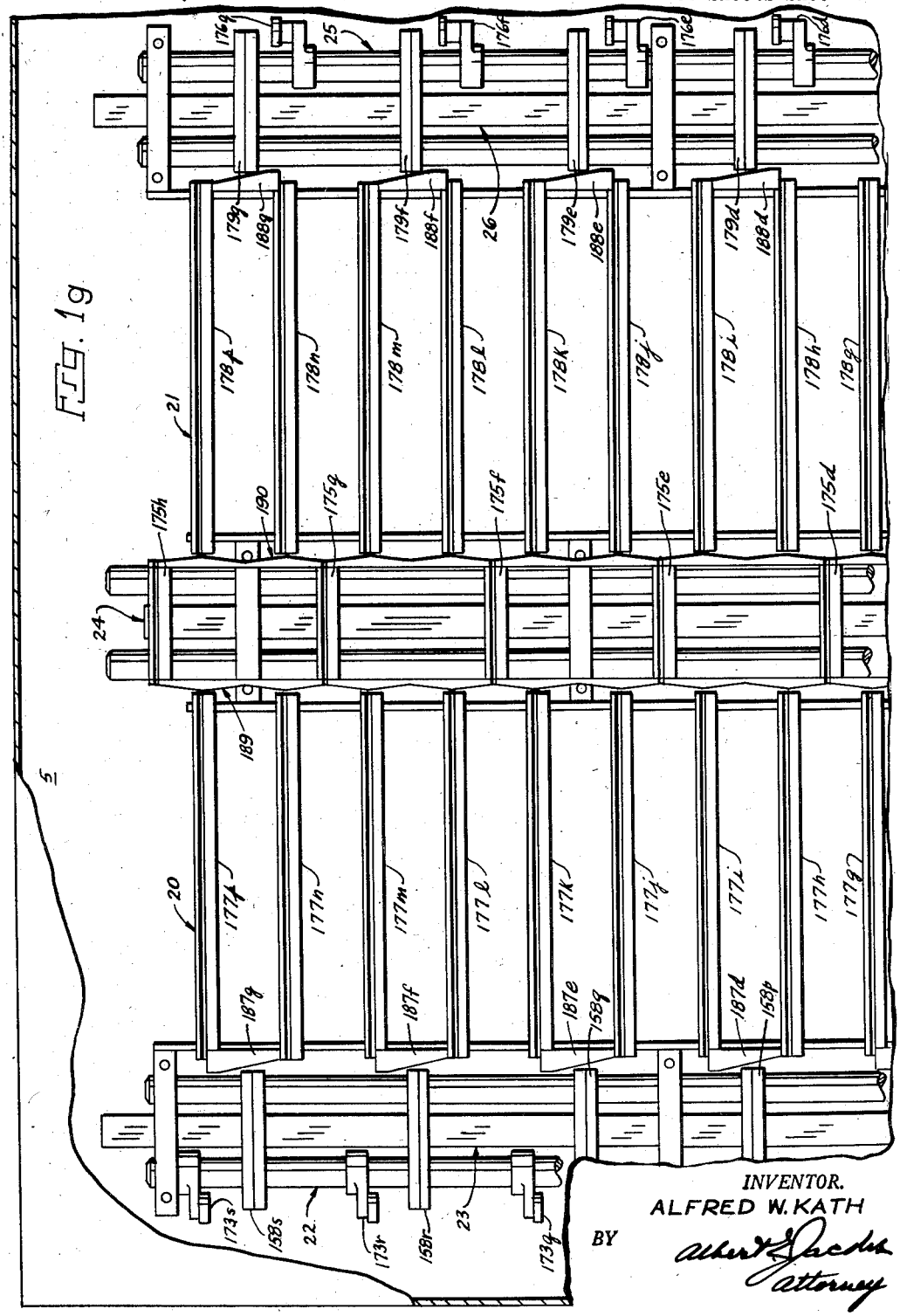

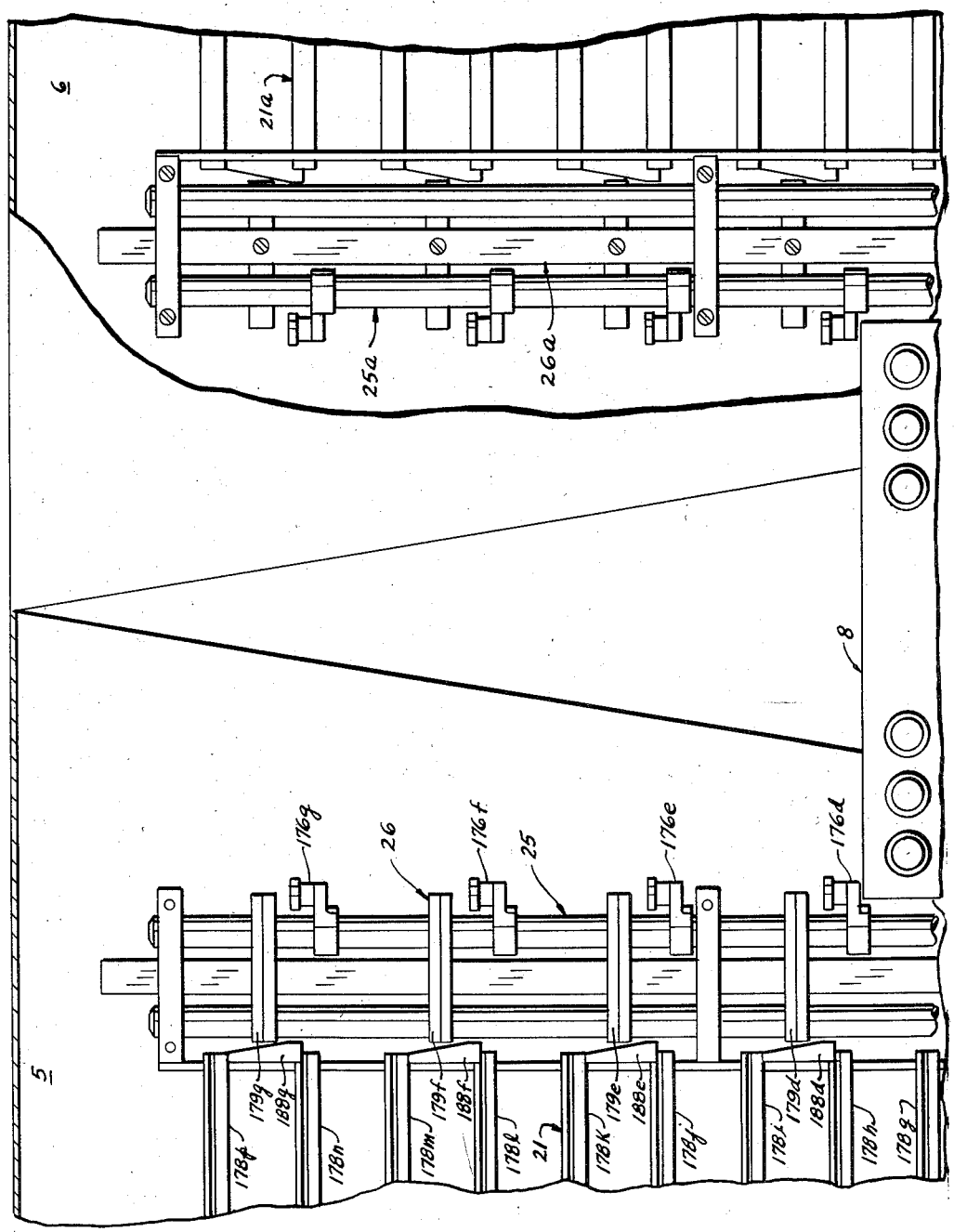

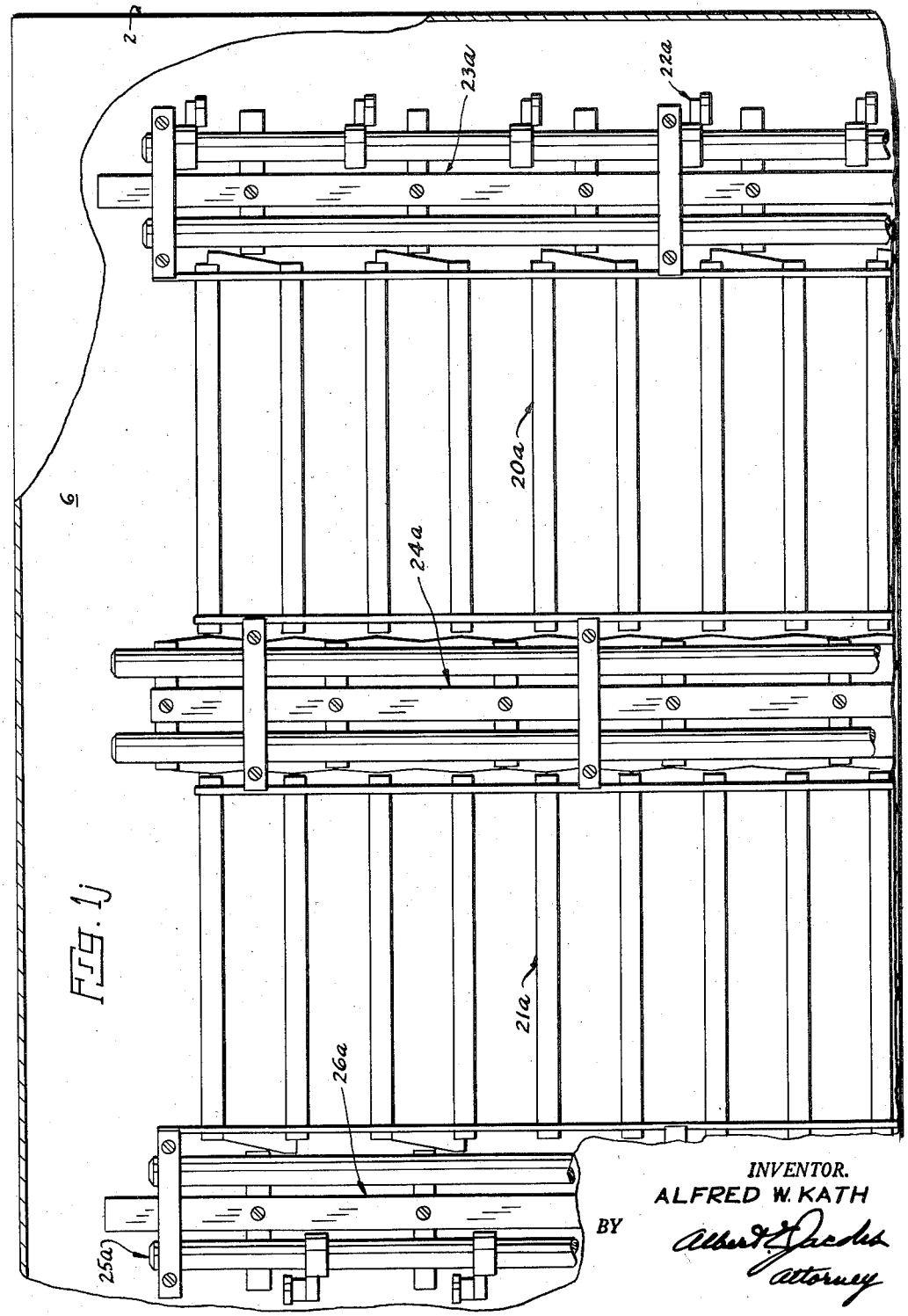

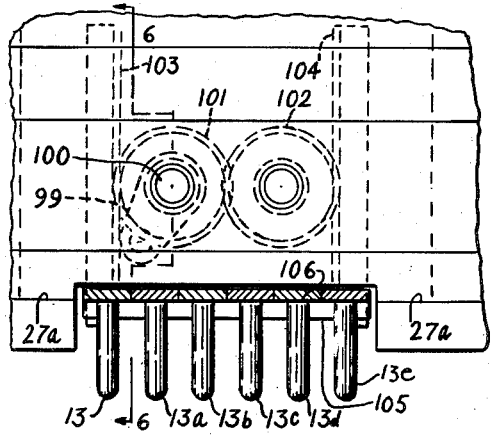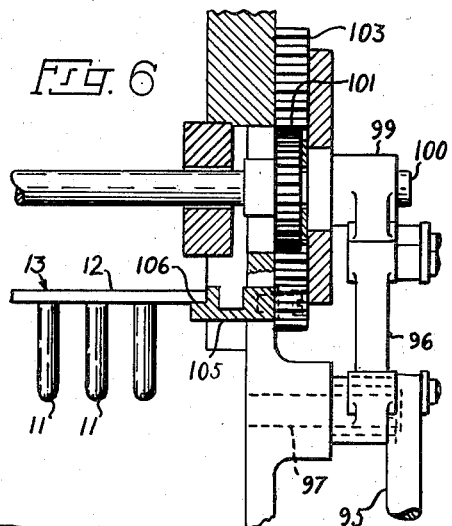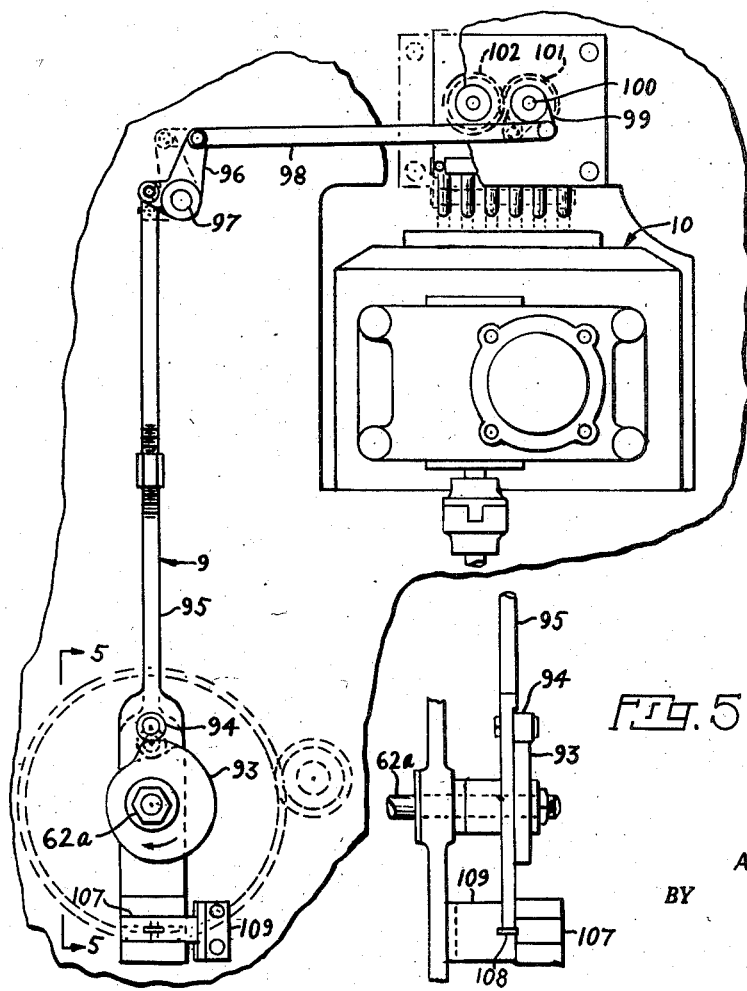

Jan. 20, 1959     A. W. KATH     2,869,178
MACHINE FOR MAKING HARD-SHELL GELATINE CAPSULES
Filed Dec. 7, 1953     38 Sheets-Sheet 12
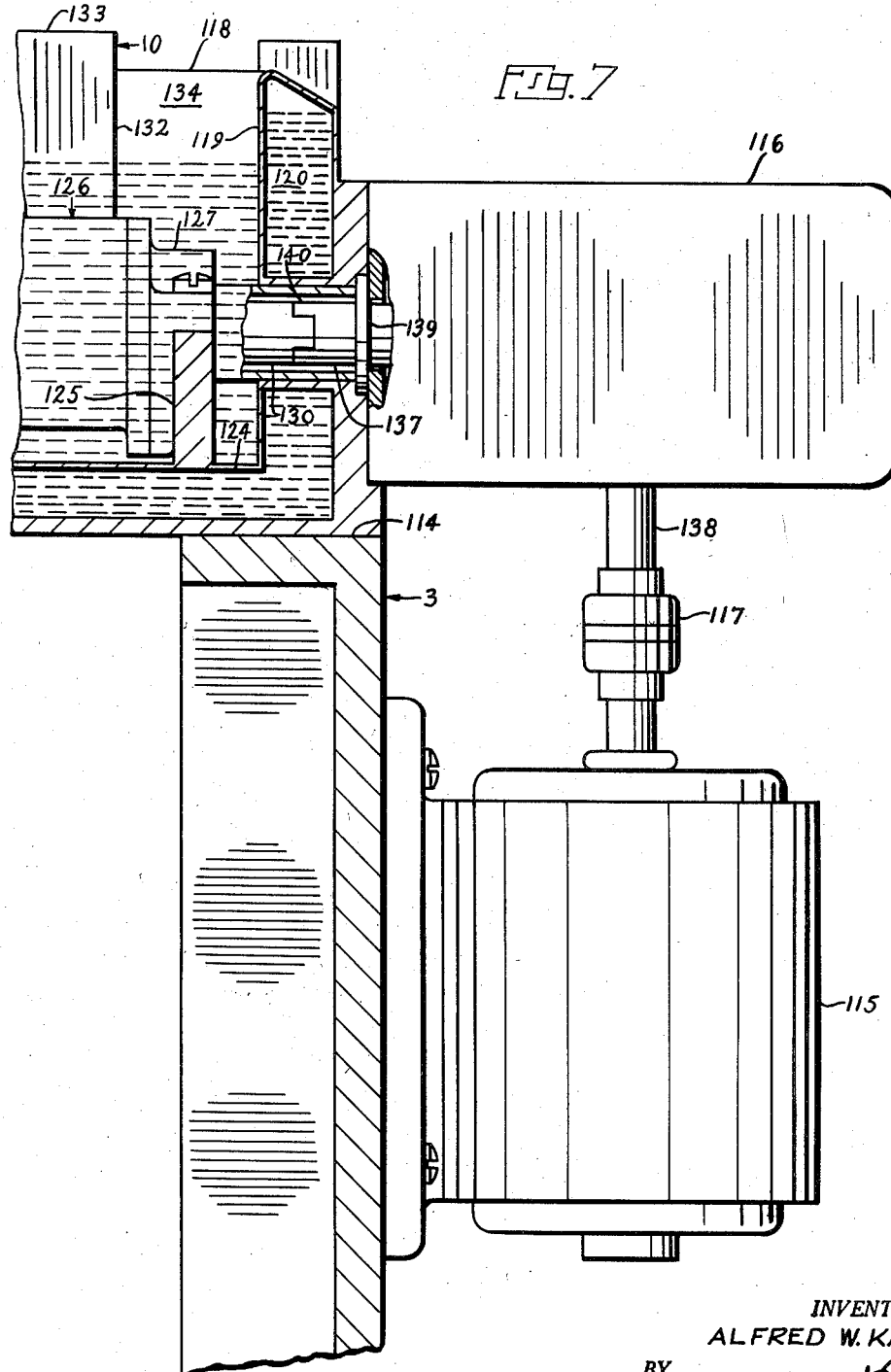
INVENTOR.
ALFRED W. KATH
BY 

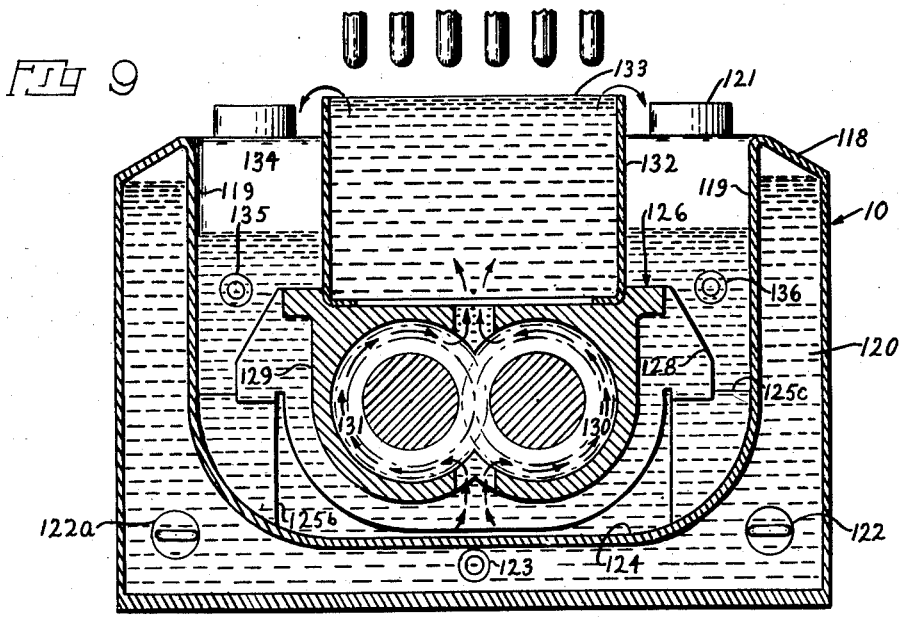
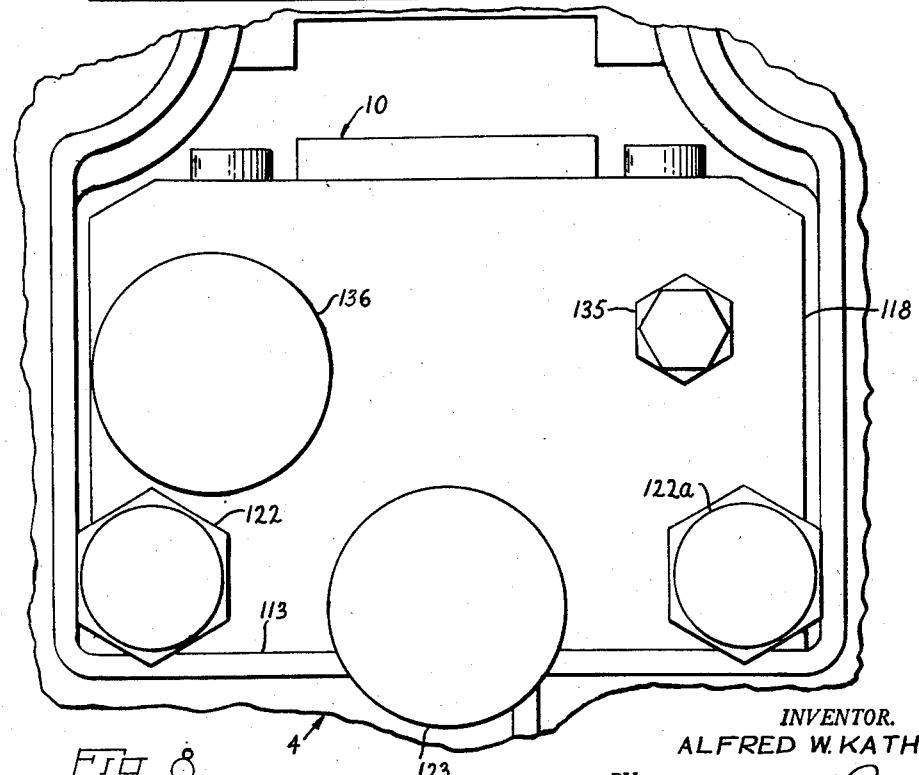

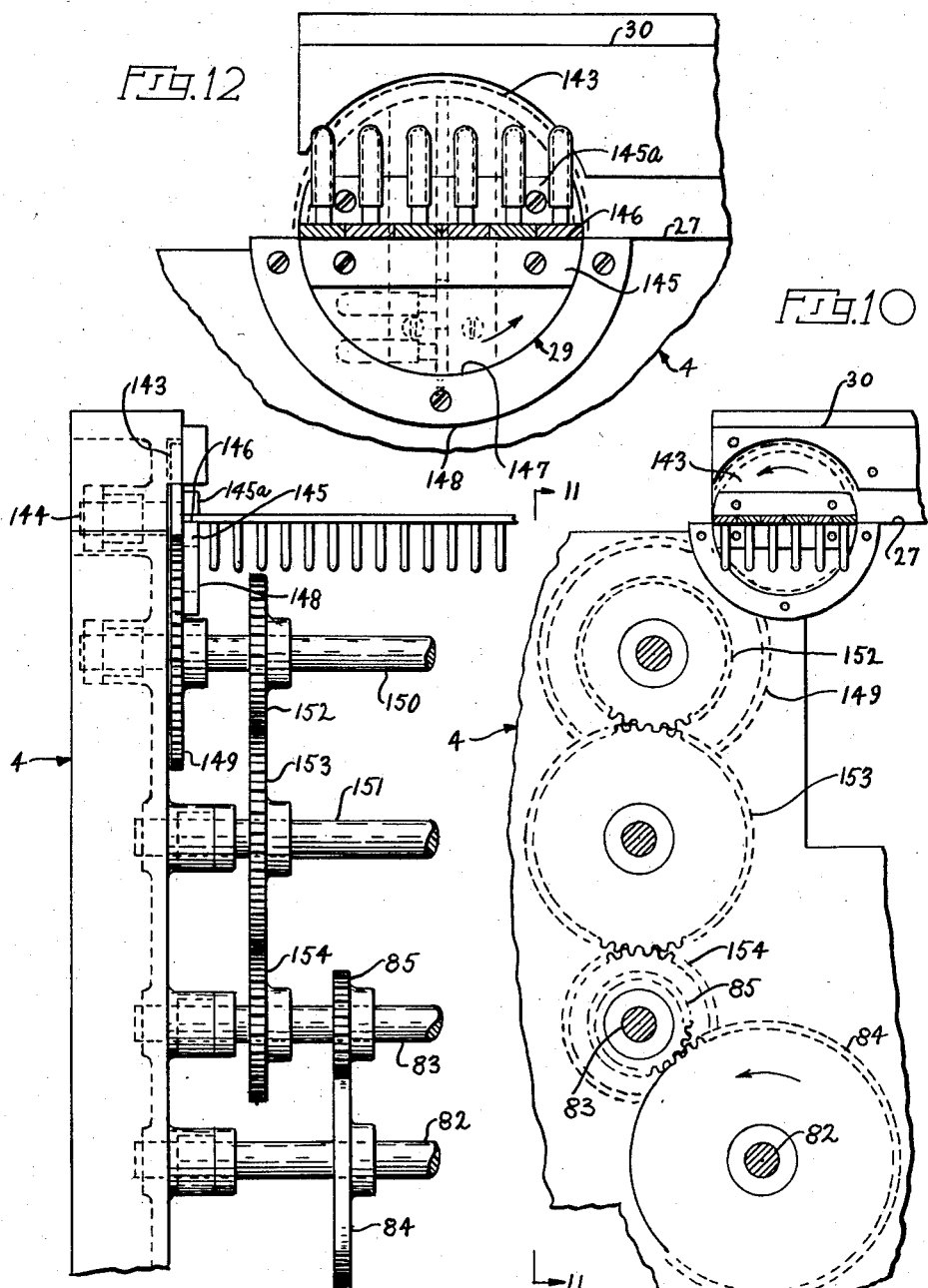

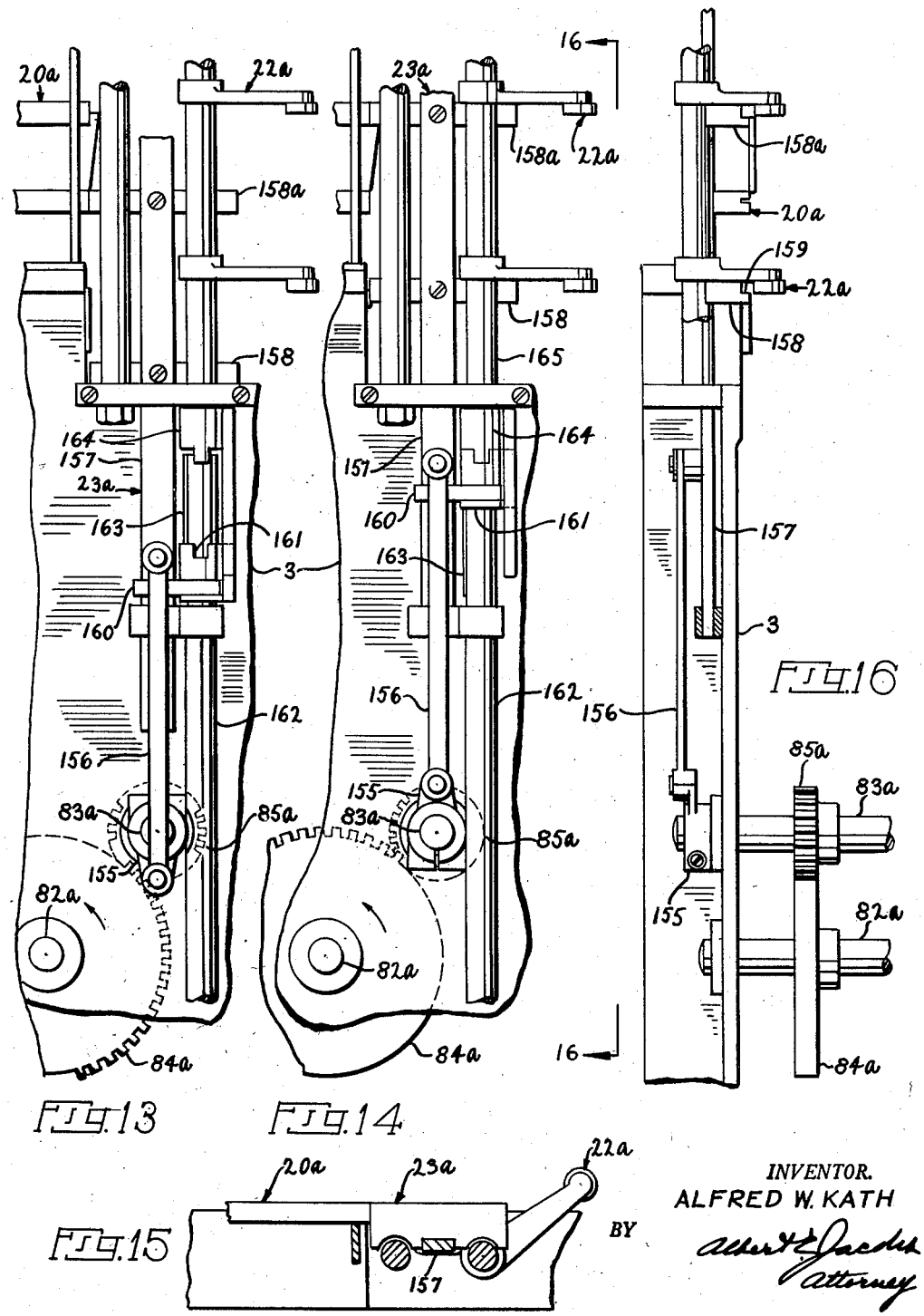

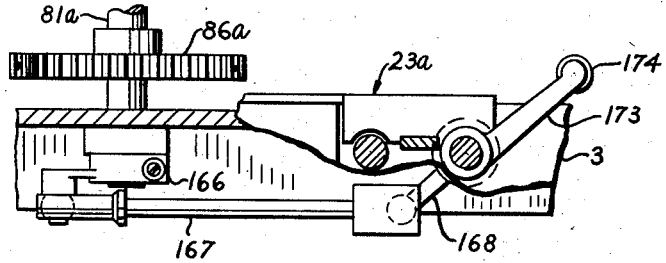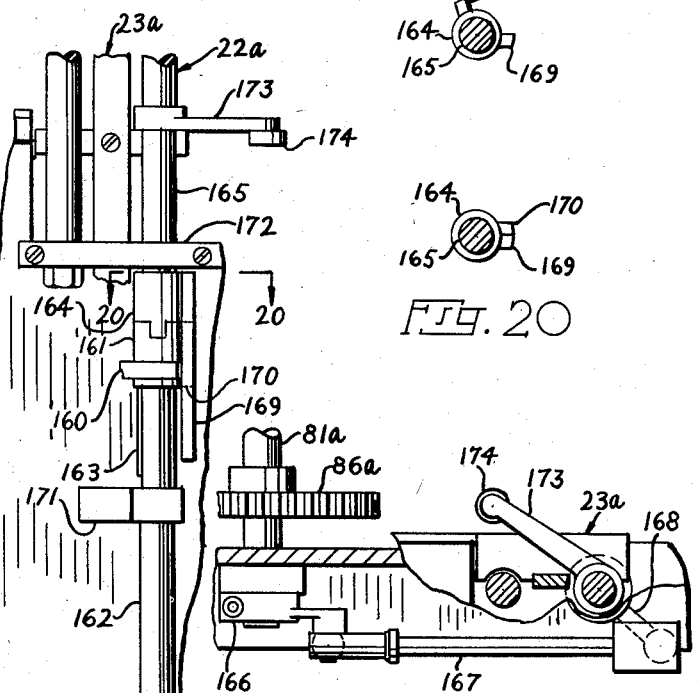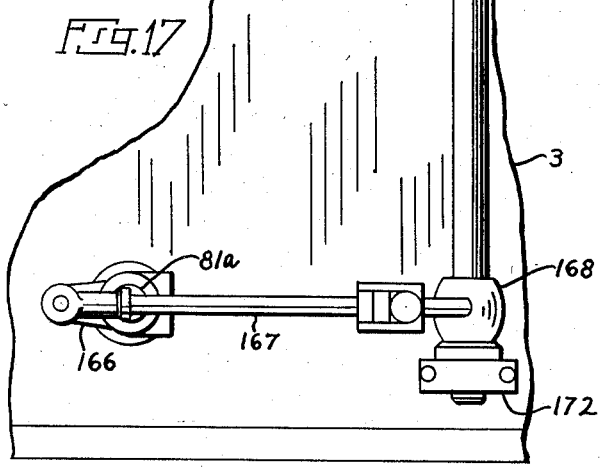

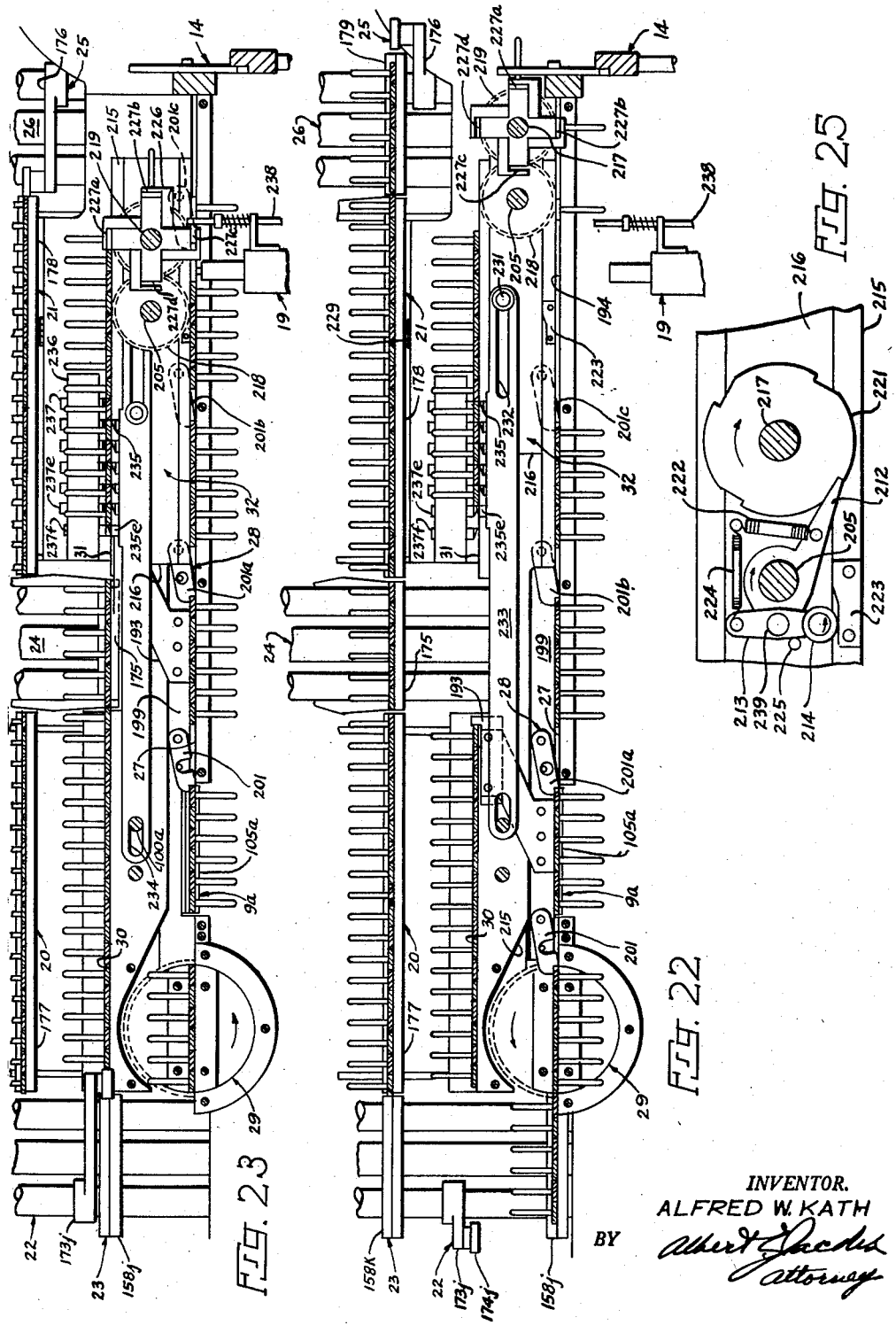
Jan. 20, 1959 A. W. KATH 2,869,178
MACHINE FOR MAKING HARD-SHELL GELATINE CAPSULES
Filed Dec. 7, 1953 38 Sheets-Sheet 17
INVENTOR.
ALFRED W. KATH

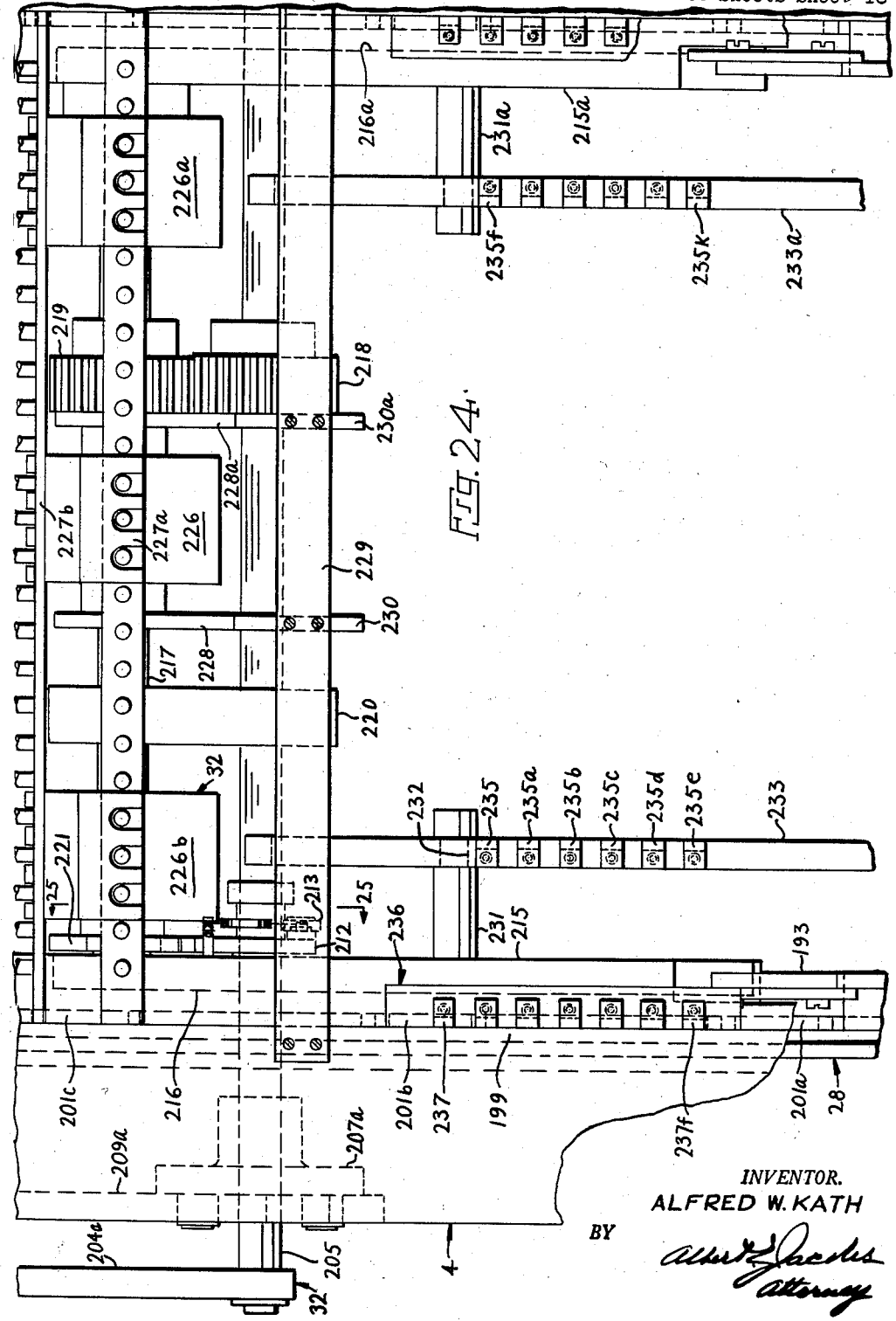

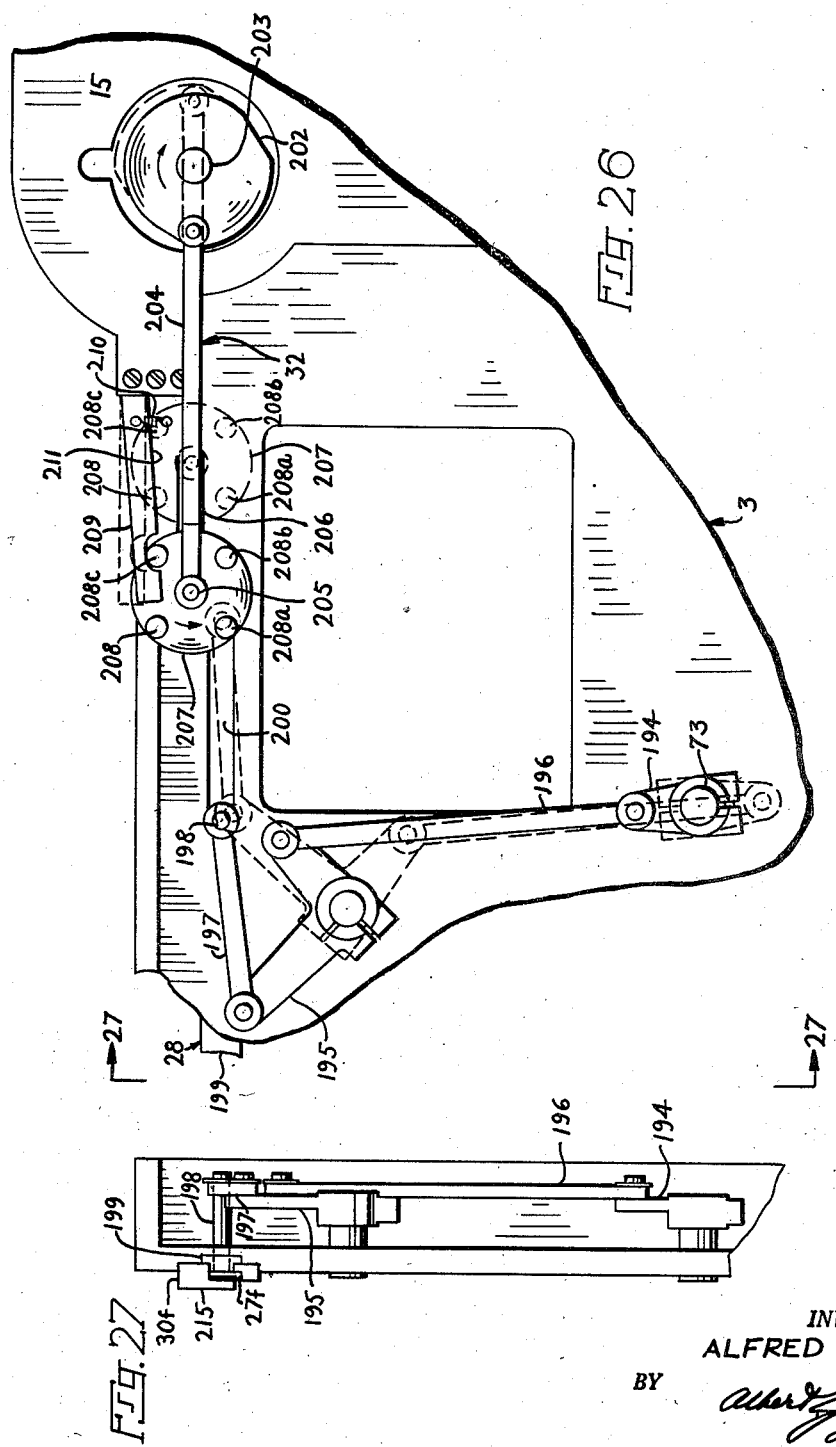

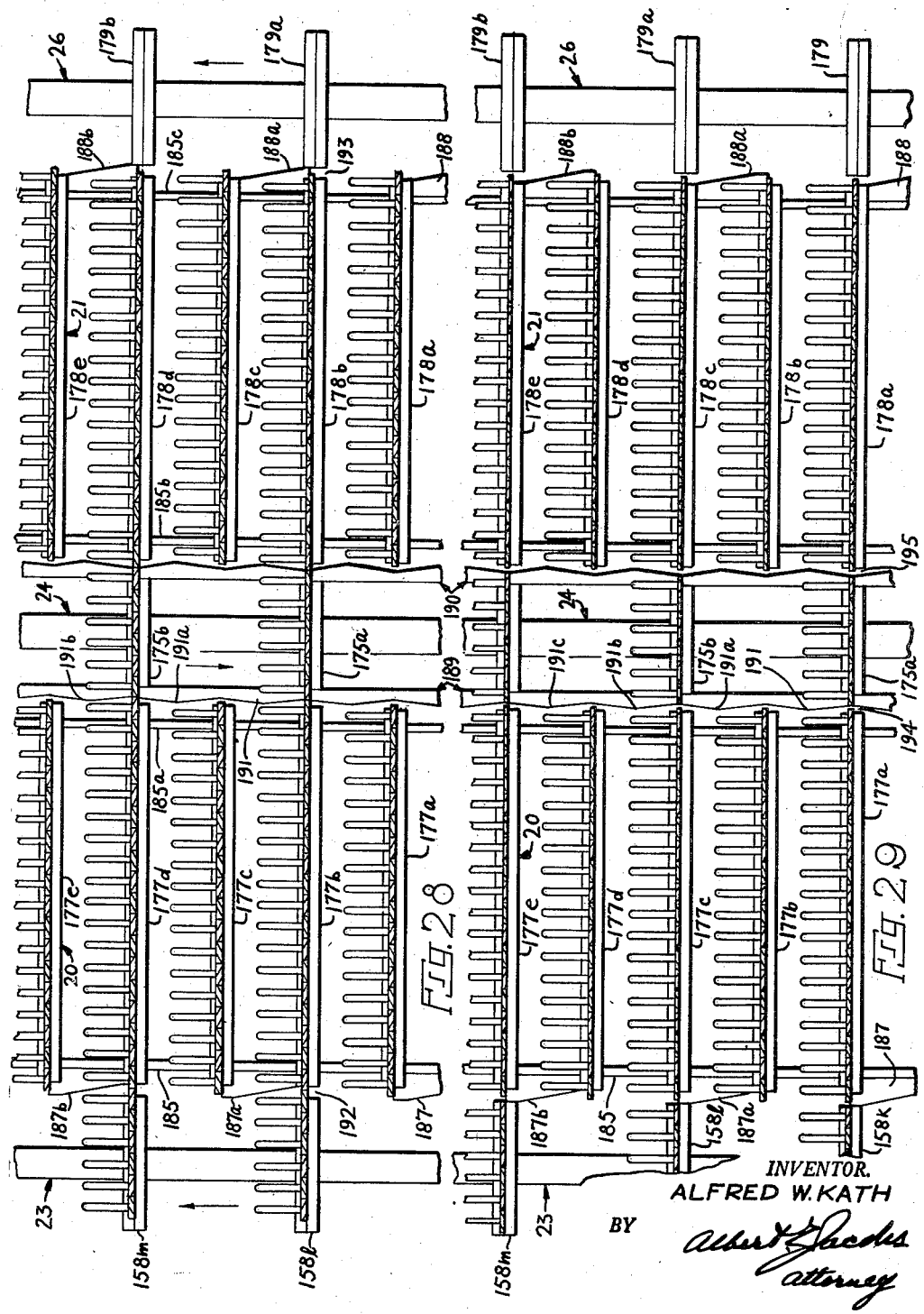

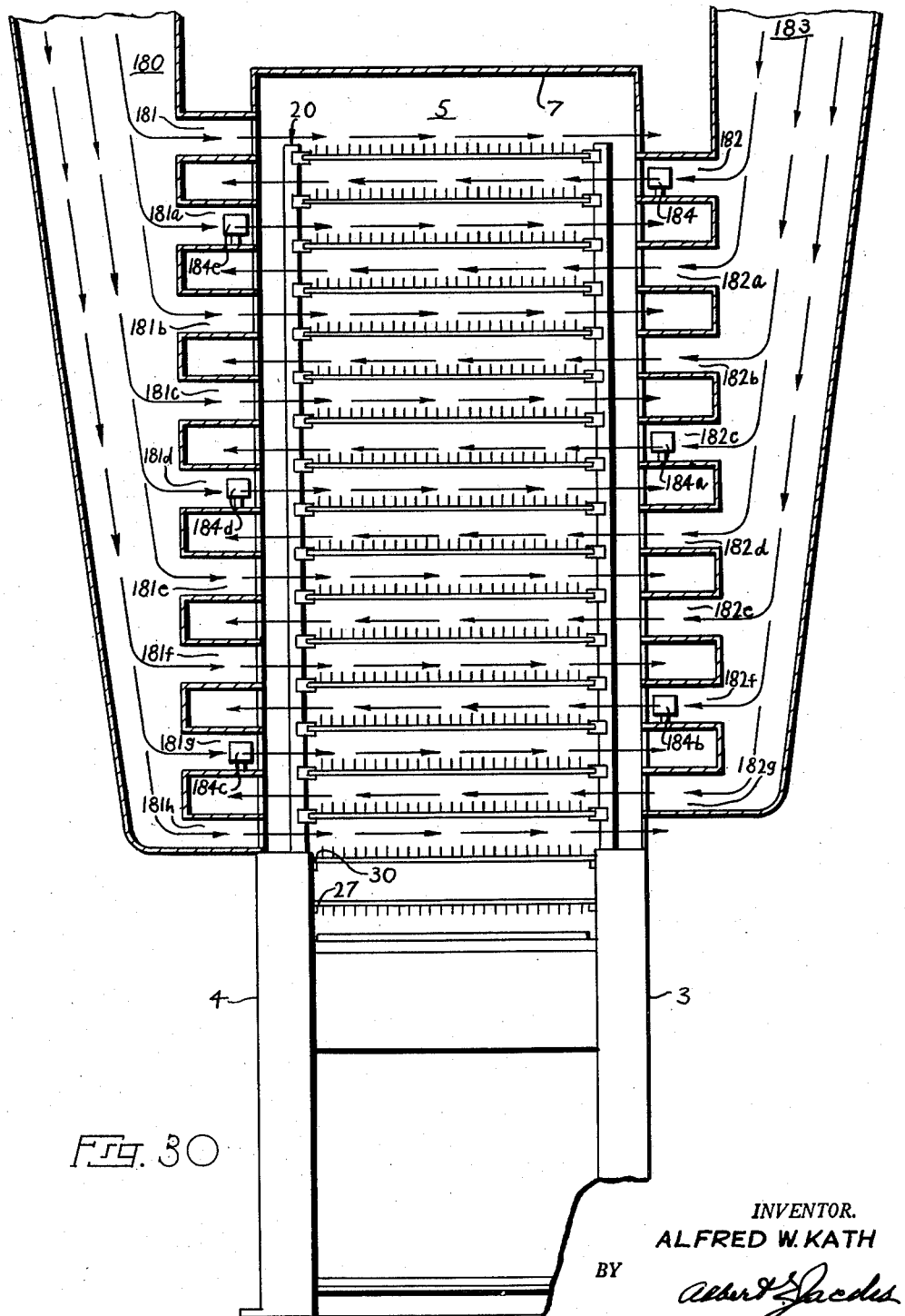

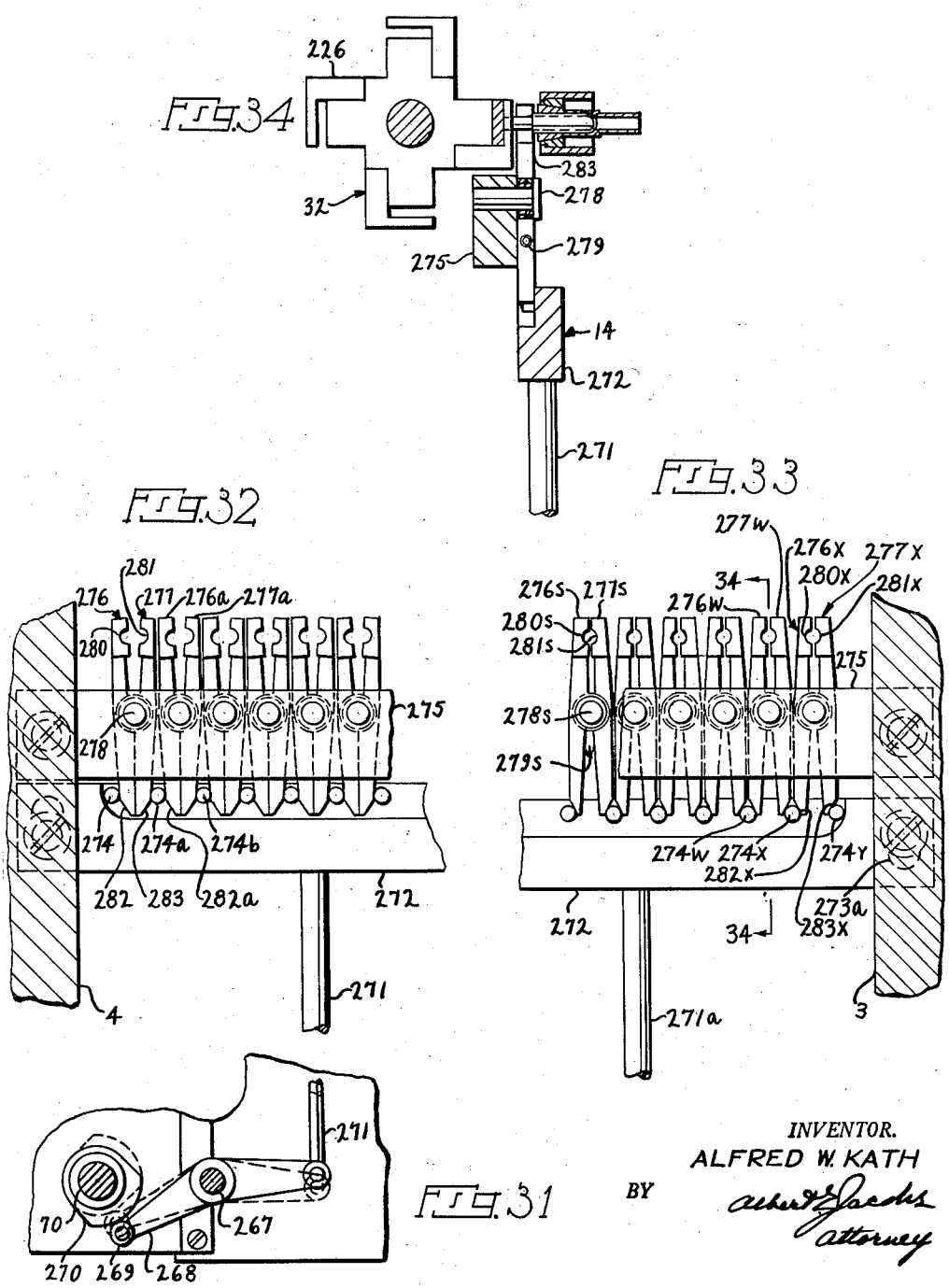

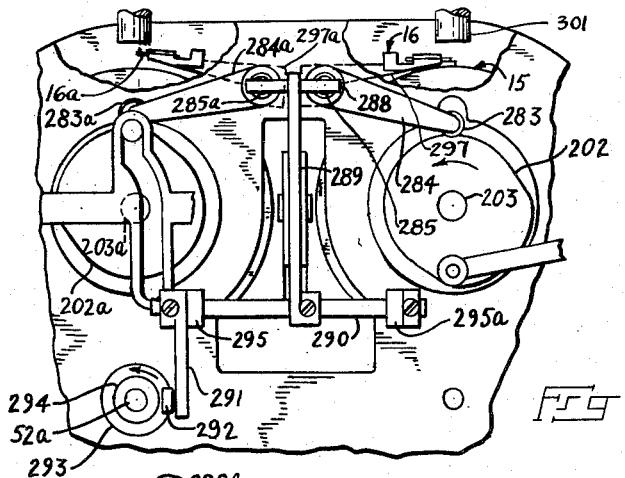
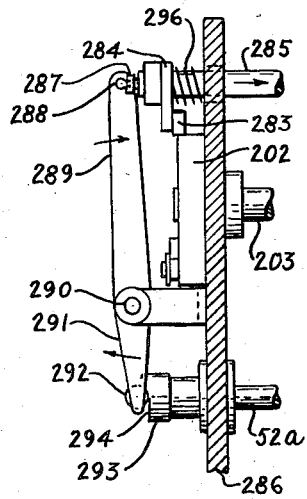
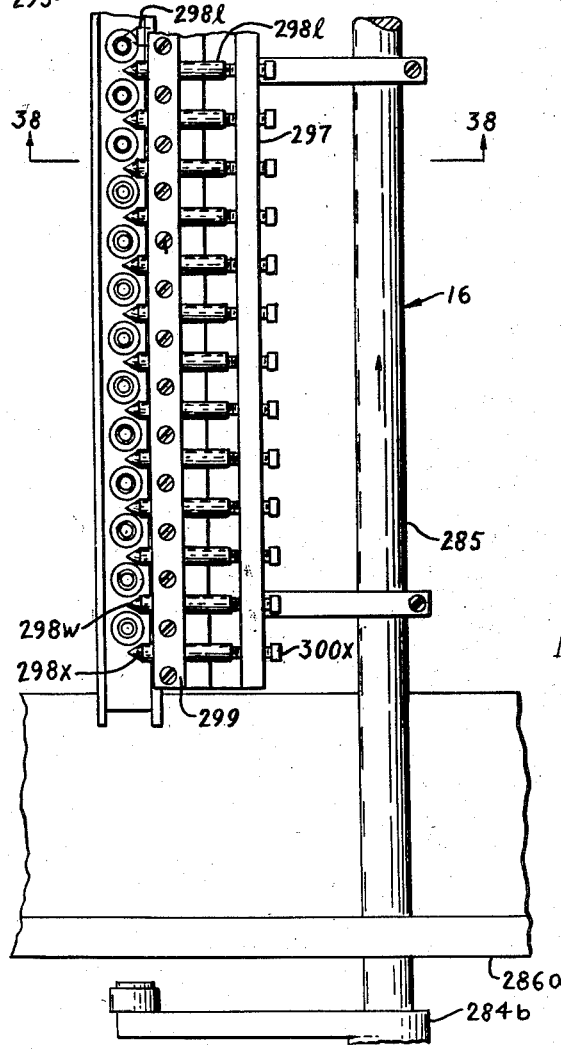
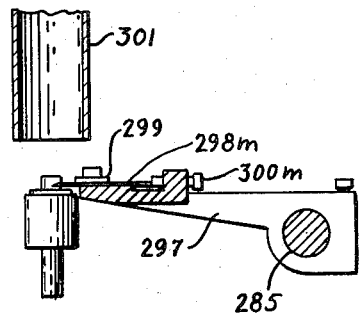
INVENTOR.
ALFRED W. KATH

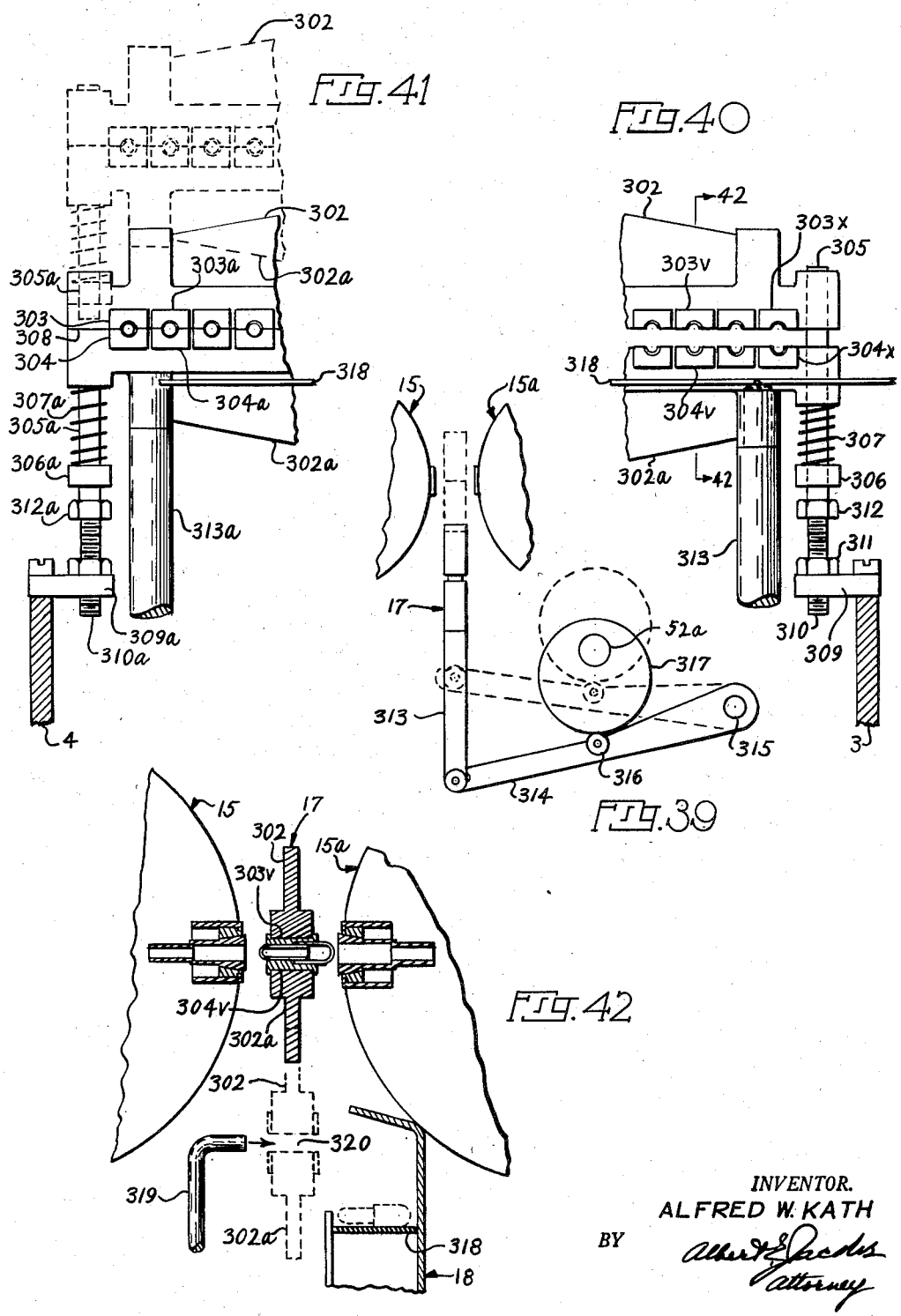

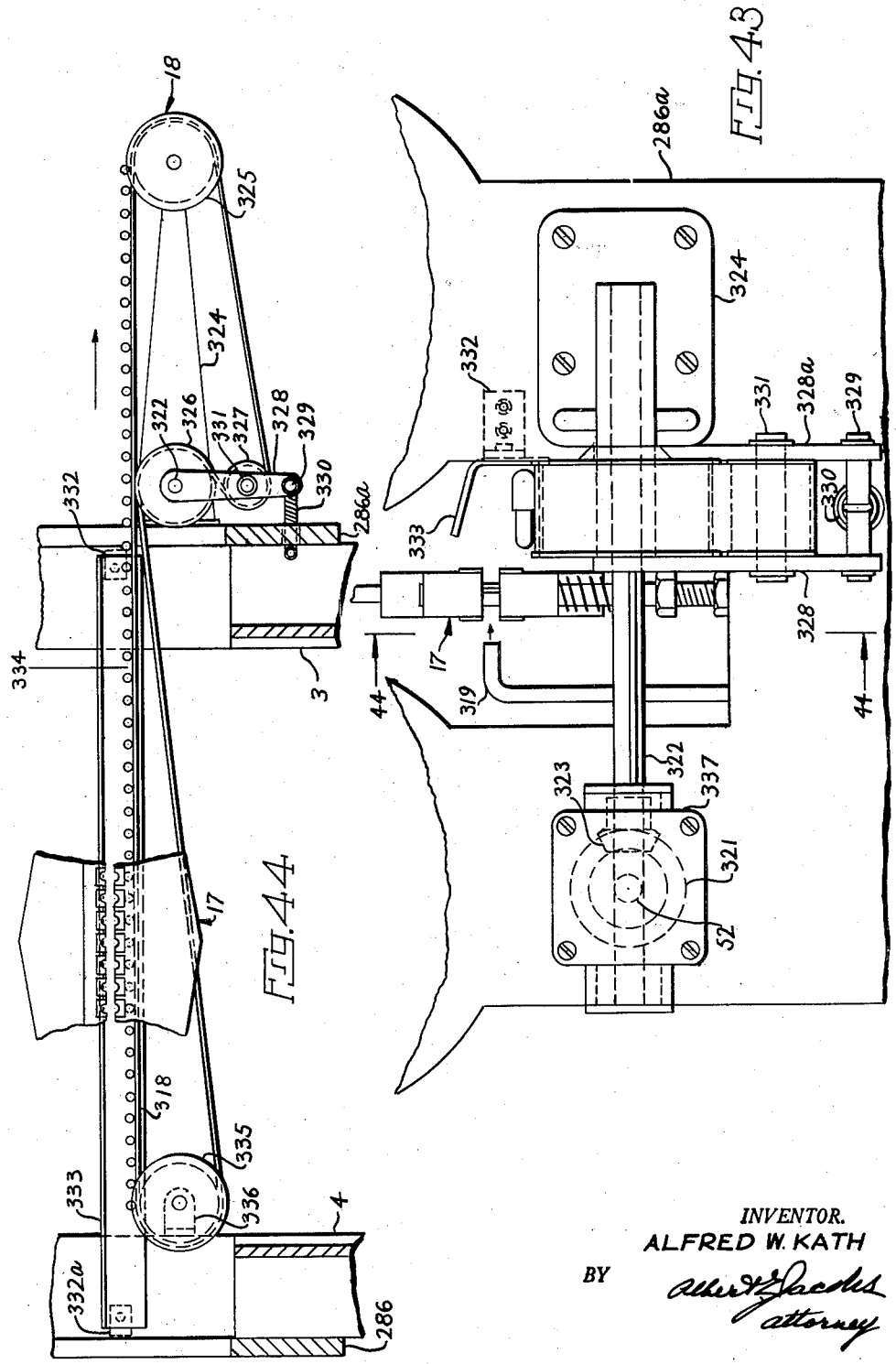

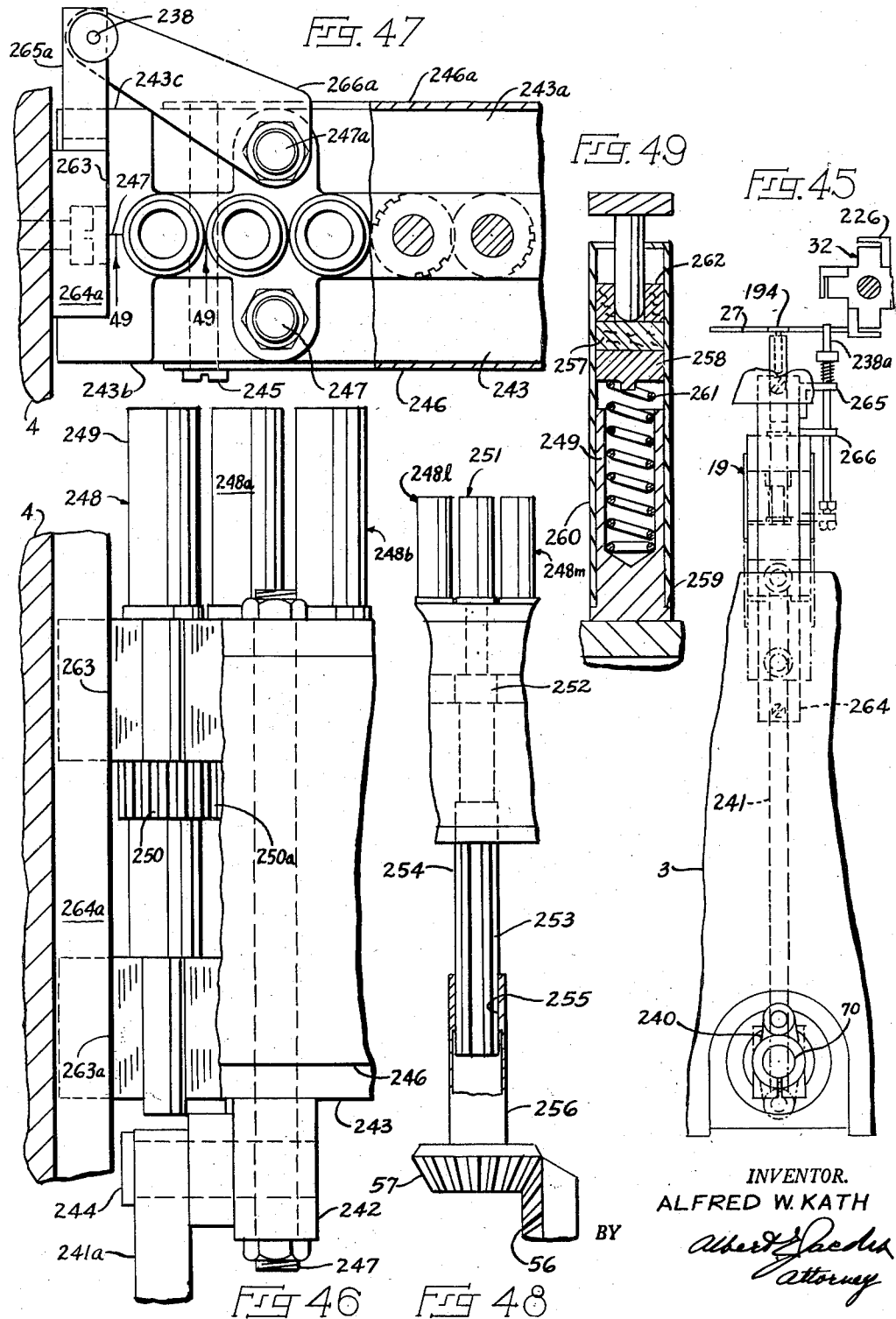

INVENTOR.
ALFRED W. KATH

Jan. 20, 1959 A. W. KATH 2,869,178
MACHINE FOR MAKING HARD-SHELL GELATINE CAPSULES
Filed Dec. 7, 1953 38 Sheets-Sheet 28

INVENTOR.
ALFRED W. KATH
BY
Albert Jacobs
Attorney

INVENTOR.
ALFRED W. KATH

Jan. 20, 1959 A. W. KATH 2,869,178
MACHINE FOR MAKING HARD-SHELL GELATINE CAPSULES
Filed Dec. 7, 1953 38 Sheets-Sheet 31

INVENTOR.
ALFRED W. KATH
BY

INVENTOR.
ALFRED W. KATH

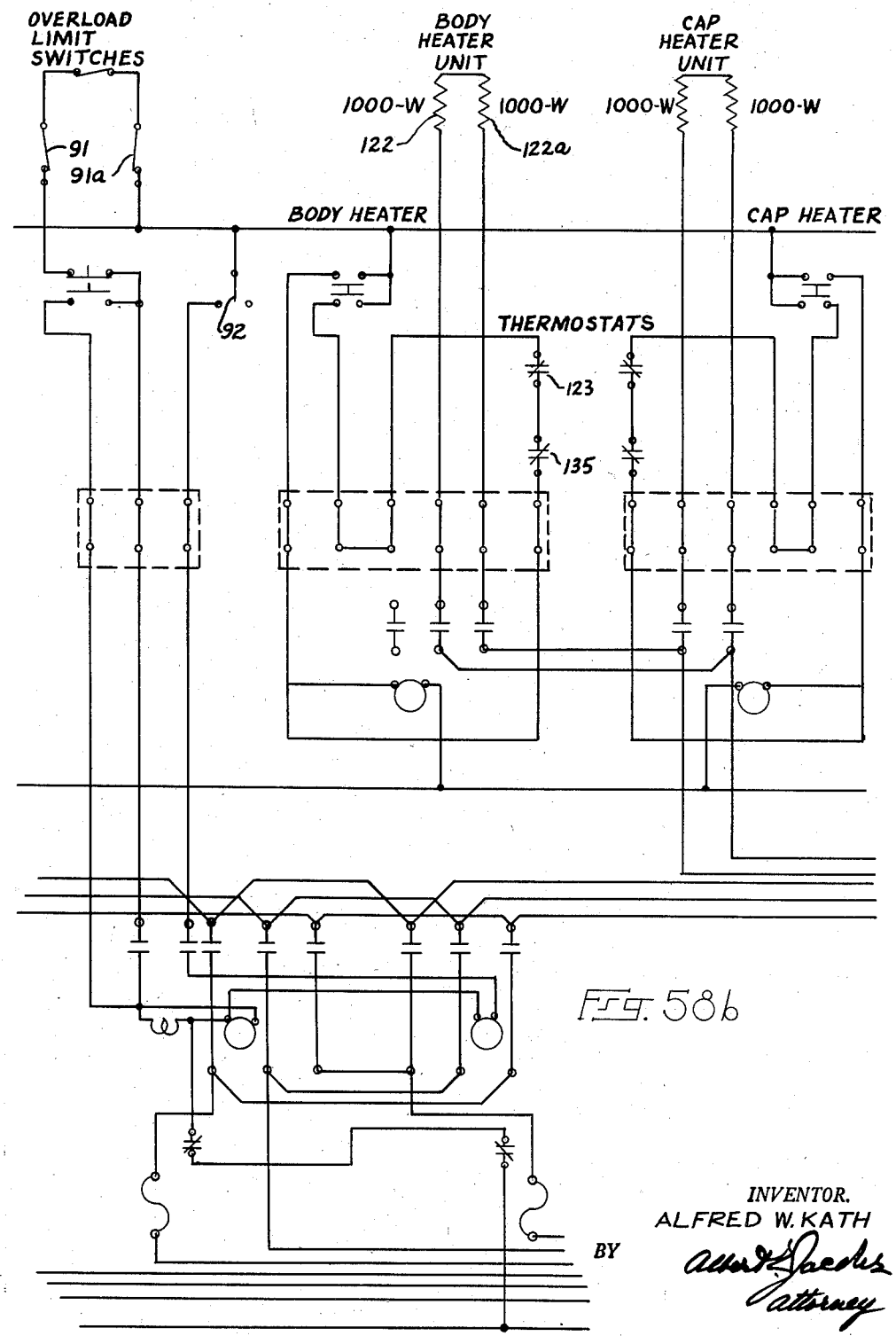

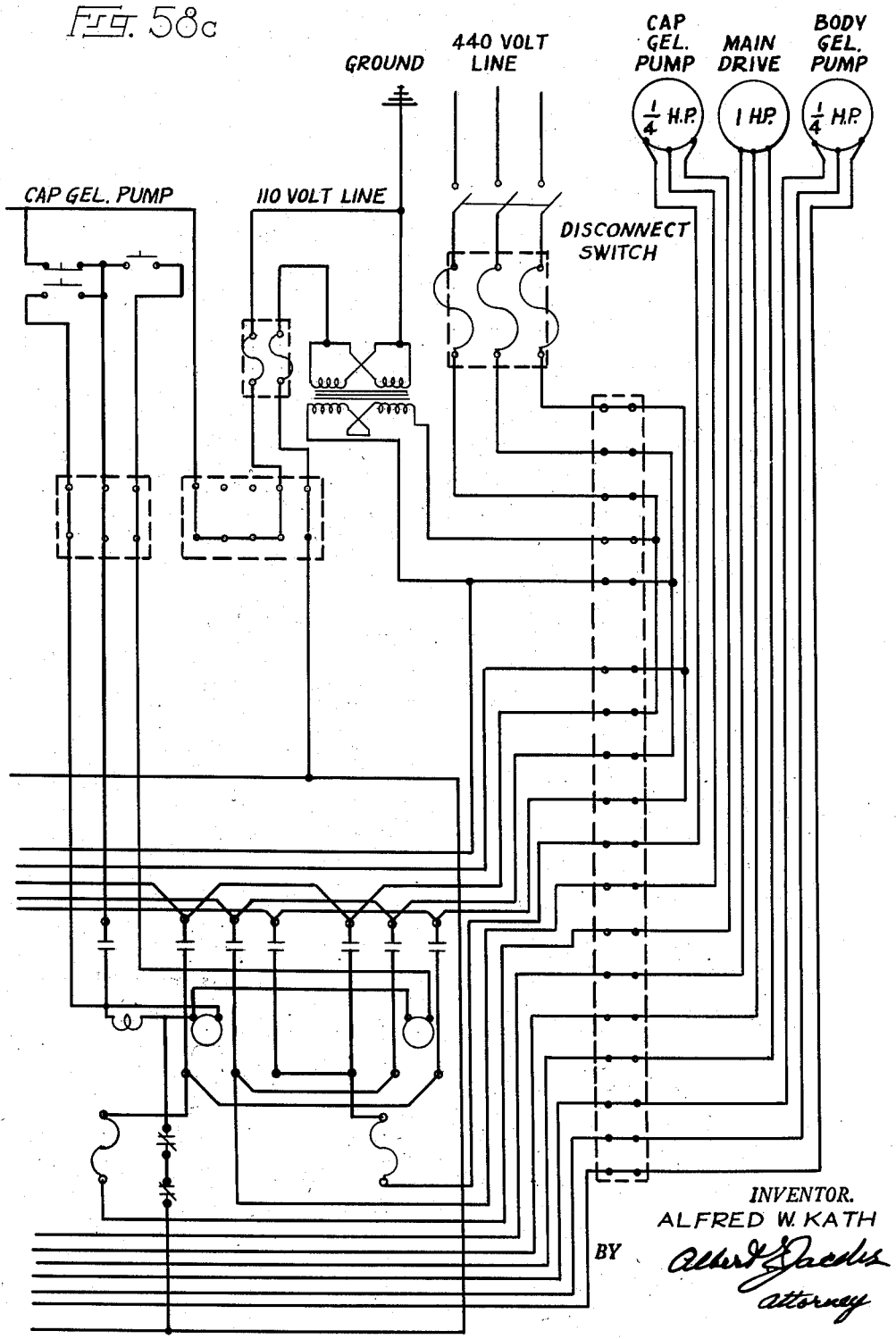

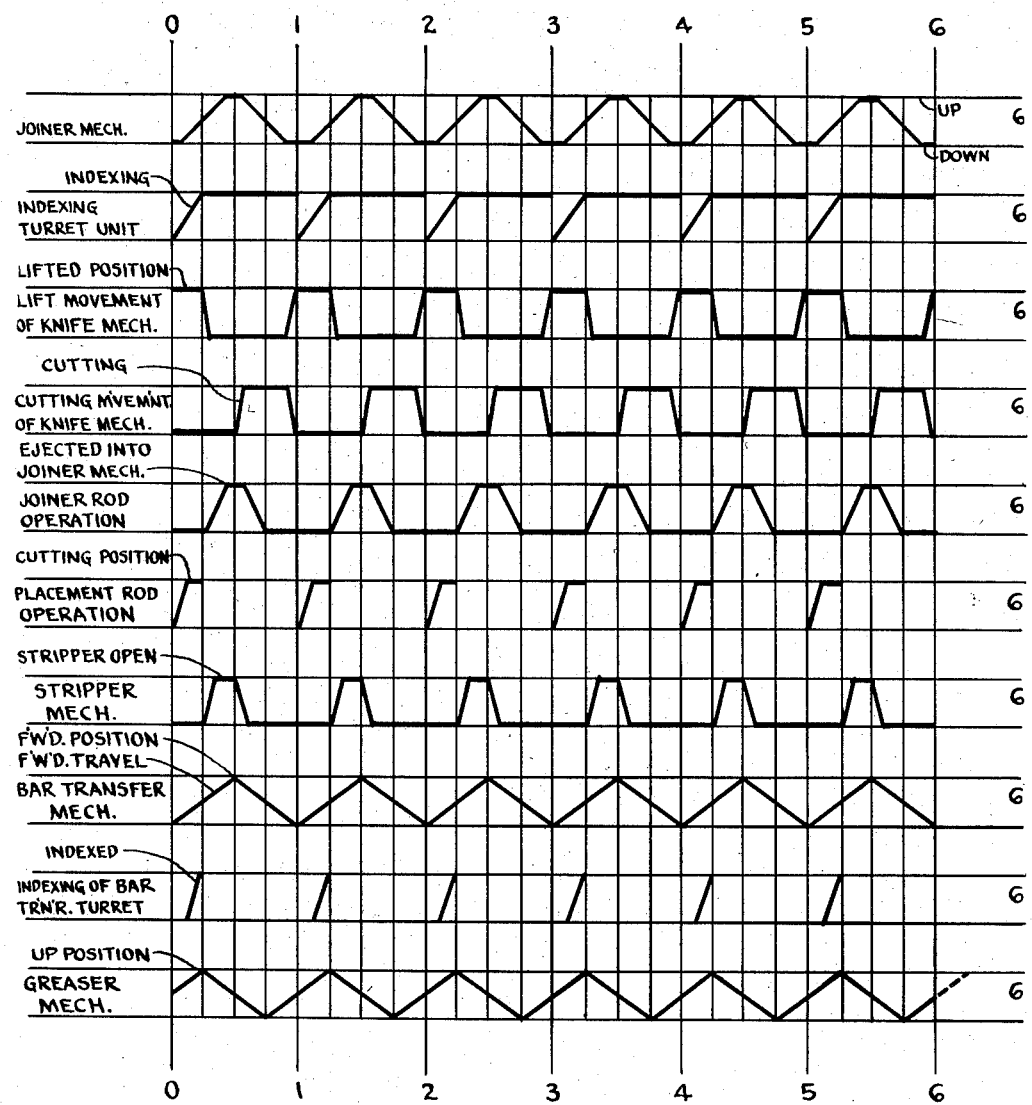

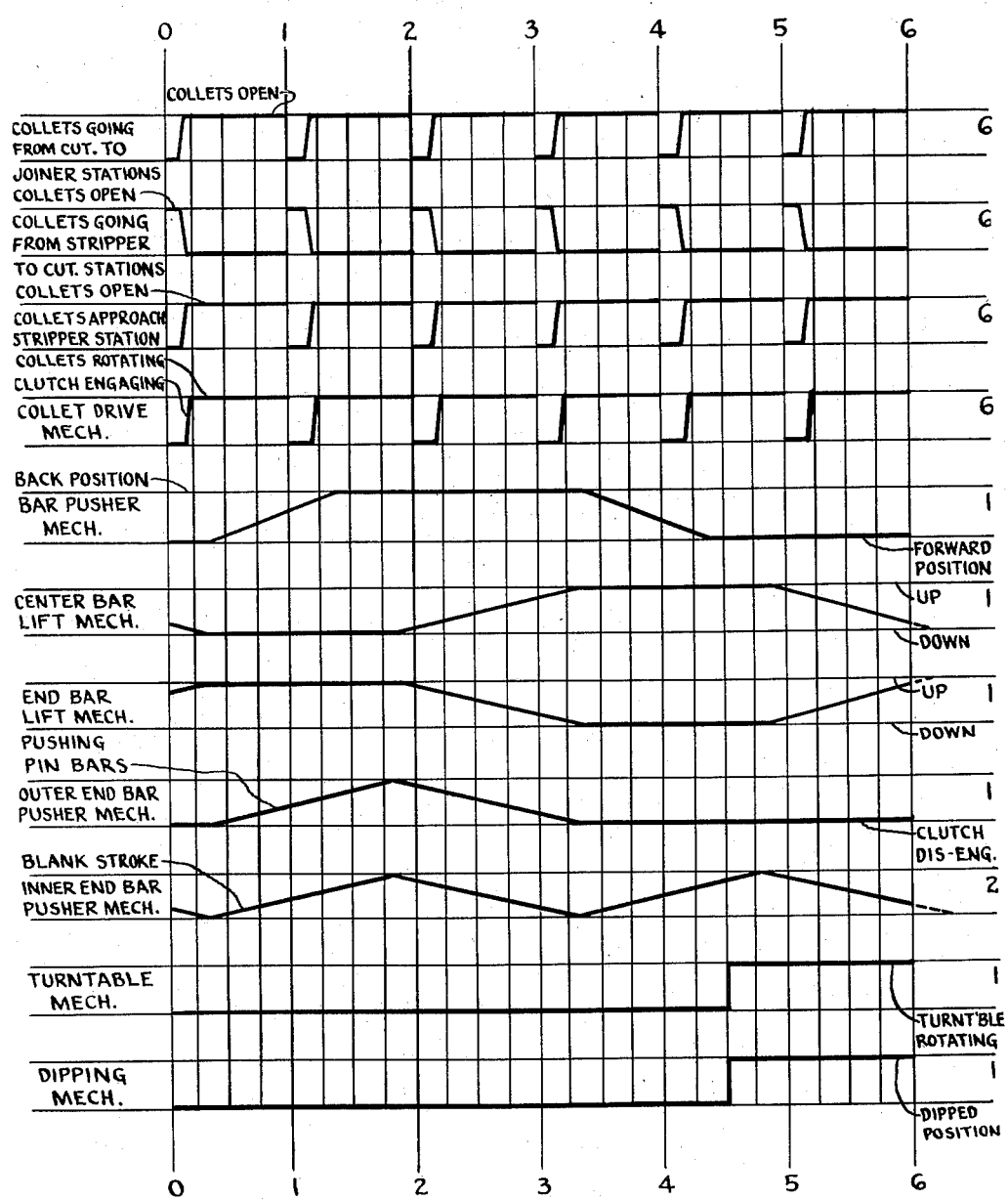

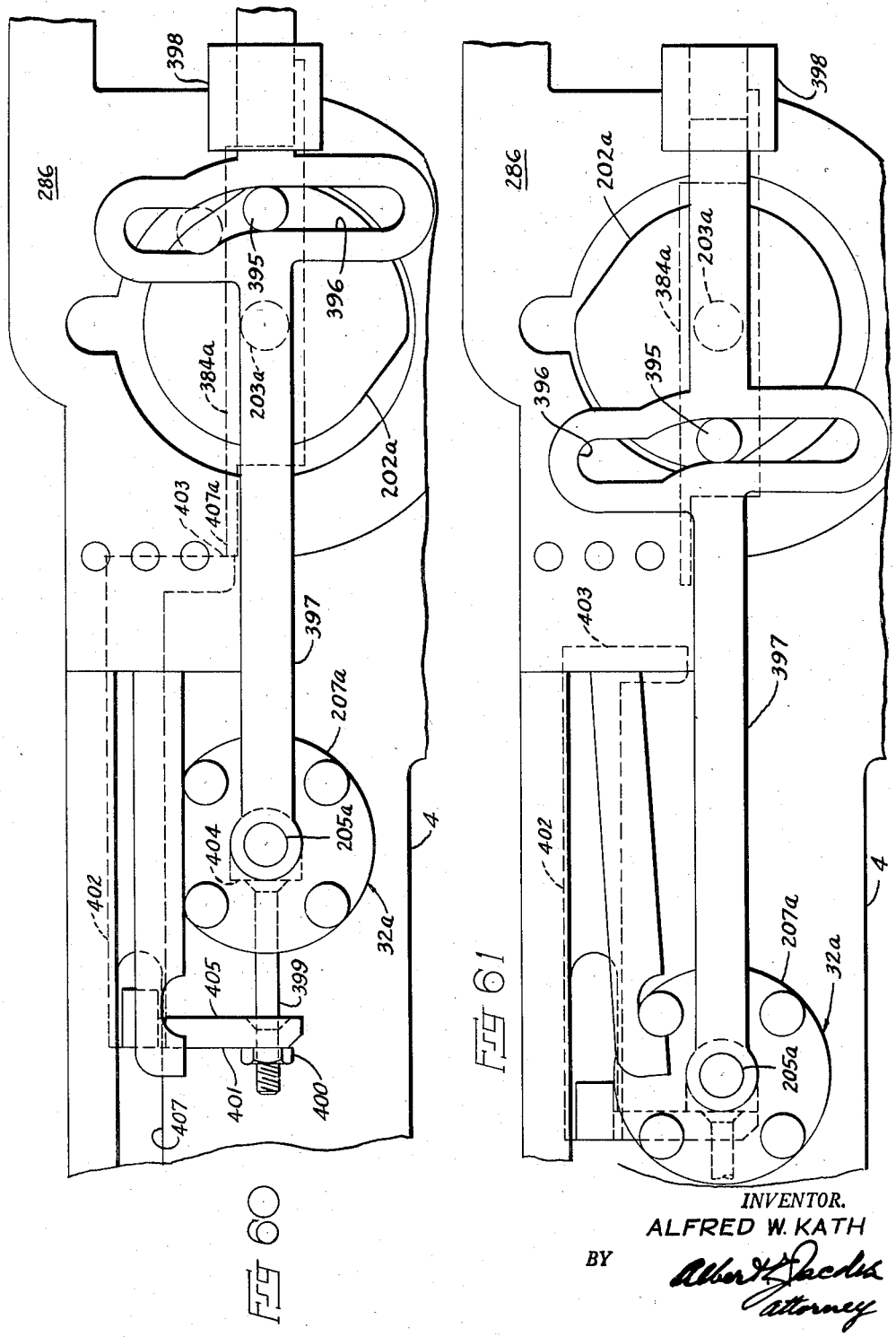

United States Patent Office 2,869,178
Patented Jan. 20, 1959

2,869,178

MACHINE FOR MAKING HARD-SHELL GELATINE CAPSULES

Alfred W. Kath, Cleveland, Ohio, assignor, by mesne assignments, to R. P. Scherer Corporation, Detroit, Mich., a corporation of Michigan Application December 7, 1953, Serial No. 396,502

7 Claims. (Cl. 18—25)

This invention relates to capsule-making machines and is more particularly concerned with an automatic capsule-making machine having many advantages and improvements over prior machines, particularly as to size, simplicity of construction, speed of operation and reduced cost and floor space requirements.

The art of making hard-shell gelatine capsules has progressed over a period of a great many years from the original hand operation to relatively large, expensive and complicated automatic machinery. Such machinery is now being successfully employed in the production of hard-shell gelatine capsules but suffers from certain recognized drawbacks and disadvantages. For example, present-day machines are very large and require a great deal of floor space; they are also expensive and, while they work quite satisfactorily, nevertheless are rather intricate and complicated in their construction. These large machines are also not adaptable to smaller concerns having limited floor space and/or restricted finances and thus, to some extent, these factors have limited their use and tended to concentrate capsule-making in the larger companies. In working in this art for a great many years and having personally designed and developed many of the existing machines, I have realized that it would be highly desirable to be able to produce hard-shell gelatine capsules on a much smaller, less expensive and less complicated machine which would not only have these inherent advantages but which would also enable capsule-making to be more widely distributed geographically with the attendant advantages of so doing. The present invention, therefore, is especially directed to a solution of the foregoing problems.

It is, accordingly, one of the objects of this invention to produce for the first time a relatively simple, inexpensive, hard-shell capsule-making machine requiring a minimum of floor space.

Another object of the invention resides in the production of a simplified, entirely re-designed automatic capsule-making machine wherein the capsule bodies and caps are simultaneously produced at the ends of the machine and joined and discharged from the central section of the machine in the form of completed and assembled, accurately fabricated and fitted capsules.

An additional object of the invention consists in a capsule-making machine in which certain of the operations are carried out in a more or less vertical direction as contrasted with the essentially lateral or horizontal functioning of previous machines.

A further object of the invention is to produce an automatic capsule-making machine in which certain manual control features are incorporated and in which the machine is so constructed that it is, in effect, double-ended and operates in carrying out the progressive steps of capsule-making from both ends toward the center.

A still further object of the invention is to produce a capsule-making machine of exceptional versatility and of extremely precise operation.

A still further object of the invention resides in the provision, in an automatic capsule-making machine, of a multiplicity of sets of pins mounted on pin bars which are dipped into liquefied gelatine of controlled temperature and viscosity, passed through a kiln system, then stripped and trimmed from the pins and the body and cap portions thereof joined and discharged from the machine in completed, assembled form, the operations being so designed and carried out that uniform, accurately dimensioned capsules are produced with very few, if any, rejects and at the rapid production rate of 500 per minute.

A still further and additional object of the invention resides in a machine which is, in effect, made up of two similar units disposed at either end with a central drive unit driven by a single 1 H. P. motor and wherein each of the end units operates toward the central drive unit which not only constitutes a joining of the end units for driving purposes but which also embodies mechanism for assembling the gelatine body and cap portions produced by such end units, the completed assembled capsules being discharged from the central unit of the machine to a conveyor or other receiving means.

Especial advantages and further objects of the invention reside in the organizational arrangement of the new machine and its component sub-assemblies, units and parts all as will be hereinafter set forth and as will be appreciated and understood by those skilled in this art.

Other and still further objects and advantages will be understood and appreciated from the description which follows and resides in the various mechanical combinations and sub-combinations hereinafter described and claimed. The invention is, moreover, susceptible of modifications with respect to the illustrated and described embodiment thereof within the scope of the appended claims.

In the accompanying drawings wherein I have illustrated a preferred and complete embodiment of the invention:

Fig. 1 is a diagrammatic representation of the relationship of Figs. 1a–1j arranged to illustrate a complete front elevational view of the hard shell capsule making machine of the present invention in its entirety;

Figs. 1a–1j, as one composite figure, is a front elevation of my hard-shell capsule making machine the left-hand portion of which is in partial cross-section through the center of the machine and the right-hand portion of which is shown with the outside cover cut away;

Fig. 3 is an enlarged fragmentary sectional elevation of the dipping mechanism only;

Fig. 4 is a partial front elevational view of the capsule making machine showing the complete dipping mechanism of the right-hand portion of the machine;

Fig. 5 is a partial side elevation of the dipping mechanism as seen from line 5—5 of Fig. 4;

Fig. 6 is an enlarged partial cross-sectional view of the dipping mechanism taken on line 6—6 of Fig. 3;

Fig. 7 is a transverse cross-sectional view, partly in elevation, of the dipping tank assembly substantially along the irregular line 7—7 of Fig. 1c;

Fig. 8 is an enlarged rear elevational view of the dipping tank showing the heaters and thermostatic controls;

Fig. 9 is an enlarged cross-sectional elevation of the dipping tank showing the gear pump and water jacket;

Fig. 10 is a partial front elevational view showing the turntable mechanism and its driving gears;

Fig. 11 is a partial side elevation of the turntable mechanism as seen from line 11—11 of Fig. 10;

Fig. 12 is an enlarged cross-sectional elevation of the turntable;

Fig. 13 is a partial front elevation showing the bar lift mechanism in its lowermost position;

Fig. 14 is the same view as Fig. 13 except that the bar lift mechanism is in its uppermost position;

Fig. 15 is a transverse plan view, partly in section, of Fig. 14;

Fig. 16 is a side elevational view, partly in section, of the bar lift mechanism as seen from line 16—16 of Fig. 14;

Fig. 17 is a fragmentary front elevational view showing the right-hand outer kiln bar pusher mechanism in its extreme back position with the clutch engaged;

Fig. 18 is a plan view of Fig. 17;

Fig. 19 is a view similar to Fig. 18 showing the right-hand outer kiln bar pusher mechanism in its extreme forward position;

Fig. 20 is a transverse sectional view along line 20—20 of Fig. 17 showing the kiln bar pusher clutching arrangement when the mechanism is in the extreme back position;

Fig. 21 is a view similar to Fig. 20 when the mechanism has moved to its extreme forward position with the clutch disengaged;

Fig. 22 is a partial front elevation of the bar pusher mechanism and the bar transfer mechanism with portions in section, the bar pusher mechanism and the bar transfer mechanism being shown in their extreme forward positions;

Fig. 23 is a view similar to Fig. 22 except that the bar pusher mechanism and the bar transfer mechanism are shown in their respective back positions;

Fig. 24 is an enlarged partial plan view showing the bar pusher and bar transfer mechanisms in the positions of Fig. 23;

Fig. 25 is a partial front elevation and partial cross-section of the bar transfer turret ratchet mechanism in its locked position as seen from line 25—25 of Fig. 24;

Fig. 26 is a fragmentary front elevational view of the left-hand bar pusher and bar transfer actuating mechanisms;

Fig. 27 is a side view of the bar pusher and bar transfer actuating mechanisms of Fig. 26 as seen from line 27—27 thereof;

Fig. 28 is a partial front and partial cross-sectional elevation of the kiln bar lift mechanism with the center lift shown in its up position and the two end lifts shown in their down position at the instant before the lifts begin to move to their opposite extreme positions;

Fig. 29 is a partial front and partial cross-sectional elevation of the kiln bar lift mechanism with the center lift shown in its down position and the two end lifts in their up position an instant after the lifts have moved from the positions shown in Fig. 28;

Fig. 30 is a schematic representation of the kiln portion of my new hard-shell capsule making machine as seen in a left-hand side elevation and showing the controlled air flow through the different levels of the kiln portion of the machine;

Fig. 31 is a fragmentary elevation of the stripper actuating mechanism with parts in section;

Fig. 32 is an enlarged left-hand transverse section, partly in elevation, of the stripper mechanism in the open position, as seen from line 32—32 of Fig. 1d;

Fig. 33 is a view similar to Fig. 32 with the stripper mechanism in the closed position;

Fig. 34 is a partial cross-sectional and partial front elevational view of the stripper mechanism with the turret of the bar transfer mechanism in its forward position;

Fig. 35 is a partial rear elevation of the hard-shell capsule making machine showing the knife mechanisms for both ends of the machine and wherein, for illustrative purposes only, the left-hand knife mechanism is shown in the lifted position and the right-hand mechanism is shown in its down position;

Fig. 36 is a side view of Fig. 35;

Fig. 37 is an enlarged plan view of the knife mechanism of Fig. 35;

Fig. 38 is a cross-sectional view of the knife mechanism taken along line 38—38 of Fig. 37;

Fig. 39 is a partial front elevation of the capsule joiner mechanism showing in full lines the mechanism in its extreme down position, the dotted lines indicating the position of the parts of the joiner mechanism in their extreme uppermost position;

Fig. 40 is a view of the joiner mechanism in its extreme down position taken along line 40—40 of Fig. 1e;

Fig. 41 is a view similar to Fig. 40 of the joiner mechanism taken as it is traveling to its extreme down position, the dotted line positions of the parts of the joiner being in their extreme up position;

Fig. 42 is an enlarged fragmentary front elevational view, partly in section, of the joiner in the upper position where it is aligned with the capsule collets of the indexing turrets, the dotted line positions of the joiner parts in this figure showing their extreme down position in alignment with a conveyor belt;

Fig. 43 is a front elevational view of part, with parts in elevation, of the conveyor mechanism and showing the joiner mechanism in its down position;

Fig. 44 is a cross-sectional view of the conveyor mechanism with the joiner mechanism broken away, taken along line 44—44 of Fig. 43;

Fig. 45 is a partial front elevation of the greaser mechanism in its extreme up position and the turret of the bar transfer mechanism, the greaser mechanism being shown in its extreme down position in dotted lines;

Fig. 46 is an enlarged partial transverse cross-sectional elevation of the greaser mechanism with part of the cover removed to show the greaser spindle;

Fig. 47 is a partial plan view of the greaser unit with a portion of the unit broken away;

Fig. 48 is a partial transverse elevation of the center portion of the greaser unit in its uppermost position showing the driver spindle in partial cross-section;

Fig. 49 is a cross-sectional elevation of the greaser spindle showing the felt greaser spindle greasing a pin of the pin bar;

Figure 51:
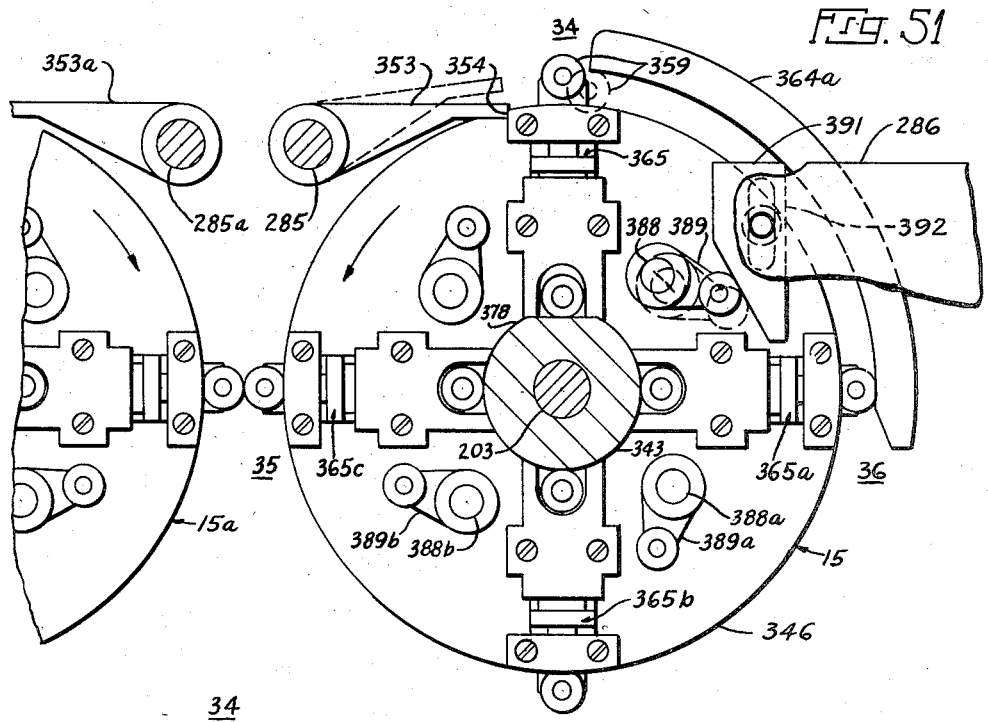
Figure 52:
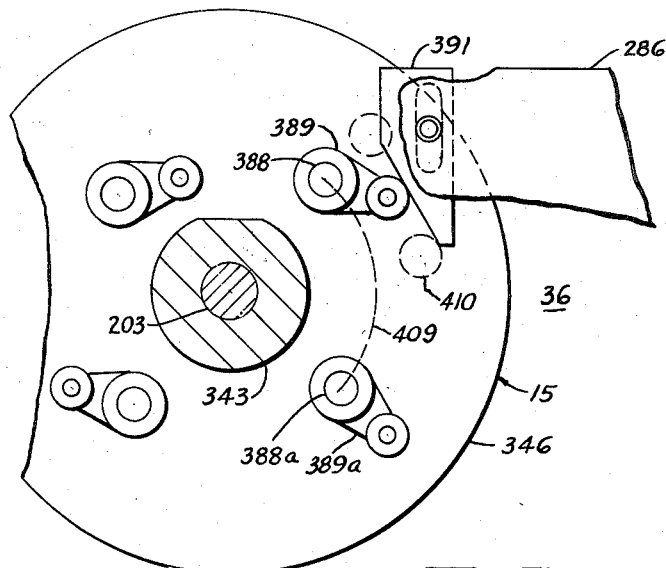
Figure 53:
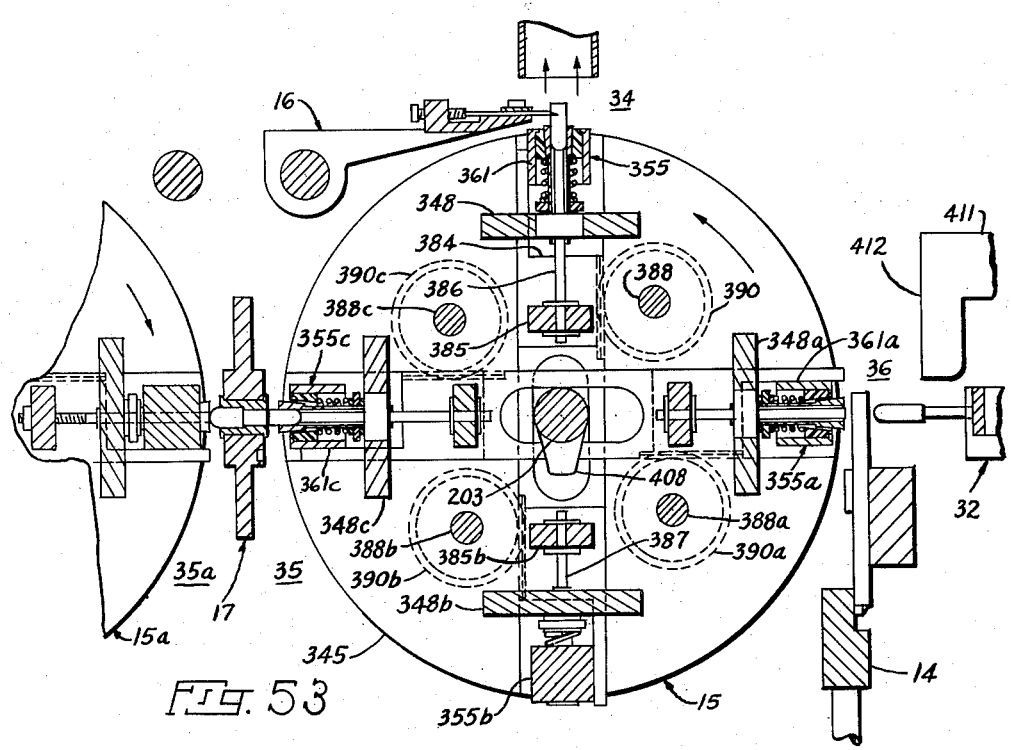
Figure 54:
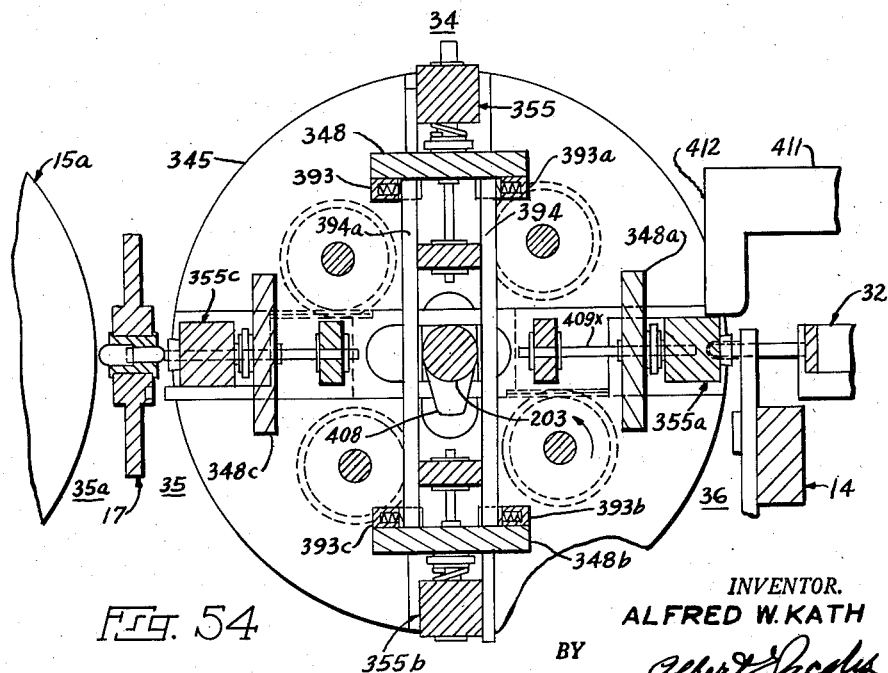
Figure 55:
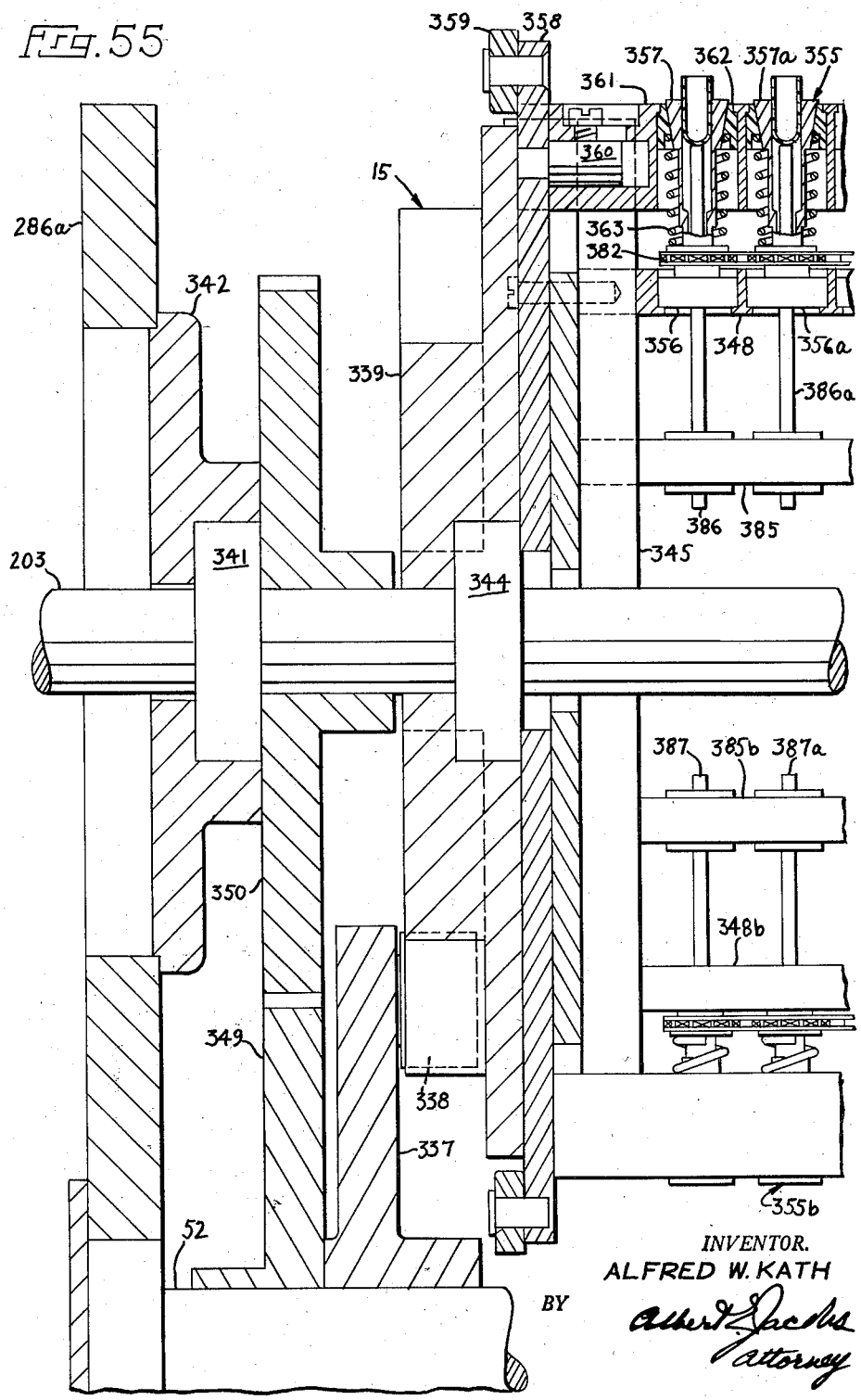
Figure 56:
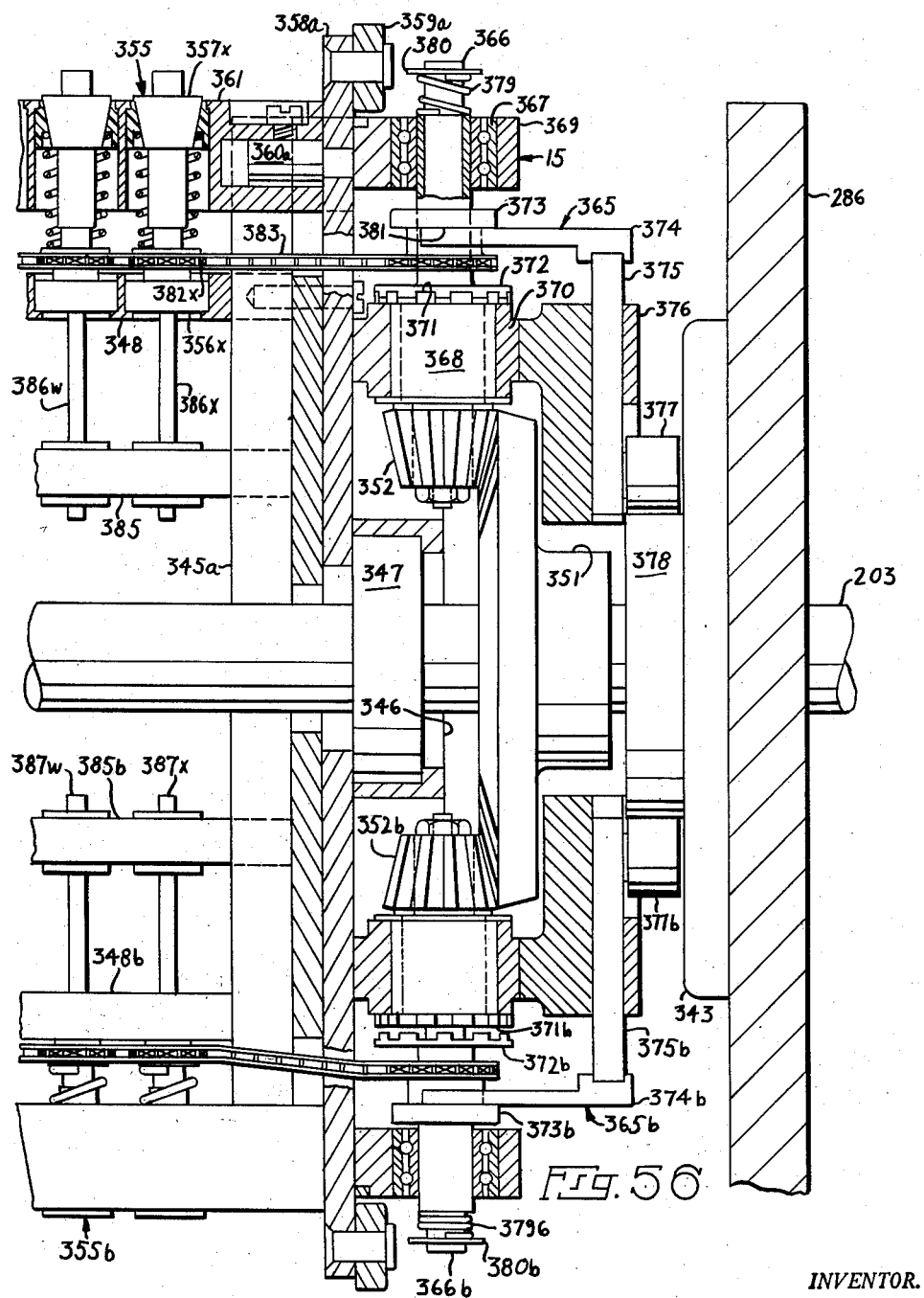
Figure 57:
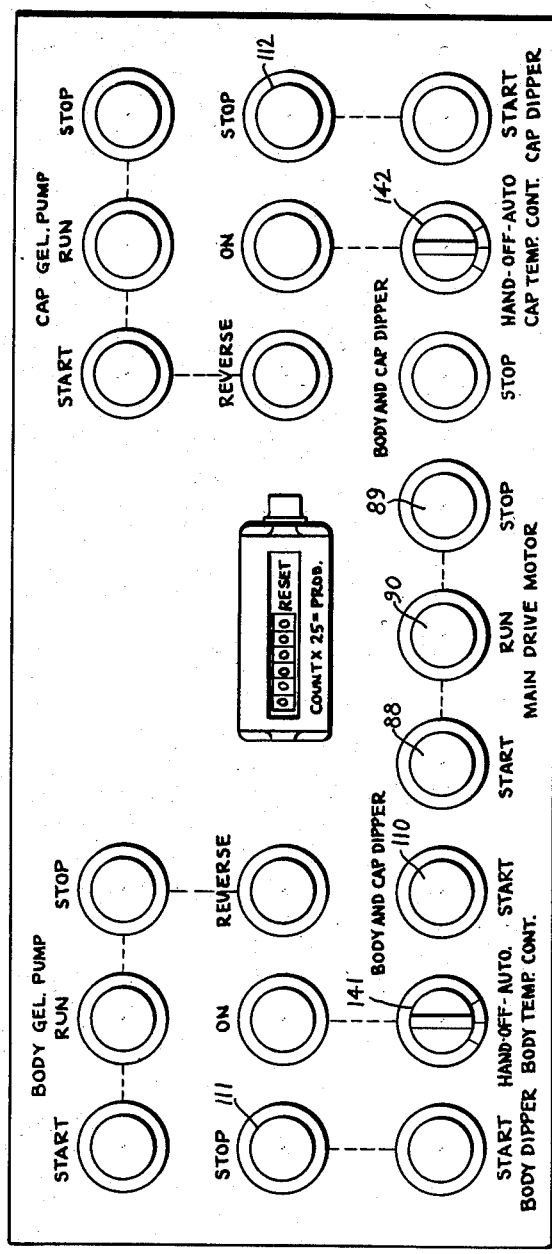
Figure 58:
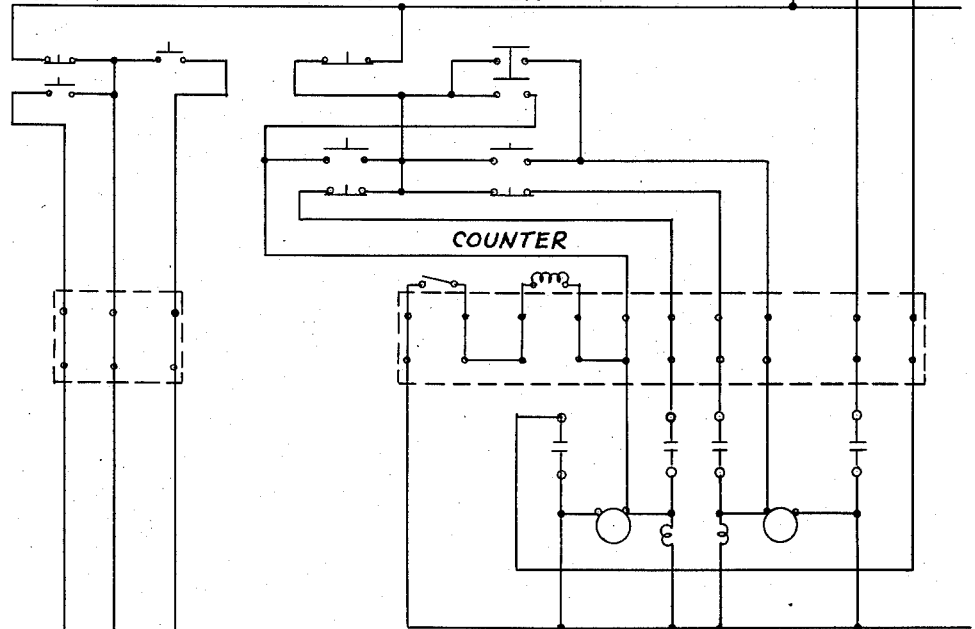
Figure 58A:
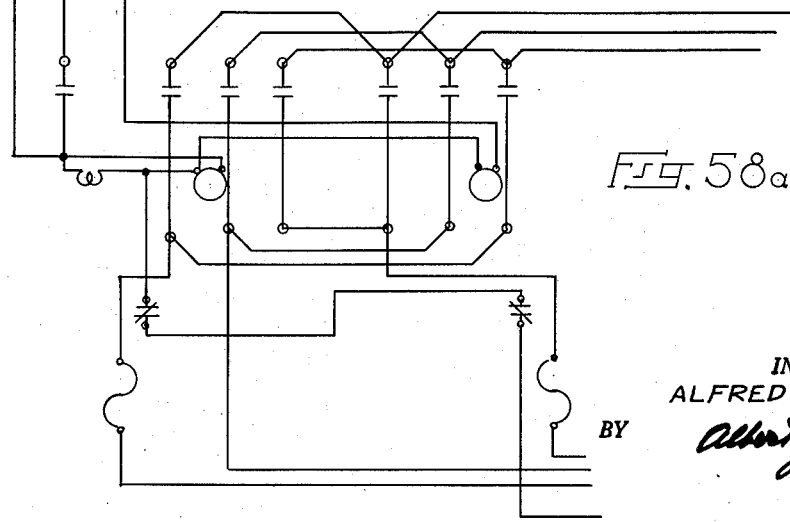

Fig. 51 is a partial rear elevation of the left-hand indexing turret and a portion of the right-hand indexing turret with the rear main frame plate cut away to show the rear face of the turret, the placement rod actuator arms thereof being shown in their position as having placed the capsules at their correct lengths and the joining rod actuator arms being shown in their back position before they have moved forward to joining position;

Fig. 52 is a view similar to the right-hand portion of Fig. 51 except that the joining rod actuator arms are shown as having moved forward to their joining position;

Fig. 53 is a partial rear cross-sectional elevation of the left-hand indexing turret and a portion of the right-hand indexing turret with the stripper and joiner mechanisms in their related positions, the placement rods thereof being shown as having placed the capsules at their correct length for cutting, and the joining rods being in their back position before moving forward to their active joining position;

Fig. 54 is similar to Fig. 53 except that the joining rods are shown as having moved forward to their active joining position;

Fig. 55 is a vertical cross-sectional elevation along line 55—55 of Fig. 1e of the front face of the left-hand indexing turret, showing also the placement rods and capsule collets in their closed position;

Fig. 56 is a vertical transverse cross-sectional elevation along line 56—56 of Fig. 1e of the rear face of the left-hand indexing turret showing the collet clutch mechanism;

Fig. 57 is an enlarged front elevational view of the hard-shell capsule making machine control panel;

Fig. 58 is a diagrammatic representation of Fig. 58a–c to show the arrangement of the electrical schematic diagram of the hard-shell capsule making machine;

Fig. 58a–c, as one composite figure, is the electrical schematic representation of the electrical circuits involved in the automatic and manual control and operation of the hard-shell capsule making machine;

Fig. 59 is a diagrammatic representation of Figs. 59a and 59b to show the arrangement of the related timing charts;

Figs. 59a and 59b, as one composite figure, is the schematic representation of the related timing of the cycles of the various mechanisms that are involved in the complete operation of the machine;

Fig. 60 is a partial rear elevation of the cap joining actuator mechanism in its forward or joining position, this being located at the right-hand end of the capsule making machine and integrated with the right-hand bar transfer mechanism and Fig. 61 is similar to Fig. 60 except that the cap joining actuator mechanism is in its back or inactive position after its return from the joining position.

General organization

According to this invention, there is provided an automatic machine for making hard-shell gelatine capsules of the telescoping separable cap and body type. This machine is so constructed as to carry on the making of both the bodies and the caps simultaneously at a high productive rate. The manufacture of each portion of the capsule, the cap or body, is exactly the same. The mechanisms for the production process are exactly the same, except that the forms upon which the bodies and caps are actually formed are of different sizes, depending also upon the particular size of capsule to be made. The forms for the bodies are of different diameter from those of the cap because one portion must telescope into the other portion, as is known. The group of mechanisms necessary for the complete process of making one portion of the capsule, is located at the left-hand end of the machine, and there is an exact duplicate of the group of mechanisms in the right-hand end of the machine. These groups of mechanisms are located in their respective ends of the machine in such a manner that the flow of the process is directed from the ends of the machine towards the center line of the machine. As the process progresses, the mechanisms carry their portions of the capsules towards the center of the machine so that at the completion of the respective processes for making the cap and body, both portions have reached the center line of the machine. At that point, there is a special mechanism disposed centrally of the machine which functions to telescope the formed cap and body portions of the capsules and join them together so that the completed capsules leave the machine in assembled condition. This particular mechanism, known as the "joiner mechanism," and the conveyor mechanism, which functions to carry the finished capsules from the machine, are both located at or near the longitudinal center line of the machine, and only one of each is required as contrasted with duplicate mechanisms for the body and cap production.

Referring first to Figs. 1a, 1c and 30, the general construction of the machine is as follows: The machine is double-ended, that is, the left-hand end 1 up to the center line is the same as the right-hand end 2 up to the center line. The front main frame 3 is so constructed that both halves of the frame are alike except that one side is patterned in the left-hand and the other side is constructed in the equivalent right-hand pattern. The rear main frame 4 is like the front main frame 3 in respect to both halves being alike and patterned right-handed and left-handed. The rear main frame 4 is also practically an exact duplicate of the front main frame 3 in construction and layout because both main frames act as support for the hereinafter to be described drives and mechanisms which are mounted between such main frames. Transversely across the top of the main frames are mounted the kiln units of the machine, namely, the left-hand kiln unit 5 and the right-hand kiln unit 6. The kiln units are enclosed by a cover 7 which extends down below these units to cover the outside of the main frames and the left- and right-hand sides of the machine. Control panel 8 (Figs. 1e and 57) is mounted on the front and at the center of the machine. This control panel by suitable electrical means controls the starting and stopping of the entire machine and includes controls for manual or automatic operation of particular mechanisms and units of the machine and for starting and stopping of the same.

The process of making the body or cap portion of the capsule in this machine takes place in this manner: The first operation is the dipping of cylindrical metal pins of suitable length and diameter (twenty-five pins at a time) into a gelatine solution maintained at appropriate viscosity. Referring also to Fig. 6, these pins 11, are mounted on a single straight bar 12 which make up pin bar sub-assembly 13. The dipping is effected by means of the dipping mechanism 9, and this mechanism dips six pin bars at a time into dipping tank assembly 10 which contains liquefied gelatine. The pin bars come out of the dipping tank 10a (Fig. 1a) with a very thin uniform coating of liquid gelatine on the pins 11 of the pin bar sub-assembly 13. The operations following the dipping operation are contrived to carry the pin bars that have been dipped in and coated with the gelatine through a kiln unit 5 having a controlled atmosphere where the gelatine is solidified by being subjected to circulating, hot, dry air at a controlled temperature. Upon the emergence of the dipped pins from the kiln unit, the pin bars are carried to a stripping mechanism 14, which strips the formed gelatin cap or body, whichever is being made in that part of the machine, from the pins 11 of the pin bar sub-assembly 13. From this point on, the operations upon the stripped capsule cap or body take place in the indexing turret unit 15. The cap or body is then cut to the desired length by the knife mechanism 16, and then the cap and body portions of each capsule are joined together by the joiner mechanism 17. The joiner mechanism delivers the capsule, now assembled, to the conveyor mechanism 18 which carries the completed capsule from the machine. At the same time that operations are taking place on the stripped cap or body portion of the capsules, in the indexing turret unit, the pin bars that had been stripped are carried to a greaser unit 19, which prepares the pins of the pin bar for the next dipping operation. This brings the pin bars back to the starting point of the cap or body making process.

Figure 2:
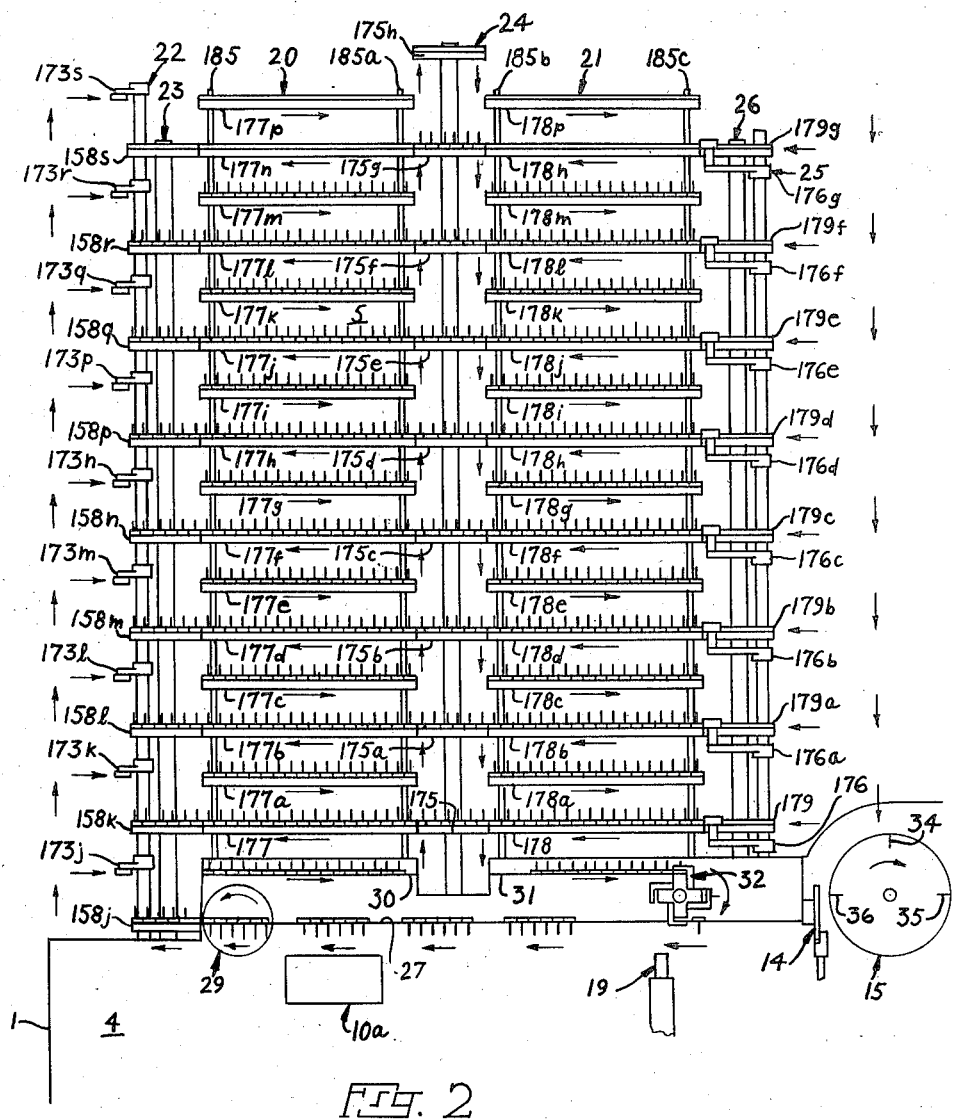
Fig. 2 is a diagrammatic representation of the process effected by the capsule making machine illustrating the flow path which the capsule pin bars follow in the left-hand portion of the machine.

The left-hand kiln unit 5 is composed of two groups of fixed tracks which are mounted in horizontal positions with the tracks equally spaced vertically in height one above the other. The outer group of kiln tracks 20 has located at its left, the left-hand outer end kiln bar pusher mechanism 22 and the outer end kiln bar lift mechanism 23. Between the inner and outer groups of fixed kiln tracks is located the center kiln bar lift mechanism 24, and located to the right of the group of kiln tracks 21 are the inner end kiln bar pusher mechanism 25 and inner end kiln bar lift mechanism 26. The physical path which the pin bars follow through the machine in the process of making the cap or body will now be generally described. The machine must first be filled with pin bars, as shown in Fig. 2, before the machine is ready to operate. There are times when the machine can be made to function with less than the full complement of pin bars as shown in Fig. 2, as will be mentioned hereinafter. One group of six pin bars will be followed through the whole process for explanatory and illustrative purposes, and the path which this group follows through the machine will be described, but it is to be understood that as this particular group of pin bars is going through each operation to be described, other groups of pin bars are going through the other operations of the process at the same time.

The left-hand end 1 will be used to describe the flow path of the process and it will be remembered that the same flow path is taking place in the right-hand end 2 of the machine. Six pin bars at one time with their pin ends in a downward position are dipped into the liquid gelatine contained in the dipping tank assembly 10a by the left-hand dipping mechanism, not shown, and are then raised up to the level of track 27. The bar pusher mechanism 28 then operates to push the group of pin bars on to the turntable mechanism 29. The turntable mechanism revolves three and one-half revolutions and stops in a horizontal position again and this puts the pin bars in a position with the pin ends up in preparation for their entrance into the kiln unit 5. The other end kiln bar lift mechanism 23 travels up and down between adjacent levels of the fixed kiln tracks 20. The outer end kiln bar pusher mechanism 22 has a reciprocating action which pushes the pin bars on to the group of fixed kiln tracks 20 from the kiln bar lift mechanism 23, and the kiln bar pusher mechanism 22 also pushes the pin bars from the fixed kiln track 20 on to the center bar lift mechanism 24 by virtue of the fact that the fixed kiln tracks 20 always have pin bars on them to start with. The arrows in Fig. 2 indicate the direction in which the reciprocating action of outer end kiln bar pusher mechanism 22 pushes the pin bars on to fixed kiln tracks 20. The outer end kiln bar lift mechanism 23 receives the group of six pin bars from the turntable mechanism 29 and travels up to the level of track 30 and outer end kiln per pusher mechanism 22 pushes the group of six pin bars on to track 30 and thence on to center bar lift mechanism 24. As the outer end kiln bar pusher mechanism 22, outer end kiln bar lift mechanism 23 and center bar lift mechanism 24 continue their movements, the group of six pin bars ascends the various levels of the fixed kiln tracks 20. The arrows indicate the path which the pin bars follow up to the topmost level of fixed kiln tracks 20. When the pin bars have reached that level, the outer end kiln bar pusher mechanism 22 pushes them from the fixed kiln tracks 20 across the center bar lift mechanism 24 and on to the topmost level of fixed kiln tracks 21. The path of descent of the pin bars is also indicated by the arrows and the descending pin bars are actuated along that path by inner end kiln bar pusher mechanism 26 and inner end kiln bar lift mechanism 25 by the same means as previously described for mechanisms 22, 23 and 24. The exit of the pin bars from the kiln unit 5 takes place via the lowest level of the center bar lift mechanism 24 when this mechanism descends to the level of track 31, which is on the same level as track 30. As the pin bars travel through the kiln unit 5, the liquid gelatine which has formed a coating on the pins of the pin bars are subjected to hot, dry air which is of controlled temperature and humidity. The air is circulated through the different levels of the kiln by suitable means in a manner later to be described in detail, but upon the completion of the travel of the pin bars through the entire kiln and upon reaching track 31, the gelatine has solidified and the pin bars travel along track 31 in the direction of the indicating arrow by means of the bar transfer mechanism 32 and the holding detent dog assembly 33. The bar transfer mechanism 32 carries the pin bars one at a time to stripper mechanism 14, and the cap or body portion is stripped from each pin of each pin bar. The formed capsule body or cap portion has, meanwhile, been received by the indexing turret mechanism 15 and the stripped bar is carried by the bar transfer mechanism 32 back down to track 27. The greaser mechanism 19 travels up toward the level of track 27 and receives the pins of the pin bar which is in pin-downward position. The greaser unit 19 greases the pins of the pin bar and cleans and prepares the pin bar for starting the next cycle of operations. In the meantime, as the stripped pin bar is being cleaned and prepared for the start of the next cycle of the complete process, the cap or body which had been received by the indexing turret unit 15 at stripping station 36 is operated upon by knife mechanism 16, when the indexing turret unit indexes ninety degrees to cutting station 34. The knife mechanism 16 cuts the cap or body to the necessary length as it is being held by the collet of the turret at cutting station 34. The indexing turret unit 15 then indexes another ninety degrees to the joiner station 35, where the cap or body is ejected by suitably provided placement rods from the collet of the indexing turret unit 15 to the joiner mechanism 17. The joiner mechanism 17 receives both portions of the capsule from both ends of the machine and joins them together and ejects them by means of an air blast on to the conveyor mechanism 18, which carries the completed assembled capsule out toward the front of the machine to complete a production cycle.

*Main drive transmission*

Referring to Fig. 1b, the transmission for the capsule making machine consists of a centrally located conventional speed reduction unit 37, which is driven by an electric motor of one horse power through belt pulley 38. The speed reduction unit 37 is longitudinally mounted so as to drive the left and right longitudinal drive shafts which run from the center of the machine towards the left and right-hand ends, respectively. The left-hand longitudinal drive shaft 40 is driven by speed reduction unit 37 through coupling 39 and the right-hand longitudinal drive shaft 41 is driven through coupling 42 in like manner. Thus, both the right-hand and left-hand ends of the machine are driven by one motor, as previously indicated. Located immediately to the right of the center line of the machine, a conventional gear box 43 is mounted and this gear box contains the gear 44 which drives transverse shaft 45 through spur gear 46. Spur gear 47, which is driven by transverse shaft 45, drives the transverse shafts 48 and 49 through idler spur gears 50 and 51 which, in turn, drive the left-hand turret indexing shaft 52 and the right-hand turret indexing shaft (not visible). It is through these latter two shafts, the left-hand turret indexing shaft 52 and the right-hand turret indexing shaft, that the complete turret unit, the knife mechanism and the conveyor mechanism are actuated. Transverse shaft 48 carries the joiner actuator cam which actuates the joiner mechanism 17. Located to the left of coupling 39 are conventional gear boxes 53, 54 and further along the longitudinal drive shaft 40 is gear box 55. It is through these gear boxes that the other mechanisms of the machine are driven, with the exception of the dipping tank assembly 10a, which has a separate electric driving motor and speed reducing unit to drive the gear pump which will later be described in full. Contained in greaser drive gear box 53 is driving bevel gear 56 and driven bevel gear 57 which drive the greaser spindles in a rotary motion. Worm gear 58 contained in gear box 54 drives transverse shaft 59 through spur gear 60, and transverse shaft 59, in turn, drives transverse shafts 61, 62 and 63 through spur gears 64, 65 and 66, respectively. Transverse shaft 63 is the inner end kiln bar pusher mechanism actuating shaft which actuates the inner end kiln bar pusher mechanism 25, and transverse shaft 62 is the dipping mechanism actuator shaft, which actuates the left-hand dipping mechanism (not visible). Transverse shaft 61 drives the inner end bar lift actuating shaft 67 through mutilated gear 68 and spur gear 69. This arrangement drives the inner end bar lift mechanism 26. Transverse shaft 63 drives greaser and stripper actuator shaft 70 through spur gears 71 and 72. Transverse shaft 62 drives bar pusher mechanism actuator shaft 73 and center bar lift mechanism actuator shaft 74 through mutilated gear 75 and spur gears 76 and 77, respectively. Worm gear 78 contained in gear box 55 drives transverse shaft 79, through spur gear 80, and the transverse shaft 79, in turn, drives the outer end kiln bar pusher mechanism actuating shaft 81, which serves to actuate the outer end kiln bar pusher mechanism 22. Transverse shaft 79 also drives transverse shaft 82 which, in turn, drives the outer end bar lift mechanism actuator shaft 83. This is accomplished through the use of mutiliated gear 84 and spur gear 85. Transverse shafts 81 and 82 are driven by transverse shaft 79 through spur gears 86 and 87, respectively. Transverse shaft 82, through a series of idler gears later to be described, drives the turntable mechanism 29. This comprises the complete main drive transmission for the left-hand end of the machine and, in like manner, the right-hand end of the machine and its mechanisms are also driven through the use of the right-hand longitudinal drive shaft 41 and duplicate gears, gear boxes and transverse shafts the same as those already described. Referring to Figs. 57 and 59, the control for the starting and stopping of the main drive motor is provided for by starting button 88 and stopping button 89 on control panel 8. Pilot light 90, on control panel 8, lights up when the main drive starting button 88 is pushed. The main drive motor is also equipped with an automatic safety overload device, which is schematically represented by overload limit switches 91 and 91a, which will stop the main drive motor in the event of overloading of the machine. The main motor is also equipped with a brake stop to bring the motor to an instantaneous stop. This is schematically represented by plugging switch 92.

*Mechanisms, their cycles and timing*

In describing the operational cycles of the different mechanisms of the capsule making machine, it can be stated that one complete operational cycle of the joiner mechanism 17 is equivalent to one complete operational cycle of the capsule making machine. As the end point of one complete operational cycle of the capsule-making machine, there is an output of complete capsules received from the machine. In other words, every time the joiner mechanism operates through one complete cycle, the entire capsule-making machine has operated through one complete cycle, and the output of completed capsules is received directly from the joiner mechanism 17 by the conveyor mechanism 18, which is continuously operating, and the conveyor mechanism carries the completed capsules from the machine. Referring to Fig. 59, the timing of the operational cycle of the joiner mechanism is schematically represented to show its travel from its extreme down position to its extreme up position through six cycles. The reason for the representation of six cycles of the joiner mechanism is that six cycles of the joiner mechanism and the equivalent six cycles of the capsule-making machine cover a period of time in which other intermittently operating mechanisms have gone through only one complete operational cycle of their own in that time period. Fig. 59 illustrates schematically all the operating mechanisms that either operate with intermittent movements during the time period of six cycles or operate through a period of one cycle with intermittent motions within its one cycle time period. Other mechanisms, such as the conveyor mechanism which operates continuously without any intermittent stops and starts of motion, are not represented. An example of one of the mechanisms whose intermittently operating mechanism operates through only one complete operational cycle during the time period of six machine cycles, is the dipping mechanism 9, which will be the first mechanism to be described hereinafter in detail. The reason why some mechanisms operate through only one complete operational cycle, while other mechanisms are operating through six complete operational cycles in the same time period, is that there are mechanisms which handle six pin bars at one time in a particular phase of the capsule-making process, and there are mechanisms which handle one pin bar at one time in a particular phase of the capsule-making process. In order for the process to be continuous and regular, the mechanisms that handle one pin bar at one time in a particular phase of the process operate six times in the period of time that a mechanism which handles six pin bars at a time in a particular phase of the capsule making process operates. This will be more fully understood and appreciated from a consideration of the machine as a whole and from the detailed descriptions of the various mechanisms or units which follow.

*Dipping mechanism*

Referring to Figs. 1, 3, 4, 5 and 6, the purposes of the dipping mechanism is to carry six pin bars at one time with the pin ends of the pin bar in a downward position from the level of horizontal track 27a, down into the dipping tank assembly 10, so that the pin ends are immersed in the liquid gelatine, and then carry those same six pin bars back up to the level of horizontal track 27a. The pins on these six pin bars then have a thin coating of liquid gelatine on them. As has previously been shown, by reference to Fig. 2, these six pin bars have traveled along horizontal track 27 in the direction of the arrow, from the greaser mechanism 19, with the aid of the bar pusher mechanism 28. It is the same mechanism, namely, the bar pusher mechanism 28, which pushes the six pin bars which have been dipped into the dipping tank assembly 10, by the dipping mechanism 9, towards and on to the turntable mechanism 29. The dipping mechanism 9 is divided into the dipping actuating linkage and the dipping lift. The dipping actuating linkage consists of the dipping mechanism actuating shaft 62a, which is continuously rotating and driven from the main longitudinal drive, as previously described, the dipping cam 93, cam roller 94 on adjustable dipping cam connecting rod 95, dipping bell crank 96, pivoting on stud 97, dipping link 98 and dipping rocker arm 99 on the main dipping shaft 100. The dipping lift consists of the dipping pinion gear 101, on main dipping shaft 100, and geared to gear 101 is dipping-in gear 102. Gears 101 and 102 are, respectively, geared to dipping lift racks 103 and 104. These racks are suitably mounted in slots in the main frame to allow their travel up and down in such slots. Mounted horizontally across the bottoms of racks 103 and 104 by screws is the dipping bar bridge 105, which is constructed with a flat track 106, upon which the ends of the pin bars 13, 13a, 13b, 13c, 13d and 13e rest. A similar dipping bar lift on the opposite side of the machine has a similar dipping bar bridge with a flat track which supports the other ends of the six pin bars. In this manner, the six pin bars resting on both flat tracks of the opposite dipping bar lifts, are raised and lowered into and out of the dipping tank assembly unit 10. Referring particularly to Fig. 4, the dipping mechanism 9 functions in this manner: When cam roller 94 is on the high point of the dipping cam 93, the dipping lift is in its raised position and the dipping bar bridge 105 is on the same level as horizontal track 27a, and the pin bars 13—13e are pushed on to the dipping bar bridge 105 by the bar pusher mechanism 28. As the dipping actuating shaft 62a continuously rotates, dipping cam 93 rotates and cam roller 94, which is held in contact with the cam surface by suitable means follows the contour of the dipping cam 93. This causes adjustable dipping cam connecting rod 95 to pivot dipping bell crank 96 in a counter-clockwise direction, which causes dipping link 98 to pivot rocker arm 99 and pivot the main dipping shaft 100 in a clockwise direction. Referring now particularly to Fig. 3, the main dipping shaft 100 has been actuated to rotate in a counter-clockwise direction because of the movement of rocker arm 99. Gear 101, which rotates with shaft 100, also rotates in a counter-clockwise direction. By virtue of its being geared to gear 102, gear 101, will impart a clockwise rotation to gear 102. Gears 101 and 102 impart a downward movement to racks 103 and 104, which lower dipping bar bridge 105 and the pin bars 13—13e, which are on the dipping bar bridge 105, down into the dipping tank assembly 10, for the pins on the pin bars to acquire their coating of liquid gelatine. As dipping actuator shaft 62a continues to rotate, the dipping mechanism approaches the completion of its operational cycle and as cam roller 94 again reaches the high point of dipping cam 93, the dipping bar bridge 105 has again been raised to the same level as horizontal track 27a. Upon the completion of the operational cycle of the dipping mechanism 9, the bar pusher mechanism 28 begins its operational cycle and the bar pusher mechanism 28 functions to push the six pin bars that have just been dipped into the liquid gelatine by dipping mechanism 9 from the dipping mechanism 9 to the turntable mechanism, and at the same time push six more pin bars on to dipping bar bridge 105 for dipping. The dipping mechanism is controlled by a push button on control panel 8. The dipping operation on each end of the machine can be controlled separately, or the dipping operation for both ends can both be controlled together. This is accomplished by the dipping control solenoid 107, which is mounted on bracket 109 and located below the adjustable dipping connecting rod 95. When the solenoid control rod 108 is out in the position shown in Fig. 5, by virtue of a manual or automatic control to stop the dipping operation, the connecting rod 95 is held in its raised position and not allowed to travel downward, and the cam roller 94 no no longer follows the cam surface of dipping cam 93. As the lowering of the dipping lift is caused by the downward travel of connecting rod 95 and the solenoid control rod 108 is preventing the downward travel of connecting rod 95, the dipping mechanism is held from operating, although the rest of the machine can and does continue to operate. There are thus manual and automatic controls for controlling the operation of the dipping mechanism 9. The manual controls will now be described and the automatic controls will be described in detail in conjunction with the dipping tank assembly 10.

Referring to Figs. 57 and 58, push button 110 is the manual starting button which, upon actuation, will start the operations of both dipping mechanisms on both ends of the machine by controlling solenoid rod 108 (Fig. 5) and a similar solenoid control rod at the other end of the machine. If the circumstances warrant running the dipping mechanism for the cap only, stop button 111 is pushed to stop the dipping mechanism for the body portion of the capsule. If the dipping mechanism for the body portion of the capsule is required to operate, the stop button 110 is pushed, which will stop the dipping mechanism for the body portion of the capsule through control solenoids 107 or 107a, whichever is applicable. When the machine is to be started and only one dipping mechanism on one end of the machine is to be run, the starting button 110 must first be pressed, which will start both dipping mechanisms on both ends of the machine, and then the dipping mechanism which is to be halted is to be stopped by pressing either stop button 111 or 112, whichever is desired to be stopped. The temperature and viscosity of the liquid gelatine are controlling factors which automatically control the starting and stopping of the dipping mechanisms. If either the temperature or viscosity vary from the suitable or required norm, the automatic controls stop the dipping until the temperature and viscosity are brought back to the proper values. The units which control the starting and stopping automatically will be described in conjunction with the dipping tank assembly 10.

*Dipping tank unit*

Referring to Figs. 7, 8 and 9, the purpose of the dipping tank unit 10 is to supply to the capsule-making process an open bath of liquid gelatine controlled for temperature and viscosity. The dipping tank unit 10 is located directly beneath the dipping bar bridge 105 (Figs. 3 and 4) of the dipping mechanism 9. The dipping tank assembly is mounted transversely on the front and rear main frames 3 and 4, as shown. The rear end of the dipping tank unit 10 rests upon flat open shelf 113 of the rear main frame 4, and the front end of the dipping tank unit 10 rests upon a similar flat open shelf 114 of the front main frame 3. Mounted upon the face of the front main frame 3, directly below flat open shelf 114, is the gear pump electric drive motor 115, which drives gear reduction unit 116 through shaft coupling 117. The construction of the dipping tank unit 110 consists of a tank 118, with an inside wall 119, which forms a closed space on all four sides of the tank, and the bottom which is the water-jacket 120. This water-jacket is filled with water through water feed hold 121 in the water jacket. Sealed into the water-jacket and electrically connected are two electrical water immersion heaters 122 and 122a. Also sealed into the water jacket is a thermostat 123. Mounted upon the inside floor 124 are front end mountings 125 and 125a and rear end mountings 125b and and 125c. Disposed on these mountings is a conventional gear pump 126 of known construction with the front end 127 thereof resting on mountings 125 and 125a, and with the rear end 128 resting on mountings 125b and 125c. The gear pump 126 includes a housing 129 and gear shafts 130 and 131. Mounted atop gear housing 129 of the gear pump is a rectangularly shaped four-walled tank 132 with an open top 133 and an open bottom. The cavity 134 of the tank 118 which gear pump 126 is resting in and the four-walled open bottom tank 132 are the portions of the tank assembly which hold the liquid gelatine. Sealed into this cavity is a thermostat control 135 and a thermometer 136. Coupled to gear shaft 130 of gear pump 126 is output shaft 137 of gear reduction unit 116. Input shaft 138 of the gear reduction unit 116 is driven through shaft coupling 117 by an electric motor 115. Seal 139 prevents the liquid gelatine from entering the gear reduction unit 116 through the opening through the water jacket 140, which leads directly into the gear reduction unit. The dipping tank unit functions in the following manner: The gelatine gear pump 126, which has a separate electric motor drive 115, drives the gelatine gear pump 126 through coupling 117 and gear reduction unit 116 and causes revolving of the gear shaft 130, which is coupled to output shaft 137 of the gear reduction unit 116. This allows gear shaft 130 to revolve in a clockwise direction and gear shaft 131 to revolve in a counter-clockwise direction. When the gelatine tank 118 is filled with liquid gelatine and the gear pump is started, there will be a flow of liquid gelatine such as is indicated by the arrows in Fig. 9. Gear pump 126 will continue to force the liquid gelatine flow in this manner and it will cause tank 132 to be always filled with liquid gelatine and, in fact, cause an overflow over the top of the tank 132, as indicated by the arrows. This will ensure a constant level of liquid gelatine at the point where the dipping mechanism will be dipping the pin bars into the liquid gelatine. In this manner no matter where the level of the liquid gelatine is in the cavity 134 of tank 118, the function of the gear pump 126 will always maintain the necessary level of the liquid gelatine in tank 132. This will allow the pins of the pin bars to be dipped to a precise depth at all times no matter how little or how much liquid gelatine is contained in dipping tank unit 10. The control of the dipping tank unit is accomplished by means of push-buttons located on control panel 8 as illustrated in Fig. 57. Each dipping tank assembly unit can be controlled separately. The group of buttons on the upper left-hand end of the control panel 8 controls the dipping tank unit at one end of the machine and the group of buttons on the upper right-hand end of control panel 8 controls the dipping tank unit at the other end of the machine. In this way, the starting and stopping of the gelatine gear pump is controlled. There are automatic controls embodied in the dipping tank assembly unit which can be set for starting and stopping the dipping mechanism and hence the dipping operation, through the control of the position of the solenoid control rod 108 of dipping control solenoid 107, as illustrated in Fig. 5. These automatic controls comprise the liquid thermometer 136 and the liquid thermostat control 135, which are in the bath of liquid gelatine. These controls are set to keep the liquid gelatine bath at a particular temperature and hence at a particular viscosity also. This is automatically set by turning the three-way switch 141 and 142 on control panel 8 to the "automatic" position. This will then set the automatic controls to control the starting and stopping of the dipping operation. This is accomplished through the energizing and de-energizing of the dipping control solenoid 107 by controlling its circuits through a series of relays that the thermostat 135 controls. The thermostat 123 controls the circuit of the electric immersion heaters 122 and 122a which heat the water in the water-jacket of tank 118 and the water, in turn, heats the liquid gelatine. By controlling the circuits of the water immersion heaters 122 and 122a and the circuits to dipping control solenoid 107, the dipping mechanism can be stopped when the temperature of the liquid gelatine is not suitable for the dipping operation and the water immersion heaters turned on to heat the gelatine and bring the temperature back to the value at which it will be suitable for dipping. Figs. 58a–c illustrate schematically the circuits involved in these automatic controls.

Turnable mechanism

Referring to Figs. 10, 11 and 12, the purpose of the turntable mechanism 29 is to receive the six pin bars which have just been dipped in the dipping tank unit by the dipping mechanism with the pin ends in a down position and to revolve them about, so that in leaving the turntable mechanism the ends of the pins of the pin bars are then in an upward position. Another purpose of the turntable mechanism is to revolve the six pin bars which have just been dipped into the liquid gelatine so that the liquid gelatine which has adhered to such pins will acquire uniform thickness all about the cylindrical surface of the pins while the gelatine is still in liquid form. The turntable mechanism receives from the dipping mechanism the six pin bars which have been dipped. The pin bars are pushed along track 27 by the bar pusher mechanism 28, as shown in Fig. 1d. The turntable mechanism 29 is then revolved three and one-half (3½) revolutions and stops again. At this time the bar pusher mechanism 28 pushes six more pin bars, which have just been dipped by the dipping mechanism, into the turntable mechanism and the six pin bars which have just been revolved by the turntable mechanism are pushed out of the turntable mechanism by the six incoming pin bars and onto the outer end kiln bar lift mechanism 23 (Fig. 1d). The turntable mechanism 29 is provided with a spur gear 143, which is suitably mounted on shaft 144 in the rear main frame 4 in order for it to revolve. Bars 145 and 145a are screwed on to the face of spur gear 143 to form slot 146 into which the bar pusher mechanism pushes one end of the group of six pin bars. Similarly mounted in front main frame 3 is a duplicate to spur gear 143 with duplicate bars forming a slot into which the bar pusher mechanism pushes the other end of the group of six pin bars at the same time. Below the center line of spur gear 143 there is mounted a half-circular-shaped retainer 148, which is screwed into the inside face of rear main frame 4 but spaced far enough away from the face of the rear main frame 4 in order for idler spur gear 149 to be engaged with spur gear 143. Transverse shafts 150 and 151 are suitably mounted in rear main frame 4 and their other ends are mounted in front main frame. On transverse shafts 150, 151, 82 and 83, there is mounted a gear train which drives spur gear 143 through mutilated gear 84 and spur gears 85, 154, 153, 152 and 149. Referring particularly to Fig. 12, the turntable mechanism 29 functions in the following maner: The turntable mechanism is initially in a stationary horizontal position so that slot 146 is in a horizontal position and in line with horizontal track 27. The bar pusher mechanism pushes the six pin bars, which have just been dipped, along track 27 into slot 146. The pin bars are then in the position shown in Fig. 10. The timing is such that, at this point, mutilated gear 84 engages spur gear 85 and through the previously described gear train revolves gear 143 in a counter-clockwise direction for three and one-half revolutions. At the end of the three and one-half revolutions, the mutilated gear 84 has been disengaged from spur gear 85 and slot 146 is again in a horizontal position in line with track 27, with the pin bars in the position shown in Fig. 12. In order to prevent the pin bars from slipping down out of the slot as the gear 143 revolves, the half circular retainer 148 holds the pin bars from slipping by retaining the face of the outer edge of the pin bar on its inside face 147 throughout the operation. The cycle of the operation of the turntable mechanism is now complete and the bar pusher mechanism pushes the next group of pin bars into the slot 146 and, at the same time, pushes the group of pin bars, which have just been revolved, out of the turntable mechanism and on to the outer end kiln bar lift mechanism 23.

Kiln bar lift mechanisms

The capsule-making machine is provided with six kiln bar lift mechanisms, three of which make up the group in the left-hand end of the machine in the left-hand kiln unit 5 and the other three of which make up the group in the right-hand end of the machine in the right-hand kiln unit 6. As has previously been described, the three kiln bar lift mechanisms in the left-hand kiln unit 5 are the left-hand outer end kiln bar lift mechanism 23, the left-hand inner end kiln bar lift mechanism 26 and the left-hand center bar lift mechanism 24. The duplicate group of kiln bar lift mechanisms, which are in the right-hand kiln unit 6, are the right-hand outer end kiln bar lift mechanism 23a, the right-hand inner end kiln bar lift mechanism 26a and the right-hand center kiln bar lift 24a. The construction of these six kiln bar lift mechanisms is all exactly alike except in the few minor respects which will be described hereinafter. The function of the kiln bar lift mechanism will be described with the operation of the left-hand kiln unit 5. The construction and operation of the right-hand outer end kiln bar lift mechanism 23a will now be described.

Referring to Figs. 13, 14, 15 and 16, the construction of the right-hand end kiln bar lift mechanism 23a is made up of crank arm 155 mounted to turn with bar lift mechanism actuator shaft 83a, link 156, lift carrier 157, bar lifts 158, 158a and bar lifts 158b–158h, not shown in these views. The bar lift 158 is formed to have an open shelf 159 on which the end of the pin bars will rest. The operation of the bar lift mechanism is as follows: The bar lift mechanism is in its downmost position with open shelf 159 in line with the slot 146a in the right-hand turntable mechanism, which is equivalent to slot 146 in the turntable mechanism 29, shown in Fig. 12, and mutilated gear 84a on transverse shaft 82a, which is driven from the main drive, the same as was described for the left-hand end of the machine, engages gear 85a, on bar lift mechanism actuator shaft 83a, and crank arm 155, which was in the position as shown in Fig. 13, revolves to the position shown in Fig. 14. Crank arm 155 raises lift carrier 157, through link 156, to the up position of kiln bar lift mechanism. When the entire mechanism is in the up position, open shelf 159, of bar lift 158, is in line with the horizontal track 38a, not shown, which is equivalent to horizontal track 30, shown in Fig. 1. At this point, mutilated gear 84a leaves the engagement of spur gear 85a and the mechanism dwells in the up position. The further revolution of shaft 82a will again allow the teeth on mutilated gear 84a to engage gear 85a, which will revolve shaft 83a another one hundred and eighty degrees back to its starting point, which will lower the bar lift mechanism to its down position through the mechanism just described. The kiln bar lift mechanism operates at all times when the capsule-making machine is operating. There is a control mechanism embodied in the left-hand outer end kiln bar lift mechanism 23 and in the right-hand outer end kiln bar lift mechanism 23a, which controls the reciprocating movements of the left-hand outer end kiln bar pusher mechanism 22 and the right-hand outer end kiln bar pusher mechanism 22a, respectively. The control mechanism is made up of a forked arm 160, mounted on lift carrier 157, which moves up and down with the movement of the lift carrier. This forked arm 160 embraces sliding coupling 161 which is slidably mounted on shaft 162 of the kiln bar pusher mechanism 22a. Sliding coupling 161 is keyed to shaft 162, by means of key 163, so that sliding coupling 161 will revolve with the reciprocating movement of shaft 162. Stationary coupling 164 is rigidly mounted on the end of shaft 165. The control mechanism operates to engage and disengage sliding coupling 161, on shaft 162, with stationary coupling 164. It is clearly seen that as the kiln bar lift mechanism reaches its up position, the sliding coupling 161 will have been carried up by forked arm 160 to engage with stationary coupling 164, and as the bar lift mechanism travels to its down position, sliding coupling 161 will have been disengaged from stationary coupling 164 by being carried down away from it by the said forked arm 160. The operation which this mechanism controls will be further understood from the description of the kiln bar pusher mechanism. In general, however, this control mechanism acts to eliminate a blank stroke of the kiln bar pusher mechanisms.

*Kiln bar pusher mechanisms*

There are four kiln bar pusher mechanisms in the capsule-making machine. Two of these mechanisms make up the group in the left-hand end of the machine in the left-hand kiln unit 5 and the other two make up the group in the right-end of the machine in the right-hand kiln unit 6. Referring to Figs. 1 and 2, as has previously been described, the two kiln bar pusher mechanisms in the left-hand kiln unit 5 are the left-hand outer end kiln bar pusher mechanism 22 and the left-hand inner end kiln bar pusher mechanism 25. The duplicate group of kiln bar pusher mechanisms in the right-hand kiln unit 6 are the right-hand outer end kiln bar pusher mechanisms 22a and the right-hand inner end kiln bar pusher mechanism 25a. The construction of all four of these kiln bar pusher mechanisms is exactly alike, except only that the left-hand outer end kiln bar pusher mechanism 22 and the right-hand outer end kiln bar pusher mechanism 22a have nine pusher arms with their rollers mounted below said pusher arms and the left-hand inner end kiln bar pusher mechanism 25 and the right-hand inner end kiln bar pusher mechanism 25a have eight pusher arms with their rollers mounted above the pusher arms and spaced away from the pusher arms by means of a spacer element. The function of the kiln bar mechanism will be described in connection with the operation of the left-hand kiln unit 5.

The construction and operation of the right-hand outer end kiln bar pusher mechanism will now be described. Referring to Figs. 17, 18, 19, 20 and 21, the right-hand outer end kiln bar pusher mechanism 22a comprises crank arm 166 which is mounted to turn with kiln bar pusher mechanism actuator shaft 81a and link 167, attached by a universal socket joint to arm 168, which is locked on shaft 162. Shaft 162 is suitably mounted in bearings in housings 171 and 172 mounted on the front face of the front main frame 3. Near the upper end of shaft 162 there is a sliding coupling 161 which is keyed to shaft 162 but still mounted in such a manner that it can slide downwards and upwards on shaft 162 upon actuation of worked arm 160, and key 163 will effect sliding coupling 161 to follow the rotating movement of shaft 162. Mounted on the side of sliding coupling 161 is the bar 170. Shaft 165 is suitably mounted in the horizontal ledge 172 of the front main frame 3 so that it can rotate. At the lower end of shaft 165, below horizontal ledge 172, there is rigidly mounted a coupling 164, and this coupling has bar 169 mounted on its side. Pusher arm 173 is mounted on shaft 165 and locked on to turn with said shaft. On the end of pusher arm 173 there is a roller 174. Mounted above pusher arm 173 are eight additional similarly constructed and arranged pusher arms 173a to 173h (Fig. 1d) which are evenly spaced one above the other and locked to turn with shaft 165. The operation of the right-hand outer end kiln bar pusher mechanism 22a is as follows: Crank arm 166 revolves with actuator shaft 81a which is driven from the main drive in similar manner to actuator shaft 81, previously described. As the crank arm revolves through three hundred and sixty degrees of revolution, link 167 has traveled back and forth in a crank motion and has effected a reciprocating motion in shaft 162, through arm 168. Figs. 18 and 19 show the mechanism in its extreme positions of reciprocatory movement. With sliding coupling 161 on shaft 162 engaged with coupling 164 on shaft 165 the reciprocating motion of shaft 162 is carried through to shaft 165, and pusher arms 173–173h all reciprocate from one extreme position to the other, these positions being shown in Figs. 18 and 19. The function of the kiln bar pusher mechanisms will be described in conjunction with the function of the left-hand kiln unit 5. The control mechanism which was described with the outer end kiln bar mechanism 23a and which controls the reciprocating movement of the outer end kiln bar pusher mechanism 22a will now be described in operation. When forked arm 160 brings up sliding coupling 161 to engage with coupling 164, shaft 165 reciprocates with shaft 162 but when the forked arm 160 brings sliding coupling 161 down and disengages it from coupling 164 then shaft 165 remains stationary while only shaft 162 reciprocates from the actuating mechanism. The relative timing of the outer end kiln bar mechanism 22a and the outer end kiln bar mechanism 23a necessitates the addition of bars 169 and 170 as will be appreciated. As the kiln bar lift mechanism 23a reaches its uppermost position, the outer end kiln bar pusher mechanism begins its reciprocating movement from the position shown in Fig. 18 to the position shown in Fig. 19. At this time, couplings 161 and 164 are engaged and the reciprocating motion of shaft 162 is carried through the shaft 165 and the pusher arms have reached the position shown in Fig. 19. At this point in the relative timing of cycles of the mechanisms, the outer end kiln bar lift mechanism 23a begins its descent to its lowermost position. As soon as it begins its descent, the couplings 161 and 164 are disengaged and it is the function of bars 169 and 170 to return shaft 165 and pusher arms 173 to their original positions as shown in Fig. 18. As clearly shown in Figs. 17 and 20, bar 170, which turns with coupling 161 on shaft 162 and travels downward with sliding coupling 161, nevertheless remains in contact with bar 169. Because of the length of the bar 169 and by virtue of the contact of the respective faces of bars 169 and 170, the return reciprocating motion of shaft 162, from the position shown in Fig. 19 to the position shown in Fig. 18, carries shaft 165 and pusher arms 173–173h back to the positions also shown in Fig. 18. This occurs during the functioning cycle of the outer end kiln bar pusher mechanism 22a, but the relative timing of the two mechanisms is such that the kiln bar pusher mechanism 22a goes through two complete reciprocating cycles while the outer end kiln bar lift mechanism 23a goes through only one complete cycle. The purpose of this control mechanism is to eliminate one stroke of the pusher arms 173–173h, that is, the control mechanism functions to hold pusher arms 173–173h in the positions shown in Fig. 18, as the rest of the bar pusher mechanism goes through a reciprocating motion. This is achieved when the outer end kiln bar lift mechanism is dwelling in its down position and the outer end kiln bar pusher mechanism 22a is going through the second reciprocating motion of its cycle. At this time, the sliding coupling 161 is completely disengaged from coupling 164 but bars 169 and 170 are still in contact with each other but, as is clearly shown in Fig. 21, bar 170, moving with the reciprocating stroke of shaft 162, moves in a counter-clockwise direction away from bar 169 and does not disturb it, nor does it disturb the position of shaft 165 or pusher arms 173–173h. When the reciprocating motion is complete, the bars 169 and 170 are back in the positions shown in Fig. 20. The function of this control mechanism will be more fully understood from the description of the operation of the left-hand kiln unit 5.

Kiln units

There are two kiln units in the capsule-making machine, the left-hand kiln unit 5 in the left-hand end of the machine and the right-hand kiln unit 6 in the right-hand end of the machine. The left-hand kiln unit 5 handles one portion of the capsule, either the body or the cap, and the right-hand kiln unit handles the other portion of the capsule. The purpose of the kiln unit is to solidify the liquid gelatine coating on the pins of the pin bars by means of circulating hot dry air controlled as to temperature and humidity. Different size capsules have different drying times; that is, the time that it takes for the liquid gelatine to solidify on the pins of the pin bars varies according to the particular capsule being made. There is provision in the machine to take care of this time variance and the same will be described below. The function of the left-hand kiln unit 5 will now be described, and also, in conjunction with the description of the kiln unit 5, the left-hand outer end kiln bar pusher mechanism 22, the left-hand inner end bar pusher mechanism 25, the left-hand outer end bar lift mechanism 23, the left-hand inner end bar lift mechanism 26 and the left-hand center bar lift mechanism 24 will also be described, as they all function together as a unit within the kiln unit to move the dipped in bars through the whole kiln. All these mechanisms just mentioned handle a group of six pin bars at one time and one cycle of operation of these mechanisms covers a time period of six machine cycles.

The construction of the left-hand kiln unit 5 is as follows: Referring now to Fig. 30, the kiln unit is enclosed by a cover 7 which embodies a front main air conduit 183, a rear main air conduit 180, branch air conduits 181–181h, branching off from the rear main air conduit 180, and branch air conduits 182–182g, branching off from the front main air conduit 183. Contained in selected branch air conduits, are air heater units 184–184e. The front and rear branch air conduits are alternated in height in such a manner that air blown through the front and rear main conduits 183 and 180 will cause a circulation of air in the manner indicated by the arrows. Opposite each front branch air conduit is an opening for the exit of the air and, in like manner, there is an opening opposite each rear branch air conduit for the exit of the air. Enclosed by cover 7 is the outer group of fixed kiln tracks 20, which is made up of individual horizontal fixed tracks 177–177p, mounted upon track carriers 185 and 185a. Fixed tracks 177–177p are evenly spaced and parallel to each other. A similar group of fixed kiln tracks, the inner group of fixed kiln tracks 21, are mounted in a similar manner on track carriers 185b and 185c. As previously described, the center bar lift mechanism 24 is located between the inner group of fixed kiln tracks 21 and the outer group of fixed kiln tracks 20. Located to the left of tracks 20 are the outer end kiln bar pusher mechanism 22 and outer end kiln bar lift mechanism 23. Located to the right of the inner group of fixed kiln tracks 21 are the inner end kiln bar pusher mechanism 25 and the inner end kiln bar lift mechanism 26. The operation and function of the kiln unit as a whole will now be described. The dipped pin bars which have been dipped by the dipping mechanism 9a, into dipping tank assembly 10a, and pushed by the bar pusher mechanism 28 into the turntable 29, revolved three and one-half (3½) turns by the turntable mechanism and then pushed out of the turntable mechanism by the bar pusher mechanism into lift 158j of the outer end kiln bar lift mechanism 22, now enters the kiln unit via its travel along track 30 and actually enters the kiln unit 5 at the point where lift 175, of the center bar lift mechanism 24, receives the dipped pin bars from track 30. The travel of the dipped pins from the turntable mechanism to lift 175 of the center bar lift mechanism 24 is accomplished in this manner. Bar pusher 28 has just pushed a fresh group of dipped pin bars into turntable mechanism 29 and pushed out the group of dipped pin bars which has just been revolved by the turntable mechanism onto lift 158j of the outer end kiln bar lift mechanism 23, which was dwelling in its down position waiting to receive pin bars. Fig. 22 illustrates that stage in the cycle. At this point in the cycle, as seen in Fig. 22, lift 175 is in the up position on a level with fixed kiln tracks 177 and 178. Then the outer end kiln bar lift mechanism 23 travels to its extreme up position which brings lift 158j to the same level as horizontal track 30 and the center kiln bar lift mechanism travels to its extreme down position which brings lift 175 to the same level as horizontal track 30, as shown in Fig. 23. The outer end kiln bar pusher mechanism 22 now goes through with its reciprocating action; that is, the mechanism starts in the position shown in Fig. 22 and reciprocates to the position shown in Fig. 23, and roller 174j on pusher arm 173j contacts the edge of the outermost pin bar which is resting on lift 158j and, by virtue of its reciprocating action, pushes those pin bars on to track 30, as shown in Fig. 23. Those same pin bars continue to travel along track 30 towards the center kiln bar lift mechanism 24 by being pushed along by the pin bars coming after them. There is room along track 30 for seventeen pin bars so that when the group of six pin bars comes on to track 30 from lift 158j they are not the same six pin bars that are pushed on to lift 175 of the center kiln bar lift mechanism 24, but this does not change any function or operation. The reason for there being only seventeen pin bars on track 30 instead of the eighteen pin bars as there are on the group of fixed kiln tracks 20 is that there must be room for the lip of the pusher bracket 193 of the bar pusher mechanism 28, when it is in the back position as shown in Fig. 22. The six pin bars that are then pushed on to lift 175 of center kiln bar lift mechanism 24 are then raised on lift 175 to the level of fixed kiln track 177. Fig. 22 illustrates the position lift 175 is in in relation to fixed track 177, lift 158k of outer end kiln bar lift mechanism 23, lift 179 of inner end kiln bar lift mechanism 26 and pusher arm 176 of inner end kiln bar pusher mechanism 25. At the conclusion of the motion that raises lift 175 to that position, pusher arm 176 starts its reciprocating motion, which moves the pin bars which are on lift 175 on to track 177 through the line of pin bars which are between pusher arm 176 and the pin bars on lift 175. This consists namely of the pin bars on lift 179 and on fixed track 178. Referring now to Fig. 2, it can be clearly seen that the continuation of the operation just described for the involved mechanisms that work together as a unit with the kiln unit 5 will cause the described group of six pin bars that came off lift 175 on to track 177 to travel the path indicated by arrows. Assuming at this time that there are pin bars on fixed tracks 177n, 177p, 178n and 178p and on lift 158s of outer end kiln bar mechanism 22, when the described group of six pin bars has reached lift 158s and the said lift 158s which has been raised to the level of fixed track 177p travels along track 177p, until it has gotten on to lift 175h of the center bar lift mechanism 24, the center bar lift mechanism 24 then goes to its upper position, thus raising lift 175h to its illustrated position. Inasmuch as there are no more fixed tracks similar to 177p and 178p at that level for the pins to be pushed on to, at the next cycle of movement of the center bar lift mechanism 24, lift 175h is lowered back down to the level of tracks 177p and 178p and the next group of six pin bars which is coming on to lift 175h pushes the group of six pin bars which were on lift 175h on to track 178p and these pin bars travel down the fixed tracks of group 21.

It is important to note for the understanding of the movement of the pin bars through the kiln unit 5 that the timing of the three kiln bar lift mechanisms is the same but that the center bar lift mechanism 24 gets one hundred and eighty degrees out of phase with the end bar lift mechanisms 23 and 26, which work together. The timing of the cycles of the bar pusher mechanisms 25 and 22 is the same, except for the fact that the automatic control mechanism, which has been previously described, eliminates the blank stroke of the outer end kiln bar pusher mechanism 22 and has no duplicate in the inner end kiln bar pusher mechanism 25, which necessitates the mechanism to go through a blank stroke, that is, the pusher arms reciprocate but, since the lifts of the inner end bar lift mechanism 26 are at their up position, there are no pin bars to push. The operation can be said to proceed in this manner: When the center bar lift mechanism 24 travels to up position and the end bar lift mechanisms 26 and 25 travel to their down positions, the inner end bar pusher mechanism 25 goes through one reciprocating motion, which is its working stroke, and pushes all the pin bars on all the lifts of inner end bar lift mechanism 26 on to fixed tracks of group 21 and, at the same time, pushes all the pin bars that are on all the lifts of center bar lift mechanism 24 on to fixed tracks of group 20, and those pin bars are replaced by pin bars from the fixed tracks of group 21. Also, the bar pusher mechanism at the same time pushes pin bars from fixed track group 20 on to the lifts of the outer end kiln bar lift mechanism 23. Fig. 2 illustrates this working stroke of the bar pusher mechanism 25 after it has just taken place. As can be seen, there has been one complete movement of pins across the whole kiln unit along the levels of fixed tracks 177, 177b, 177d, 177f, 177h, 177j and 177l. It being the case that the outer bar lift mechanism 24 has just been raised to its up position, the pin bars that have just been pushed off the lifts on to the fixed tracks of group 20 are pin bars that are on their way to the upper levels of the kiln, as are the pin bars that have been pushed from the fixed tracks of group 20 on to the lifts of the outer end kiln bar lift mechanism 23, but the pin bars that have replaced those that were on the lifts of center bar lift mechanism 24 are pin bars that are descending the levels of the kiln, and the pin bars that have been pushed from the lifts of the inner end kiln bar lift mechanism 26 on to the fixed tracks of group 21 are also pin bars that are descending the levels of the kiln. At this time, when the inner end kiln bar pusher mechanism 25 is going through its working stroke, the automatic control mechanism, previously described, is operating to keep the pusher arm shaft of the outer end kiln bar pusher mechanism 22 from reciprocating. The next portion of the cycle of the mechanisms in the kiln unit 5 bring the mechanisms into the following positions: center bar lift mechanism 24 in to a down position; outer and inner end bar lift mechanism 23 and 26 in to up positions. This brings all the lifts of all the lift mechanisms to the levels of fixed tracks 177a, 177c, 177e, 177g, 177i, 177k, 177n and 177p. Then when the outer end kiln bar pusher mechanism 22 reciprocates through its working stroke, there is a complete movement of pin bars across the previously mentioned levels of track. It will now be noted that the lifts of the center bar lift mechanism 24 serve a dual purpose and that these lifts not only carry groups of pin bars which are traveling up the levels of the kiln along fixed tracks of group 20 to their next higher level but also carry groups of pin bars which are traveling down the levels of the kiln along fixed tracks of group 21 to their next lower level. This dual action keeps the lifts of the center bar lift mechanism 24 full of pin bars at all times. The end kiln bar lift mechanisms 23 and 26, on the other hand, do not serve such a dual purpose. The lifts of the outer end kiln bar lift mechanism 23 carry pin bars only from the lower position of the mechanism to the upper position of the mechanism and when the lifts return to the lower position they return empty. Similarly, the lifts of the inner end kiln bar lift mechanism 26 carry pin bars only from the upper position of the mechanism to the lower position and when the lifts return to their upper position they return empty. Another observation is made at this time to complete the description of the flow of the pin bars through kiln unit 5. Referring to Figs. 22 and 23, as was previously described, lift 175 of the center bar lift mechanism 24, is the lift which starts the pin bars on their way through the kiln as it receives them from track 30 and delivers them from fixed track 177, which is the first level of the fixed tracks of group 20. It will be noticed that when the lift 175 is in its up position on a level with fixed track 177, the group of pin bars is pushed on to track 177 by the six pin bars which have come off track 178, which is the last level of track of the fixed track of group 21. These are pin bars which have been through the whole kiln and the gelatine on the pins of which has been completely processed.

These pin bars are then ready to be moved to the stripper mechanism 14 shown in Fig. 1d. This is started when lift 175 travels to its down position and this group of pin bars which is ready for stripping is pushed off lift 175 on to track 31 by a group of pin bars which is starting on its passage through the kiln unit 5 via lift 175 of the center bar lift mechanism 24. There is one other facility in the kiln unit 5 to be described and that is the system of camming faces mounted between particular fixed tracks of groups 20 and 21 and the camming faces mounted between the lifts of the center bar lift mechanism 24. The purpose of these camming faces it to prevent any possible jamming of pin bars when the lifts of the various bar lift mechanisms travel from level to level of the fixed tracks of the kiln unit. When the pusher arms of the kiln bar pusher mechanism push the pin bars across from the lifts of kiln bar lift mechanisms on to the fixed tracks and also from the fixed tracks to either the lifts of the center bar lift mechanism or the end bar lift mechanisms, the pin bars may not be pushed far enough along in order for the pin bars on the fixed tracks to clear the edges of the lifts as in the case of the oncoming center kiln bar lift mechanism or for the pin bars on the lifts of the kiln bar mechanisms to clear the edges of the fixed tracks which the lifts are approaching. This danger of jamming is eliminated by the addition of these camming faces which are herein described. Referring to Figs. 28 and 29, cams 187, 187a and 187b are mounted on track carrier 185 between particular fixed tracks, as shown, to work with the outer kiln bar mechanism 23. Cams 188, 188a and 188b are mounted on track carrier 185c between particular fixed tracks, as shown, to work with the inner end kiln bar mechanism 26. Cam 187b, for example, is mounted between fixed tracks 177d and 177e. This cam serves fixed tracks 177d and 177e with lift 158m, which carries pin bars from the level of the fixed track 177d to the higher level of fixed track 177e. In the movement of the outer end kiln bar mechanism 23, lift 158m travels only between the levels of fixed tracks 177d and 177e. Similarly, cam 188b, which is mounted between fixed tracks 178d and 178e, serves fixed tracks 178d and 178e with lift 179b. In the movement of the inner end kiln bar lift mechanism 26, lift 179b travels only between the levels of fixed track 178d and 178e. Bars 189 and 190 are integrally mounted with the lifts of the center bar lift mechanism 24 and cam faces 191, 191a, 191b, and 191c are provided on bars 189. Similar cam faces are also provided on bar 190. The cam faces on bar 189 serve the fixed tracks of group 20 of the kiln unit and the cam faces on bar 190 serve the fixed tracks of group 21 of the kiln unit. Cam faces 191a and 191b work with lift 175b of the center bar lift mechanism 24 to serve fixed tracks 177c and 177d. Cam face 191a serves fixed track 177c and cam face 191b serves fixed track 177d. Lift 175b, in the movement of the center kiln bar mechanism 24, travels between the levels of fixed tracks 177c and 177d. It is important to note at this time that there is a space 192 between the corresponding edges of the lifts of the outer end kiln bar lift mechanism 23 and a space 193 between the corresponding edges of the lifts of the inner end kiln bar lift mechanism 26. There are also spaces between corresponding edges of both sides of the lifts of the center bar lift mechanism 24. These spaces are provided so that the reciprocating movements of the kiln bar pusher mechanisms need not be as precise as they would have to be if these spaces were not provided. Hence, in the operation of the kiln, when the inner end kiln bar pusher mechanism 25, not shown in Fig. 28, pushes the pin bars to the position shown in Fig. 28, if the reciprocating movement of that mechanism was inaccurate in its movement of pin bars to their position shown in Fig. 28, that movement could vary more or less an amount equal to that of the space 194 and still not cause any jamming upon the movement of the lift mechanism to other levels. In the operation of such a complex machine, it is expected that a movement such as the reciprocating movement of the bar pusher mechanisms may vary slightly during continuous or prolonged operation, and the cam faces represent a safety factor or device to take care of the same. When the pin bars have reached the position shown in Fig. 28, the kiln bar lift mechanisms 23, 24 and 26 move to their alternate positions and, as they move, the cam faces move the pin bars over in order to clear the pin bars on the fixed tracks which the lifts are approaching. The camming operation of cam 187b will first be described in detail. In Fig. 28, the pin bars have just been pushed on to lift 158m while on the level with fixed track 177d. Lift 158m must then travel to its up position on the level of fixed track 177e, as shown in Fig. 29. As lift 158m travels upward, the pin bars are cammed over toward the outer edge of lift 158m by cam 187b until the inner edge of the innermost pin bar rests in its final position as shown in Fig. 29, and these pin bars, by virtue of their being cammed over by cam 187b, are completely clear of both the edge of the fixed track 177e and also of the pin bars which are resting on the said fixed track 177e. In the same manner, cam 188b acts to cam the pin bars on lift 179b over towards the outer edge of lift 179b as the lift travels down to the level of track 178d from the level of track 178e. The camming operation of cam faces 191a and 191b of bar 189 will now be described. As was previously mentioned, these cam faces work with lift 175b and fixed tracks 177c and 177d. Starting from the position of lift 175b, on the same level with fixed tracks 177d, the pin bars have just been moved to their positions as shown in Fig. 28. The center bar lift mechanism 24 then proceeds to move to its down position on the level of fixed track 177c. As the lift 175b moves down, cam face 191a cams the pin bars on the fixed track 177c over to the left in order to produce the space between the corresponding edges of lift 175b and fixed track 177c. The camming movement of the pin bars on track 177c over to the left, caused as above-mentioned by the camming movement of 191a, does not push the pin bars over far enough to pass the edge of cam face 187a; in fact, the pin bars are moved over just a small amount which not only leaves a space between lift 175b and fixed track 177c but also leaves some space between the edge of the last pin bar and the edge of the cam 187a. In similar manner, cam face 191b functions to cam pin bars on fixed track 177b over to the left when the lift 175b is traveling up to its position on the level of track 177d. In like manner also, the cam faces on the cam bar 190 function with the corresponding lifts and fixed tracks of group 21. A typical group of tracks and lifts have been used to illustrate the operation of the cam faces but the whole group operates in the same manner. Provision has been made in the mechanisms that make up the kiln units to take care of the variations in time that occur due to different size or diameter capsules which can be made in the capsule making machine. That provision is that by changing the pin bars in the machine to the pin bars with the pins of the diameter of the capsules to be made, the machine is ready to produce capsules of the selected or desired size. There is one other change to be made and that is in the number of pin bars initially put into the machine. The number of pin bars to be used is directly proportional to the time necessary for that particular size capsule to be solidified, and since the capsule is solidified during its travel up and down the levels of the fixed tracks of the kiln unit, the number of levels of track is then directly proportional to the amount of time necessary. Referring to Fig. 2, it will be noted that there are an even number of fixed tracks in groups 21 and 20 in the kiln unit; in this case 16 fixed tracks starting from the lowest tracks 177 and 178 to the topmost ones 177p and 178p. As can be seen in Fig. 2, the machine contains a full complement of pin bars, except for the upper two levels of fixed tracks 177n and 177p in group 20 and 178n and 178p of group 21. If the machine had its full complement of pin bars in all of its levels of tracks in the kiln unit, that would signify that the capsules which were being made were utilizing the maximum time of travel through the kiln unit in order to solidify because those pin bars would have to travel all the way to the topmost level of the track of group 20 and on to lift 175h of the center bar lift mechanism 24 before those dipped pin bars traveled over to the topmost level of the track of group 21 and started their descent through the kiln unit 5. Referring to the situation illustrated in Fig. 2, where the topmost pair of fixed tracks 177n and 177p of group 20 and fixed tracks 178n and 178p of group 21 are barren pin bars, the dipped pin bars do not travel to those two uppermost levels of track and, therefore, their time through the kiln is less than the maximum time. The highest level that those pin bars attain is the level of the uppermost tracks that contain pin bars to start with so that in this case the highest level which dipping bars attain is the level of fixed tracks 177m and 178m. When the dipped pin bars reach fixed track 177m by being raised to that level by lift 158r of the outer end kiln bar lift mechanism 23 and pushed over on to and along track 177m by pusher arm 173r of the outer end kiln bar pusher mechanism 22, they reach the lift 175g of the center bar lift mechanism 24. Lift 175g is then raised to the level of fixed track 177n and 178n, as shown in Fig. 2, and as there are then no pin bars on track 178n of group 21, the pusher arm 176g of the inner end bar pusher mechanism 25, which would normally push those dipped pin bars off lift 175g on to fixed track 177n, cannot do so. Therefore, those dipped pin bars on lift 175g remain on that lift until that lift is lowered back down to the level of fixed tracks 177m and 178m and the next group of pin bars which are being pushed on 175g from fixed track 177m by pusher arm 173r push the dipped pin bars on to fixed track 178m. The dipped pin bars then descend through the kiln along the fixed tracks of group 21 and the lifts of the inner end kiln bar lift mechanism 26 in the direction of the indicating arrows. The distance and, therefore, the time of passage of the dipped pin bars through the kiln unit has been shortened but the flow system through the kiln unit has not been disturbed. The time period can be further shortened by eliminating pin bars from the next pair of uppermost level tracks 177l and 177m of fixed tracks of group 20 and from 178l and 178m of fixed tracks of group 21. The time can be varied in this manner and still not disturb the flow system through the kiln. The important fact is that the fixed tracks must be withheld from the operation in pairs, as illustrated. Another fact is that the maximum time through the kiln can be increased by the addition of pairs of fixed tracks in groups 20 and 21 and the further addition of their complement of lifts and pusher arms. In this case again, the same flow system through the kiln will prevail.

The actual operation of the controlled air flow in the kiln unit 5 will now be described. Referring to Fig. 30, the front main air conduit 183 and the rear main air conduit 180 carry the air from an air conditioning unit of any conventional type, which conditions the air to specific temperature and humidity, to the front and rear air branch conduits. Located in certain of the branch conduits are the air heaters 184–184e, which are thermostatically controlled in this operation in order to give closer air temperature control at the different levels of the kiln. As the dipped pin bars follow the flow path through the kiln as previously described and as illustrated in Fig. 2, the conditioned circulated air is blown on the rear side of the gelatine-coated pins of the pin bars at one level of the kiln, and the conditioned circulated air is blown on the front side of the gelatine-coated pins of the pin bars at the next higher level of the kiln. This is illustrated by the indicated arrows in Fig. 30. This system of air circulation through the kiln unit is a notable improvement over prevailing practices of air kiln drying of capsules. This type of air circulation gives greater uniformity of drying of the gelatine coat on the pins of the pin bars by its action of first subjecting one side of the pins to the air and then the other side, alternating as the dipped pin bars ascend and descend the levels of the kiln. The air heaters 184–184e control the temperature at the different levels so that the air temperature varies from the lower levels to the upper levels. The temperature of the air in the higher levels of the kiln is higher than that of the air in the lower levels. This subjects the liquid gelatine coating to a gradual rise in temperature which gives a more even and thorough solidification to the liquid coating on the pins of the dipped pin bars and ensures the production of uniform, accurately-dimensioned capsule bodies and caps which will properly fit together.

*Bar pusher and bar transfer mechanisms*

The purposes of the bar pusher mechanism 28 and the bar transfer mechanism 32 are as follows: The bar pusher mechanism 28 pushes the pin bars with the gelatine-coated pins which are exiting from the kiln unit 5 via lift 175 of the center lift bar mechanism 24 on to track 31, shown in Figs. 22 and 23. The bar transfer mechanism 32 then proceeds to push these pin bars along track 31 to the stripper mechanism 14, where the solidified gelatine coating is stripped from the pins of the said pin bars, and then carries the stripped pin bars along track 27 to the greaser station 19. The bar pusher mechanism 28 then carries the stripped pin bars which have been greased and cleaned at the greasing station 19, by greasing unit 19, in groups of six along track 27 toward the dipping mechanism for the completion of the operational cycle of the pin bars. The construction of the bar pusher mechanism 28 follows: Referring to Figs. 22, 23, 24, 26 and 27, there is a crank arm 194, mounted on bar pusher actuator shaft 73. Mutilated gear 75, which is driven from the main machine drive, drives shaft 73 through gear 76 as previously described. Crank arm 194, actuates bar pusher bell crank 195 through link 196. Bar pusher slide 199 is actuated by link 197 through stud 198. Stud 198 rides back and forth through slot 200 in front main frame 3 in order to actuate the bar pusher slide 199 to its extreme positions. Bar pusher slide 199 is guided in its movement in a dovetail slide formed in front main frame 3. Attached on the inside face of the bar pusher slide 199 are pusher 201a, dog arms 201, 201b and 201c. These pusher arms are mounted on the bar pusher slide on studs to allow a pivoting action on them. The pusher ends of the pusher dog arms are formed in a rectangular manner in order for them to push the pin bars in the manner illustrated. There is a hole in the pusher arm dog arms with a stud mounted on the bar pusher slide 199 within that hole. This construction limits the pivoting action of the pusher arm dogs. Also mounted on the inside face of the bar pusher slide 199 is a bar pusher blade 193. This bar pusher blade 193 is constructed and mounted in such a manner that it will move with the movement of the bar pusher slide 199 and the upper lip of the blade, which is the actual working surface, is located at the height of the level of horizontal track 30, in order to permit this bar pusher slide 193 to push the pin bars from lift 175, when it is on the level of the horizontal track 30, on to horizontal track 31. Working in conjunction with the bar pusher mechanism 28 is the bar transfer mechanism 32. The construction of this mechanism is described with the aid of Figs. 22, 23, 24, 25, 26 and 27. The actuating mechanism of the bar transfer mechanism 32 includes a crank wheel 202 mounted on the left-hand turret unit shaft 203, which is being driven continuously by a gear train direct from gear box 43, shown in Fig. 1b. On the periphery of crank wheel 202 is mounted link 204 which connects to the bar transfer turret index shaft 205. This shaft 205 is positioned transversely across the machine and is actuated back and forth the length of slot 206 in the front main frame 3. On the front end of the bar transfer turret indexing shaft 205 is indexing wheel 207, with rollers 208, 208a, 208b and 208c located on the periphery of the indexing wheel 207 disposed ninety degrees apart on it. Suitably mounted on the front main frame 3 is indexing link 209, which has an elongated semi-circular cut-out. Spring 210 pulls indexing link 209 down so that the lower surface 211 of the indexing link 209 is held down on the roller surfaces during the reciprocating movement of the bar transfer mechanism. Mounted on the inside face of the rear main frame 3 is the lefthand rear bar transfer slide carrier 215 and similarly mounted on the inside face of the front main frame 4 is the left-hand front bar transfer slide carrier 215a. The slide carrier 215 is formed in such a manner that there is an open slot facing the inside of the machine which mounts inside it the left-hand rear bar transfer slide 216. Similarly constructed is the left-hand front bar transfer slide carrier 215a and similarly mounted in the front slide carrier is the left-hand front bar transfer slide 216a. The bar transfer slides are suitably mounted in these open slots to allow them to move back and forth along the length of the slots under the actuation of the bar transfer actuating mechanism through the bar transfer actuating shaft 205. Bar transfer actuating shaft 205 is mounted through a hole in the rear bar transfer slide 216 to allow the shaft to extend transversely across the machine and then the shaft 205 mounts into the front bar transfer slide 216a. The reciprocating motion of the bar transfer slide mechanism carries the shaft 205 and the front and rear bar transfer slides 216 and 216a back and forth as a unit with whatever else is attached to these parts. Shaft 205 is suitably mounted in the bar transfer slide carriers to allow shaft 205 to rotate upon indexing. Mounted transversely between the rear bar transfer slide 216 and the front bar transfer slide 216a is the bar transfer turret shaft 217, suitably mounted to allow this shaft to rotate upon indexing. Shafts 205 and 217 are geared together by a pair of spur gears 218 and 219. These shafts also have brake shoe 220 holding them together and suitably mounted on the actuator shaft 205, to allow it to rotate, is the ratchet arm 212, which is held against the ratchet wheel 221 by spring 222. Ratchet wheel 221 is fastened to shaft 217. Release ratchet arm 213 is mounted on ratchet arm 212 and cam roller 214 is mounted on the lower end of the release ratchet arm 213. Mounted on the lower inside edge of the left-hand rear bar transfer slide carrier 215 is ratchet release cam 223. Spring 224 holds release ratchet arm 213 against stop stud 225, mounted in the bar transfer slide 216. Mounted on the bar transfer turret shaft 217 are the three bar transfer turrets 226, 226a and 226b. Turret 226 is formed with jaws 227a, 227b, 227c and 227d. Mounted on shafts 205 and 217 are pin bar guides 228 and 228a, which align with pin bar guides 230 and 230a, mounted on bar 229, to guide the pin bars as they are pushed towards the bar transfer turret. The rear bar transfer slide 216 has mounted on its inside face a stud 231, which mounts in slot 232 of the rear bar locating dog carrier 233. The other end of the bar locating dog carrier 233 has a slot 234, which mounts on the left-hand main dipping shaft 100a. Similarly mounted on the front bar transfer slide 215a is the stud 231a and carrier 233a. Mounted in rear bar location dog carrier 233 are the pusher detent dogs 235–235e, which are spring loaded in such a manner that they push in an upward direction unless held down by pin bars above them on track 31. There is a similar set of pusher detent dogs 235f–235k in carrier 233a. Mounted on the inside face of the rear main frame 3 is the holding detent dog assembly 236 which has mounted within it a set of holding detent dogs 237–237f, which are spring loaded in such a manner that they push in a downward direction unless they are held up by pin bars on horizontal track 31. This holding detent dog assembly 236 works in conjunction with the pusher detent dogs 235–235e to push the pin bars one at a time towards the bar transfer turret. Referring to Figs. 26 and 27, the bar pusher mechanism is actuated in the following manner: The bar pusher mechanism is shown in its extreme forward position with stud 198 in the extreme left end of the slot 200 of front main frame 3. As mutilated gear 75 engages gear 76 on shaft 73, as shown in Fig. 1, shaft 73 is rotated and crank arm 194 pulls on bell crank 195 through link 196 and causes link 197 to push bar pusher slide 199, which is attached to stud 198, to its extreme back position. At this point, mutilated gear 75 leaves the engagement of gear 76 and the bar pusher slide 199 dwells in its back position. In like manner, after the dwell period is over, the bar pusher slide is returned to its forward position by the action of mutilated gear 75. This is the actuating mechanism which actuates the bar pusher slide 199 in its reciprocating motion. The bar transfer mechanism, therefore, has both a reciprocating movement and an indexing movement. The reciprocating motion is effected by crank wheel 202 which is continuously revolving on turret shaft 203. Fig. 26 shows the bar transfer mechanism 32 in its extreme back position.

As crank wheel 202 revolves in a clockwise direction, link 204 pulls shaft 205 along slot 206 in the front main frame 3 until the mechanism is at its extreme forward position. The crank wheel 202 has then traveled one hundred and eighty degrees in a clockwise direction. As the crank wheel 202 continues through the next one hundred and eighty degrees of revolution, link 204 pushes shaft 205 back to its extreme back position. As the bar transfer mechanism travels from its forward position shown in dotted lines in Fig. 26 to its back position, indexing link 209 prepares to drop into its indexing position. When the bar transfer mechanism is in its forward position rollers 208 and 208c on indexing wheel 207 are on the same horizontal level. Spring 210 holds down indexing link 209 so that the rollers 208 and 208c ride against the surface 211 of link 209 as the bar transfer mechanism starts its reciprocating motion to its back position. As the wheel 207 travels towards its back position, rollers 208 and 208c hold link 209 in a horizontal position and as roller 208 passes under the elongated semi-circular cut-out in the indexing link 209 that link remains in a horizontal position because roller 208c still is contacting surface 211 but, as the wheel continues moving, roller 208 passes the end of indexing link 209 and when roller 208c passes under the cut-out in link 209 the link drops down under the spring load of spring 210, and roller 208c is retained in the cut-out. At this point, the bar transfer mechanism has reached its extreme back position. The indexing mechanism is now prepared to index shaft 205 on the forward reciprocating motion of the bar transfer mechanism. It is accomplished in this manner: When link 204 pulls on indexing wheel 207 at the start of the forward reciprocation motion, roller 208c is restrained from traveling forward. The rest of the indexing wheel 207, not being restrained in any manner, travels forward but, because roller 208c is being restrained, the forward motion of the indexing wheel 207 is in the form of a counter-clockwise rotation until roller 208b has rotated to a position in contact with the surface 211 of the indexing wheel 209. A further continuation of the rotating movement of the indexing wheel 207 will push up indexing link 209 and release roller 208c which had been restrained in the cut-out. At this time, rollers 208b and 208c are on the same horizontal level and the bar transfer turret indexing shaft 205, on which is the indexing wheel 207, has indexed ninety degrees in a counter-clockwise direction. The first operation in the function of the bar pusher mechanism 28 is to push the group of six pin bars from lift 175 on to horizontal track 31. Referring to Figs. 22 and 23, the bar pusher mechanism 28 is positioned as shown in Fig. 22 with the bar pusher blade 193 to the left of lift 175 of the center kiln bar lift mechanism 24. The lift 175 is then lowered to the level of horizontal track 31 and the bar pusher mechanism 28 starts its reciprocating movement to its back position. This causes bar pusher blade 193 to push the group of six pin bars from lift 175 on to horizontal track 31. Bar pusher blade 193 pushes the group of six pin bars to a position such that the last pin bar of the group is pushed up to the holding detent dog 237f and pusher detent dog 235e. The holding detent dog 237f, being spring loaded, drops down and in back of the back edge of the last pin bar of the group and restrains it from traveling back towards the left end of the machine. The other holding detent dogs 237a–237e are lined up with the back edges of the other pin bars of the aforementioned group. Holding detent dog 237 is lined up with the back edge of the last pin bar of the previous group of pin bars. Pusher detent dog 235e, being spring loaded, travels upwardly so that its pushing edge is in back of the last pin bar in the group which has just been moved by the bar pusher blade 193. Simultaneously with the reciprocating movement of the bar pusher mechanism, the kiln bar pusher arm 173j of the outer end kiln bar pusher mechanism 22 has pushed a new group of pin bars on to lift 175. This is illustrated in Fig. 23. The lift 175 is then raised to its up position and the bar pusher mechanism 28 is able to return to its forward position as shown in Fig. 22. The bar transfer mechanism 32 then takes over in pushing the pin bars to the stripping mechanism 14. The bar transfer mechanism handles the pin bars one at a time so that the bar transfer mechanism must go through six complete operational cycles for every one operational cycle of the bar pusher mechanism. Referring to Fig. 23, it is to be observed there are always the same number of pin bars on that portion of the track 31 between holding detent dog 237 and the bar transfer turret 226. The pin bar which the bar transfer turret 226 picks up to deliver to the stripper mechanism is replaced on that particular portion of the track 31 by the pin bars that are between holding detent dogs 237 and 237f, in this manner. The bar transfer turret has just reached its extreme back position, as shown in Fig. 23 and picks up the foremost pin bar on the portion of the track 31 in jaw 227a. The forward reciprocating motion starts and, as it does, the indexing action, previously described, takes place. This indexing action indexes the indexing shaft 205 in a counter-clockwise direction and, through the engagement of gears 218 and 219, bar transfer turret shaft 217 indexes ninety degrees in a clockwise direction simultaneously as it moves toward the stripping mechanism 14, which represents the extreme forward position of the bar transfer mechanism. Fig. 22 shows the mechanism in its extreme forward position with the pin bar which is held in jaw 227a in the stripper mechanism 14. Note that, due to the indexing of shaft 217, jaw 227a, which was on a horizontal line and level with track 31, is now in a vertical position, indexed ninety degrees from its original position. On the back motion of the reciprocating movement of the bar transfer mechanism, the pin bar which is held in jaw 227a of turret 226 is pulled away from stripper mechanism 14. This motion strips off the solidified gelatine coating which was on the pins of the pin bar by pulling the pins out from inside of the solidified gelatine coating. This group of solidified gelatine coatings, which is that capsule portion being made on the left-hand side of the machine, is received in a group of collets in the indexing turret unit 15 when the pin bar enters the stripping mechanism 14. When the pin bar is pulled back through the stripper mechanism, the capsule portions remain in the collets of the indexing turret unit 15. Following this same pin bar which has just been stripped through the next phase of operation, the transfer turret 226 returns to its extreme back position and that pin bar is still held in the jaw whose position is equivalent to that of 227b, shown in Fig. 23. The next forward reciprocating motion of the transfer turret 226 will cause an indexing of the transfer turret 226 which will carry the stripped pin bar in the jaw in the equivalent position to 227b, shown in Fig. 23, down to the position shown in Fig. 22 at the level of track 27. On the next back stroke of the bar transfer mechanism, that same stripped pin bar is carried in the jaw of the turret along the level of track 27 towards greaser station 194. As the turret approaches the greaser station, greaser unit 19 travels to its up position which brings rear stop pin 238 and the corresponding front stop pin up to the level that will interfere with the progress of travel of the stripped pin bar towards the greasing station 194 but as the progress of travel of the bar transfer turret mechanism is not impeded the turret will travel to its extreme position and the jaw which was holding the pin bar will leave the pin bar stopped up against the rear stop pin 238 and the front stop pin 238a, as shown in Fig. 23. One additional complete operational cycle of the bar transfer turret mechanism 32 will bring the described stripped pin bar to the greasing station 194 and that is accomplished on the back stroke of that cycle. The greaser unit by this time has traveled to its down position and carried down stop pins 238 and 238a, leaving the stripped pin bar free to be pushed along track 27 to the greasing station. The back surface of the jaw of the turret which is on the level of track 27 pushes this stripped pin bar towards the greasing station 194 and reaches that point at the conclusion of its operational cycle. That point is the extreme back position of the bar transfer turret mechanism 32 and is illustrated in Fig. 23. There are two other operations that take place during every cycle of the bar transfer turret mechanism 32. These are the operation of the holding detent dogs 237–237f working in conjunction with the pusher detent dogs 235–235e and the operation of the ratchet mechanism, shown in Fig. 25.

Every time the turret 226 returns to its back position it picks up the first pin bar on track 31 and carries it to the stripping mechanism 14. Near the end of the forward stroke which carries the pin bar that was just picked up by the turret to the stripping mechanism, another pin bar is pushed up to replace it in exactly the same position. This operation is carried out by the holding detent dogs 237–237f and the pusher detent dogs 235–235e in the following manner: When the bar transfer slide 216 travels on its forward stroke, stud 231, which is mounted on it, travels forward with it. At the start of the forward stroke, stud 231 is in the left-hand end of the slot 232 of dog carrier 233 and shaft 100a is in the right end of slot 234 of dog carrier 233. The frictional force of all of the pin bars on track 31 from pusher detent dog 235e to the right end of track 31 holds carrier 233 in its position as stud 231 travels forward on slide 216, until stud 231 has reached the right-hand end of slot 232 but, at this point, the full stroke has not been completed so that upon continuation of the forward motion of stud 231 it carries the carrier 233 the length of the slot 234. The forward motion of carrier 233 is a little greater in extent than the distance between the working edges of the adjacent holding dog detents 237f and 237e. The forward motion of the carrier 233 carries the pin bar which was in front of the holding edge of the holding detent dog 237f, as shown in Fig. 23, to a position in front of holding edge of said dog 237e, as shown in Fig. 22. This movement, which carries the last pin bar forward in the manner described, also carries all the pin bars on track 31, that is, those in front of that pin bar and brings the first pin bar in the line up to the pick-up position where it will be picked up by the turret upon the next back stroke of the bar transfer mechanism. This forward motion of the carrier 233 is almost exactly the length of the width of one pin bar with an amount over that for safety to make sure that the holding edge of the holding detent dog drops behind the back edge of the last pin bar. The bar transfer turret mechanism, it will again be noted, handles one pin bar at a time in its operational cycle so that the turret 226 carries one pin bar at a time from the end of track 31 and deposits it on track 27 at greasing station 194. When the bar transfer mechanism has gone through six operational cycles, it has exhausted the supply of pin bars being held by the holding detent dogs 237a–237f, and the last pin bar on track 31 is being held by the holding edge of holding detent dog 237, but then the cycle of operation of the bar pusher mechanism 28 starts again and the next group of six pin bars is pushed from lift 175 by the bar pusher mechanism on to track 31 and replenishes the supply of pin bars between holding detent dogs 237a–237f. Referring to Fig. 25, the purpose of the ratchet mechanism illustrated is to lock shafts 205 and 217 to prevent any rotation at all times during the operation, except at the time shaft 205 is to be indexed by the indexing actuating mechanism during the forward reciprocating stroke of the bar transfer mechanism 32. Fig. 25 shows the ratchet mechanism as it is when the bar transfer mechanism is in its extreme back position and the ratchet arm 212 is engaged with the locking notch of ratchet wheel 221 and is locking shaft 217 from any clockwise rotational movement and is locking shaft 205 from any counter-clockwise rotational movement. Roller 214 is in contact with the lower portion of cam 223 and release ratchet arm 213 is resting against stop stud 225 under the spring load of spring 224. As the bar transfer mechanism starts forward on its reciprocating stroke, the whole ratchet mechanism, being mounted on the shafts 205 and 217, travels forward with the bar transfer mechanism. Roller 214, in traveling forward, follows the contour of cam 223 and is raised as it reaches the upper portion of the cam. This camming action would normally cause release ratchet arm 213 to pivot clockwise about its stud center 239 but stop stud 225 prevents such movement. What does occur then is a clockwise rotational movement of stud center 239 about shaft 205. Inasmuch as stud center 239 is mounted on ratchet arm 212, that ratchet arm moves clockwise about its center. It stretches spring 222, disengages itself from the notch in the ratchet wheel 221 and releases the wheel. At this point, with roller 214 on the upper port of cam 223 and ratchet arm 212 in a released position from ratchet wheel 221, both of shafts 205 and 217 are free from any effects of the locking mechanism. Simultaneously, the previously described indexing operation begins which indexes shaft 205 in a counter-clockwise direction for ninety degrees and, due to engagement of gears 218 and 219 mounted on shafts 205 and 217, respectively, shaft 217 indexes ninety degrees in a clockwise direction. Upon continuation of the forward stroke of the reciprocating movement, the whole mechanism travels past cam 223 and roller 214 drops down again, which causes ratchet arm 212 to pivot back around shaft center 205 and the end of the ratchet arm 212 contacts the circumferential surface of ratchet wheel 221. When the indexing of the shafts has been completed, the end of ratchet arm 212 rides into the next locking notch of the ratchet wheel, because spring 222 has held the arm 212 against the circumferential surface of the wheel in the completion of the indexing. On the back stroke of the reciprocating movement of the bar transfer mechanism 32, there is no ninety degree indexing of shafts of 205 and 217 and the ratchet mechanism must remain in a locked position. This it does, and, when roller 214 approaches cam 223 on the back stroke, the following occurs: Roller 214 is impeded in its travel by the corner of cam 223, that is, the high corner, but the rest of the mechanism continues to travel towards the back position. This results in release of ratchet arm 213 stretching spring 224 and pivoting in a counter-clockwise direction away from stop stud 225. Spring 222, not being affected at all, still holds ratchet arm 212 in the locking notch of the ratchet wheel 221. When the bar transfer mechanism has returned to its extreme back position, release ratchet arm 213 has returned to its position shown in Fig. 25 with the roller in contact with the lower portion of the cam and the release ratchet arm 213 held against stop stud 225 by spring 224. This completes the phase of the operation in which the bar transfer mechanism 32 partakes. That phase started with the turret 226 picking up the first pin bar from track 31 and carrying it to the stripping mechanism 14 and then from there to the greasing station 194 on track 27 at which the phase ended. The bar pusher mechanism picks up from that point of the process when the pin bars have been delivered to the greaser station 194 and functions to push the pin bars in groups of six at a time along track 27 to the dipping mechanism already described. The parts of the bar pusher mechanism which actually effect the pushing of the pin bars along track 27 are the left-hand rear pusher dog arms 201, 201a, 201b and 201c and their respective pusher dog arms along the left-hand front portion of the machine. The bar pusher mechanism 28 carries the group of six bars from the greasing station 194 to the dipping mechanism in three operational cycles of the bar pusher mechanism 28. The operation which takes place when the pin bar is at greasing station 194 will be described in conjunction with the greaser unit 19. As has previously been described, turret 226, of the bar transfer mechanism 32, pushes the pin bar to the greasing station 194 from the point on track 27 where the pin bar was stopped by the stop pins 238 and 238a of greaser unit 19. When the first pin bar of the group of six pin bars which the bar transfer mechanism is processing has reached greasing station 194 that pin bar remains at that position until the turret 226 pushes the next pin bar of that group from the point of track 27, where the stop pins 238 and 238a had stopped it, to the greasing station 194. When that happens, the first pin bar which was at station 194 is displaced by the second pin bar as the first pin bar has been moved along track 27 to the left of station 194. The respective edges of the two adjacent pin bars are now in contact with each other. A continuation of this operation will accumulate a group of six pin bars to the left of station 194 with the last pin bar located precisely at station 194. At this point, the bar pusher mechanism 28 moves to its extreme back position, as shown in Fig. 23. This brings pusher arm dog 201c to its position shown and the notched corner of the pusher arm dog 201c notches about the back edge of the last pin bar which is located at station 194. This movement of the bar pusher mechanism 28 to its extreme back position also replenishes the supply of pin bars on track 31 as previously described for the bar transfer mechanism 32, which had become exhausted of pin bars at the time when six pin bars had become accumulated on track 27 to the left of station 194. The forward stroke of the bar pusher mechanism takes place and pusher dog arm 201c pushes that group of six pins to the position along the track 27, as shown in Fig. 22. Similarly, pusher dog arms 201, 201a and 201b also have pushed groups of six pin bars along track 27 towards the dipping mechanism. Pusher dog arm 201a has pushed a group of six pin bars from a position on track 27, directly below lift 175, to the dipping bar bridge 105a of the left-hand dipping mechanism 9a, for dipping purposes. Pusher dog arm 201 has pushed the group of six pin bars, which has just been dipped, from the dipping bar bridge 105a to the turntable mechanism 29. When the bar pusher mechanism 28 travels on the back stroke of its reciprocating action, the pin bars on track 27 are not disturbed from their positions by any of the pusher arm dogs 201, 201a, 201b or 201c. This is accomplished by the pivoting of the pusher arm dogs in a clockwise direction about their stud mounting. The limiting stud in the hole of the pusher arm dog allows sufficient pivoting of the pusher arm dog for the lowest corner of the notched end to ride over the tops of the pin bars on the forward stroke of the bar pusher mechanism and when the mechanism has reached its forward position the pusher arm dogs fall into place behind the back edge of the last pin bar of the group. This completes the operational flow of the pin bars through the complete machine. The pin bars start at the dipping phase of the process, travel through the whole machine and return again to the dipping phase.

*Greaser unit*

The purpose of the greaser unit 19 is to receive the pin bars after they have been stripped of their solidified gelatine coating, to clean the pins of any residue and dirt that has been left on the pins and to coat the pins of the pin bar with a thin film of grease so as to prepare the pins for their next dip into the controlled liquid gelatine bath. This procedure of coating the pins with a thin film of grease allows for easier stripping of the solidified gelatine coating from the pins in the stripper unit 14. The construction of the greaser unit 19 which fulfills this purpose will now be described: Referring to Figs. 45, 46, 47, 48 and 49, numeral 240 designates a crank arm mounted on the greaser and stripper actuator shaft 70, which is being continuously driven from the main machine drive, as previously described. Numeral 241 designates the front connecting rod and numeral 241a the read connecting rod. The rear connecting rod 241a is attached to rear trunnion 242 by connecting rod pin 244. The greaser unit itself consists of a lower pair of greaser spindle bearings 243 and 243a and an upper pair of greaser spindle bearings 243b and 243c. The upper pair of greaser spindle bearings is held together by a group of screws along the length of the unit similar to screw 245, which extends through the side plates 246 and 246a, and secures the pair of greaser spindle bearings 243b and 243c together along the line 247. The upper and lower pairs of greaser spindle bearings are held together by a rear pair of tie rods 247 and 247a and by a similar pair of tie rods near the other end of the unit. Tie rods 247 and 247a hold rear trunnion 242 to the lower surface of the lower pair of greaser spindle bearings 243 and 243a. The greaser spindles 248, 248a and 248b are shown in Fig. 46 mounted in the greaser spindle bearings. Spindle 248 consists of an upper portion 249, which is above the upper greaser spindle bearings 243b and 243c and on the shank of the spindle immediately below the upper greaser spindle bearings 243b and 243c is a gear portion 250, which engages a similar gear portion 250a on the shank of the adjacent greaser spindle 248a; similarly, all the gear portions of the greaser spindles are engaged with one another across the whole greaser unit. There are twenty-five greaser spindles mounted across the greaser unit. The center greaser spindle is the greaser spindle driver 251 constructed in the same manner as greaser spindle 248, which was previously described, with a similar gear portion 252, which is engaged with the gear portions (not shown) of corresponding greaser spindles but, in addition, has an outside spline 253 on its lengthened lower shank 254, engaged with the internal spline 255 which is inside the elongated shank 256 of the driven bevel gear 57, located in the greaser gear box 53. The upper portion 249 of greaser spindle 248 has a hole in which the lower end of the plunger spring 261 rests. Resting on shoulders 259 is the greaser shell 260 which contains a hole in its upper surface through which the pins of the pin bars enter for the greasing operation. Plunger spring supports metal base washer 258 which, in turn, supports felt washers 257 and 262, which are impregnated with grease. Felt washer 262 has a hole cut into its center which is the size of the pins of the pin bars.

Mounted on the inside faces of the front main frame 3 and the rear main frame 4 is the front greaser head guide 264 and the rear greaser head guide 264a. The ends of upper greaser spindle bearings 243b and 243c form a rectangular slot 263 whose open end faces the inside face of the rear main frame 4. The ends of the lower greaser spindle bearings 243 and 243a form a similar rectangular slot 263a. Mounted on the sides of the greaser head guides 264 and 264a and near the upper end thereof are the front and rear stationary stop pin brackets 265 and 265a, respectively. Mounted on the upper face of the greaser unit by tie rod 247a is the rear stop pin bracket 266a and a similar front stop pin bracket 266. These brackets carry members 238 and 238a. The greaser unit 19 operates upon the pin bars one at a time and there are two motions imparted to the greaser unit. One motion is the travel from the unit's extreme lower position as shown in dot-dash lines in Fig. 45 to its extreme upper position as shown in solid lines in Fig. 45 and back down to its lower position. This constitutes one complete operational cycle of the unit. The second motion is the rotation of the greaser spindles. This is a continuous movement which the greaser spindles go through no matter where the unit is in its movement through its operational cycle. Actually, this rotation of the greaser spindles is only necessary when the unit is poised in its upper position but, due to the mechanical set-up, this operation is made continuous. The movement of the greaser unit 19 from its lower position to its upper position is effected in this manner: Greaser and actuator shaft 70 is continuously revolving, being driven by a gear train from the main machine drive, as previously described. Crank arm 240 revolves about shaft 70, pulls down on connecting rod 241 and a similar crank arm pulls down on connecting rod 241a. As connecting rods 241 and 241a are pin-connected at the end of the crank arm and at the upper end, where they connect to the trunnions 242 and 242a, the connecting rods travel in a crank action but the greaser unit itself travels up and down in a straight vertical line. These connecting rods, being attached to the lower surface of the unit, pull the unit down to its lower position. Slots 263 and 263a and similar slots at the other end of the unit guide the unit straight up and down on the greaser head guides 264 and 264a, which are rigidly connected to their respective frames. The extreme positions are reached when crank arm 240 reaches a vertical position. One-half of the operational cycle consists of its travel from one position to the other and the other half of the operational cycle consists of the unit returning to its starting position. The greaser spindle rotation is effected in the following manner: Referring to Figs. 1b and 48, it is seen that the greaser gear box 53 is part of the left-hand main machine drive. Bevel gear driver 56, on the left-hand main drive shaft 40, drives the driven bevel gear 57. This causes the continuous rotation of bevel gear 57 and hence the internal spline 255 in the elongated shaft 256 is continuously rotating. External spline 253 on greaser spindle driver 251 is being continuously driven. The vertical reciprocation of the greaser unit will cause the external spline 253 to ride up and down in the internal spline 255 but nevertheless continues to be driven. Since greaser spindle driver 251 is engaged through its gear portion 252 to drive gear portions of the adjacent greaser spindles, the whole gear train formed by the greaser portions of the greaser spindles will be driven continuously in a rotating manner. Referring to Figs. 45, 47 and 49, the function of the greaser unit 19 will now be described: The bar transfer turret 226 of the bar transfer mechanism 32 has just pushed the pin bar, which has just been stripped, to greasing station 194 on track 27. Greaser unit 19 travels on its upstroke motion and reaches the position shown in Fig. 45, at which time the pins of the pin bars which have just arrived at station 194 are received through the openings in the tops of the greaser shells, as illustrated for the first pin in Fig. 49. As the greaser unit 19 moves upward and the head of the pin enters the hole in the top of the greaser shell 260, the head of the pin travels through the hole in felt washer 262 and butts up against felt washer 257 and, as the greaser unit continues its ascent, spring 261 becomes compressed. Solid felt washer 257, being impregnated with grease, will coat the head of the pin as the greaser spindles rotate and felt washer 262 will simultaneously coat the shank of the pin with a thin layer of grease. The hole in felt washer 262, being of a close fit about the diameter of the pin, will tend to clean off any residual particles of foreign matter which might be on the shank of the pin by pushing the foreign matter down the shank of the pin towards the base of the pin where it will be off the actual working length of the pin.

When the greaser unit 19 then begins its travels downward, the pin, relatively speaking, leaves the confines of the greaser shell 260 and plunger spring 261 is released from its compressed condition and forces metal washer 258 and felt washers 257 and 262 up to the top of greaser shell 260 and in position to receive the pin of the next pin bar for the greasing operation.

Another function, which part of the greaser unit assists in is the removal of the pin bars from the jaw of turret 226 when the particular jaw of turret 226 brings the pin bar to the level of track 27. This has previously been described. This function is accomplished by stop pins 238 and 238a. The action front stop pin 238a will be described: The spring between bracket 265 and the collar which is fastened on stop pin 238a causes the said stop pin to be pushed upwardly at all times and to be at a level in relation to track 27 where the pin will interfere with any pin bars being pushed along track 27. Bracket 265 is stationary in relation to the greaser unit but bracket 266 mounted on the greaser unit 19 travels down with the downstroke of the greaser unit and a short distance before the greaser unit approaches its extreme down position the lower surface of the bracket 266 contacts the nut on the end of stop pin 238 and pulls the pin down with it to the extreme downmost position of the greaser unit. At this time, stop pin 238a has been pulled below the level of track 27 and, in that position, causes no impedance of pin bars traveling along track 27, and it is at this time that the previously described action of the backside of the jaw of turret 226, pushing the pin bars to greaser station 194, takes place. The start of the upstroke of the greaser unit carries bracket 266 up with it and releases the nut on the end of the stop pin so that the stop pin reverts back up to its interfering position.

*Stripping mechanism*

Referring to Figs. 1d and e, the purpose of the stripping mechanism 14 is to receive the pin bars which have just emerged from the kiln unit 5 and to remove the gelatine capsule coating which has been formed and solidified on the pins of the pin bars. As has previously been described, the pin bars emerge from kiln unit 5 and travel along track 31 towards the stripping mechanism 14. The bar transfer mechanism 32 carries one pin bar at a time from track 31 and inserts the pin bar into the stripping mechanism where the stripping operation takes place, and then the bar transfer mechanism removes the pin bar from the stripping mechanism and carries it down to track 27 to deliver the pin bar to the greaser unit 19 for the next operation which will be performed upon it. A group of collets, which will be described hereinafter receives within them the stripped gelatine capsule portions at the time they are stripped from the pins. Actually, it is the pins which are withdrawn from the capsule portions because the latter are being held stationary in the group of collets while the bar transfer mechanism 32 pulls the pin bar with the pins back through the stripping mechanism. The construction of the stripping mechanism is as follows: Referring to Figs. 31, 32, 33 and 34, cam follower arm 268 freely pivots on transverse shaft 267 and is pin-connected to rear lift rod 271; a similar cam follower arm, not shown in these figures, is pin-connected to front lift rod 271a. Cam roller 269 is suitably held against the cam surface of the rear stripper opening cam 270, which is mounted on the greaser and stripper actuating shaft 70 and is continuously rotating. There is a similar stripper opening cam and cam follower arm on the front end of the transverse shaft 267. The upper ends of lift rods 271 and 271a are screwed into the stripper opening bar 272, which is transversely positioned across the machine. Bar 272 has a slot 273a in each of its ends through which guide screws are suitably mounted into the side of the rear and front main frames 4 and 3, respectively. These guide screws guide bar 272 in its actuating motion. Mounted in bar 272 are the stripper opening studs 274–274y, equally spaced along the length of bar 272. Carrier bar 275 is rigidly mounted on the side surfaces of the front and rear main frames 3 and 4, and bar 275 mounts stripper pivot studs 278–278s, etc. Suitably mounted on bushings on pivot studs 278–278s, etc. to allow them to pivot freely are left-hand capsule stripper arms 276–276x and right-hand stripper arms 277–277x. A series of springs like 279s, whose ends are held in holes on the inside adjacent surfaces of the lower end of the stripper arms, force the lower ends of the pairs of stripper arms apart from each other. The left-hand stripper arms 276–276x are formed with semi-circular surfaces 280–280x near the upper ends of the arms, which constitutes the actual stripping surface, and the right-hand stripper arms 277–277x have corresponding semi-circular surfaces 281–281x. Along the outside surfaces of the lower ends of the stripper arms are cam surfaces 282–282x and 283a–283x, which work with the opening studs 274–274x to actuate the opening of the stripper arms. It will be noted that stripper arms 276 and 277 work as a pair to strip one capsule portion from one pin of the pin bars and stripper arms 276a and 277a work as a pair to strip another capsule portion from another pin of the same pin bar at the same time. There are twenty-five pairs of such stripper arms across the unit to handle the twenty-five pins of the pin bars. It will also be noted that stripper stud 274 and the other end stripper stud 274y work with their respective cam surfaces 282 and 283x, respectively, only but all the other stripper studs work with two cam surfaces; for example, stud 274a works with cam surfaces 283 and 282a. The stripping mechanism 14 functions in this manner: When roller 269, on cam follower arm 468, is contacting the high portion of the stripper opening cam lift drive 271 and lift drive 271a are pushed to an up position, which carries stripper opening bar 272 to an up position, as illustrated in Fig. 32. The bar 272 is guided in its travel by the guide screws in slots 273 and 273a which guide bar 272 in a vertical stroke. The up position which bar 272 has attained carries the stripper opening studs along cam opening surfaces 282–282x and 283–283x, compressing springs 279–279x and pivoting stripper arms 276–276x and stripper arms 277–277x about their respective pivot studs 278–278x. This creates a scissor-like action as the lower portions of the pairs of stripper arms come together and the upper portions of the stripper arms spread away from each other and hence spread the stripping surfaces 280–280x and stripping surfaces 281–281x away from each other, as illustrated in Fig. 32. At this point in the operational cycle of the stripper mechanism 14, the turret 226 of the bar transfer mechanism 32 travels towards the stripping mechanism with a pin bar which has solidified gelatine capsule portions on its individual pins. The turret continues traveling towards the stripping mechanisms and thrusts the pins of the pin bar between the spread pairs of stripper arms. Located behind the stripper arms and in line with the center lines of the stripping surfaces 280–280x and 281–281x is a group of receiving collets 282 located in the indexing turret unit 15 and which are opened to receive the ends of the pins with the solidified capsule portions on them. This is illustrated in Fig. 34 where the bar transfer mechanism 32 has brought the pin bar into the described position. The timing of the stripping operational cycle is such that the stripper opening cam 270 has rotated about until the roller 269 has reached the lower portion of the cam actuating face and the weight of the guide bar 272 brings bar 272 to its extreme downward position, as shown in Fig. 33. When this occurs, the studs 274–274y move down their respective cam faces of the stripper arms and allow springs 279–279x to pivot the stripper arms about studs 278–278x and to spread the lower portions of the stripper arms, thus forcing the stripping surfaces 280–280x and their respective stripping surfaces 281–281x together. The stripping surfaces embrace the diameter of the pin about the bare surface diameter of the pin towards the base end past the point along the length of the pin where the capsule portion ends, as illustrated in Fig. 34. The bar transfer mechanism 32 then starts moving away from the stripping mechanism 14 while still holding the pin bar in the jaw of turret 226. This movement causes the capsule portions to butt up against line 283 about the stripping surfaces 280–280x and 281–281x and to hold the capsule portion stationary in the collets 282–282x while the turret 226 continues to pull the pin bar back through the stripping mechanism. When the pins of the pin bar have traveled completely back through the stripping mechanism, then the capsule portions are entirely freed from their pin forms and the operation is complete.

Knife mechanism

Referring to Figs. 1a–j and 2, the purpose of the knife mechanism is to cut the capsule portions accurately to the proper lengths after they have been stripped from the pin forms of the pin bars. The capsule portions have been stripped from the pins of the pin bars at stripping station 36 of the left-hand indexing turret unit 15 and received by holding collets in the indexing turret unit 15 at station 36. The indexing turret unit then indexes ninety degrees to the cutting station 34 at which the knife mechanism is located. The capsule portions held in the collets are positioned in the collets by a placement rod mechanism as the indexing turret unit 15 is carrying the capsule portions to the cutting station 34. This placement rod mechanism will be described below. This operation of the placement rod mechanism prepares the capsule portions for the cutting operation. At the arrival of these capsule portions at station 34, the knife mechanism is actuated and performs the cutting. At the completion of the cutting operation, the indexing turret unit 15 then indexes ninety degrees to the joining station 35 where the cut capsule portions are joined in the joining operation. Referring to Figs. 35, 36, 37 and 38, the construction of the left-hand knife mechanism is as follows: Left-hand turret unit shaft 203 is being continuously revolved and crank wheel 202 has a cam-shaped face on its outside periphery on which cam roller 283 rides. Cam roller 283 is mounted on the end of cam follower arm 284, which is locked on the knife bar shaft 285. The left-hand knife bar shaft 285 is transversely mounted in the machine with its ends suitably mounted in bushings in the rear main frame plate 286 and the front main frame plate 286a. Mounted between the rear main frame plates 286 and the cam follower arm 284 is a spring 296. The knife bar shaft 285 is also mounted so as to allow for lateral movement along the length of the shaft, as indicated by the arrow in Fig. 36. Screwed into the rear end of shaft 285 is a screw 287, which is contacted by stud 288 mounted on the end of actuator arm 289. One end of stud 288 contacts screw 287 on the end of shaft 285 and the other end of stud 288 contacts a similar screw on the end of the right-hand knife bar shaft 285a. Actuator arm 289 is locked on knife actuating shaft 290, which also mounts cam follower arm 291. Roller 292 on cam follower arm 291 is in contact with the cam surface 294 of flat cam 293. Knife shaft 290 is mounted by means of brackets 295 and 295a, which are fastened to the rear main frame plate 286. This comprises the actuating mechanism for both the left-hand and right-hand ends of the machine. As can be seen, stud 288 actuates the left-hand and right-hand knife shafts 285 and 285a of the left-hand knife mechanism 16 and the right-hand knife mechanism 16a in their lateral movements. Mounted along the length of knife shaft 285 is the knife bar 297, which is locked so that it rotates with shaft 285. The knife bar 297 carries the individual knives 298–298x. Each knife is mounted in an individual groove in the face of the knife bar 297 and all the knives are held clamped down in grooves by the clamp bar 299. The knives are adjustable in length by the adjusting screws 300–300x, which extend through the knife bar 297. The knife bar 297, with the knives mounted on it, moves as a unit in accordance with the actuations of the knife actuating mechanism. The left-hand knife mechanism 16 functions in this manner: When the turret indexing unit 15 begins to index through ninety degrees toward the cutting station, turret shaft 203, which is continuously rotating, carries the high surface of the cam on crank wheel 202 around in counter-clockwise rotation and, in doing so, raises cam follower arm 284 through its cam roller 283. Cam follower arm 284, being locked on the knife shaft 285, rotates the shaft 285 and raises the knife bar 297 to a position as shown by the position of the right-hand knife bar 297a of the right-hand knife mechanism 16a. In operation of the capsule making machine, the knife mechanism 16 and 16a and their related parts would never be in the relative position shown in Fig. 35 because of the fact that the timing of the various cycles of operation is exactly the same, but it has been shown in this manner in order to illustrate more clearly the operation of the knife mechanism. The knife bar 297 remains in the raised position and allows the left-hand indexing turret unit 15 to index to the cutting station with the capsule portions held in the collets at their set length ready to be cut. When the left-hand indexing turret unit 15 has reached the cutting station position, the timing is such that the roller 283 reaches the lower point of the cam on crank wheel 202 and cam follower arm 284 rotates knife shaft 285, thus bringing knife bar 297 back down to the horizontal position indicated by knife mechanism 16 in Fig. 35. Flat cam 293 then actuates arm 289. Right-hand turret indexing shaft 52a is continuously rotating and flat cam 293 actuates arm 289 on every cycle. During the indexing movement of the indexing turret unit 15, and the raising of the knife bar 297, roller 292 of cam follower 291 is contacting the low portion of the cam face 294, but when the knife bar 297 has dropped back down to its horizontal position for the cutting operation, roller 292 of cam follower arm 291 reaches the high portion of the cam face 294 and causes knife shaft 290 to rotate in a clockwise direction, as shown in Fig. 36. Actuator arm 289 travels in the direction of the arrow and stud 288, which is in contact with screw 287, pushes knife shaft 285 laterally in the direction of the arrow. This lateral movement constitutes the actual cutting movement. The knives 298–298x travel in this lateral movement transversely across the machine, and each individual knife travels across the respective collet which is holding the respective capsule portion and effects cutting thereof as the collets rotate. The rotation of the collets will be hereinafter described. Referring now to Fig. 37, the knives are seen in the position which they assume after the knives have traveled through their lateral cutting action movement. The cutting end of knife 298l is shown in a dotted position, which is the position from which it started its lateral cutting motion and from which it traveled across its respective collet, cut its capsule portion and ended in its other illustrated position. The waste cut from the capsule portions is carried away through waste vacuum intake 301. This intake extends laterally across the machine, is positioned above the cutting ends of the knives 298–298x and is suitably connected to any suitable or conventional unit which creates a vacuum at the intake 301. The vacuum is sufficient to draw the waste cut from the capsule portion by the knife mechanism 16 and carries the waste through intake 301 for disposal.

The cutting now being completed, the roller 292 arrives at the lower portion of the cam face 294 and the actuating mechanism is returned to its starting position by the spring 296, which had been compressed during the lateral movement for cutting. This completes the operational cycle of the knife mechanism 16. It will be understood that the indexing turret unit 15 indexes once every machine cycle and indexes to the cutting station with one group of capsule portions and that the knife mechanism goes through one complete operational cycle every time the indexing turret unit 15 indexes to the cutting station. Hence, the knife mechanism travels through one complete operational cycle once every machine cycle.

Joiner mechanism

The purpose of the joiner mechanism 17 is to receive the sets of two capsule portions from the ends of the capsule-making machine wherein they are produced and, by means to be described, join the sets of two capsule portions by fitting the cap portions over the body portions to produce completed capsule assemblies which are then ejected or discharged on to the moving belt of the conveyor mechanism which will remove the finished capsules from the machine to a desired point of delivery such as a receptacle. The joiner mechanism 17 performs the final operation on the capsule portions. This final operation is performed at the time when the left-hand indexing turret unit 15 indexes ninety degrees from its cutting station 34, at which the capsule portion has just been cut to the proper length, to the left-hand indexing turret unit joining station 35, with the cut capsule portion still being held in the collets of the left-hand indexing turret unit 15 and, at the same time in similar manner, the right-hand indexing turret unit 15a indexes ninety degrees from its cutting station to its joining station with the other cut capsule portion still being held in the collets of the right-hand indexing turret unit 15a. At that instant, the respective collets are holding the capsule portions in a horizontal position in line with each other and the joiner mechanism 17 is also in line with the capsule portions, as illustrated in Fig. 42. The placement rod mechanism then ejects the capsule portions into the joiner mechanism which guides the body portion of the capsule into the cap portion, and the joiner mechanism 17 travels down to the dotted line position shown in Fig. 42, where a blast of air blows the capsule out of the parted joiner mechanism on to the belt of conveyor mechanism 18. Referring to Figs. 39, 40, 41 and 42, the joiner mechanism 17 consists of an upper carrier 302 and a lower carrier 302a, which hold upper joiner blocks 303-303x and lower joiner blocks 304-304x, respectively. The carriers 302 and 302a are positioned transversely across the machine. In the front end of the upper carrier 302 is a hole in which the front parting actuator rod 305 is mounted. Rod 305 is tight in the hole so that there is no relative movement between the upper carrier and the actuating rod 305. Similarly mounted in the hole in the rear end of the upper carrier 302 is the rear parting actuator rod 305a. Front parting actuator rod 305 extends through a hole in the lower carrier 302a and has a slit fit in that hole to allow the lower carrier to move up and down on the actuator rod 305. A collar 306 is locked on rod 305 and mounted between the collar 306 and the lower carrier 302a is a compression spring 307, which forces lower carrier 302a against the upper carrier 302. These carriers contact each other along a common line indicated by numeral 308. Mounted on the front main frame 3 is a plate 309, which has screwed into it a bolt 310 with its head 312 contacting the lower end of the front actuator rod 305. The height of the bolt 310 is adjustable by nut 311. A similar construction is found on the rear main frame 4 with respect to plate 309a, bolt 310a, bolt head 312a, collar 306a and compression spring 307a. The actuating portion of the joiner mechanism 17 consists of the front and rear lift rods 313 and 313a, respectively, which have a forced fit in holes provided for that purpose in the lower carrier 302a. Front lift rod 313 is pin-connected to front cam follower arm 314 which pivots about a fixed center 315 and is mounted on the inside face of the front main frame plate 286a (not shown). Roller 316 rides the cam surface of the joiner actuating cam 317, which is mounted on the front end of the transversely mounted right-hand indexing turret shaft 52a, which is continuously rotating, being driven from a gear train from the main machine drive, as previously described. A similar rear cam follower arm 314a, with a similar cam roller 316a contacting a similar joiner actuator cam 317a, is pin-connected to rear lift rod 313a.

The actuating linkage actuates the joiner mechanism 17 in vertical reciprocating motion, as shown in Figs. 39 and 42, from its extreme up position where it is in line with the collets of the left-hand and right-hand indexing turret units 15 and 15a to its extreme down position where it ejects the capsules on to the conveyor belt. The operation of the joiner mechanism 17 will now be described. Actuator cam 317 rotates and, as cam roller 316 approaches the lower portion of the cam, the upper and lower carriers 302 and 302a, being held in contact with each other along the common line 308 by force of the compression springs 307 and 307a on parting actuator rods 305 and 305a, rise to the dotted line position shown in Fig. 41. As can be seen from that figure, the lower end of the parting actuator rod 305a is no longer contacting the head 312a of bolt 310a because bolt 310a is fastened to the rear main frame 4 which is stationary. Fig. 42, also shows the position which the upper and lower carriers 302 and 302a have reached. It is at that point that the respective placement rod mechanism of the left-hand indexing turret unit 15 and the right-hand indexing turret unit 15a eject the capsule portions from the holding collets and into the respective sides of the joiner mechanism 17. In Fig. 42, the left-hand indexing turret unit 15 has been illustrated as holding the body portion of the capsule and the right-hand indexing turret unit 15a as holding the cap portion of the capsule. The upper joiner blocks 303-303x have a pair of concentric semi-circular surfaces each of which extends out toward the other from the ends to the center. The size of the smaller concentric semi-circular surface conforms to the outside diameter of the body portion of the capsule and the larger concentric semi-circular surface conforms to the outside diameter of the cap portion of the capsule. The meeting of the two different size concentric semi-circular surfaces results in the formation of a semi-circular shoulder in the joiner blocks. The lower joiner blocks 304-304x are constructed exactly the same as the upper joiner blocks 303-303x and, when the upper and lower carriers 302 and 302a are held together, these blocks form the two different size diameter holes, one concentric with the other and the shoulder extending completely around the block. After having been ejected from their respective collets, the body and cap portions then approach the joiner mechanism 17 under the actuation of their respective placement rod mechanisms. The timing of the placement rod mechanisms of the right-hand indexing turret unit 15a is somewhat ahead of that of the placement rod mechanism of the left-hand turret units 15. As a result of this timing arrangement, the cap portions are pushed into and held against the shoulder of the joined joiner blocks. With the cap portions held against the shoulders of the joined joiner blocks, the placement rod mechanism of the left-hand indexing turret unit 15 pushes the body portions of the capsule into the joiner mechanism and, since the cap portion is being held in its position in the joiner mechanism, the body portions are pushed into the joined joiner blocks and into the cap portions of the capsules, as illustrated in Fig. 42. The capsules are now in assembled condition and are handled as one-piece units from this point on. At the completion of the joining of the cap and body portions into one piece, the upper and lower carriers 302 and 302a start the downward stroke of their reciprocating motion under the pull of the lift rod 313 and 313a under actuation of cam 317. As the upper and lower carriers 302 and 302a travel downward, the lower ends of the parting actuating rods 305 and 305a approach the stationary heads 312 and 312a of bolts 310 and 310a. Fig. 41 illustrates the point at which the actuator rods 305 and 305a have just contacted the heads 312 and 312a and can travel downward no further because of the impedance of the heads 312 and 312a. As is clearly shown, the upper and lower carriers 302 and 302a are still held in contact with each other along line 308 but the downward stroke of the joiner mechanism 17 is not yet completed so that, as the downward travel continues, the upper carrier 302, into which the upper end of the parting actuator rods 305 and 305a were tightly fitted, stops at that point in the downward stroke of the joiner mechanism 17 when the lower ends of the parting actuator rods 305 and 305a contact the heads 312 and 312a of the bolts 310 and 310a. This pulls the lower carrier 302a away from the upper carrier 302 as the lower carrier slides down the parting actuator rods 305 and 305a and compresses springs 307 and 307a against their respective collars 306 and 306a. This pulls the lower joiner blocks 304–304x away from the upper joiner blocks 303–303x, as illustrated in Fig. 40. The joiner mechanism 17 is now in its extreme downward position, as illustrated in Fig. 40 and the dotted line position in Fig. 42. Located in line with the parted space 320 between the upper and lower carriers 302 and 302a and to the left of the joiner mechanism 17 is an air outlet 319, which extends transversely across the machine. When the joiner mechanism 17 has reached this position, there is a blast of air from the air outlet 319, in the direction of the arrow, which blows the capsules out from the parted upper and lower joiner blocks of the joiner mechanism 17 and the capsules drop on to the conveyor belt 318 of the conveyor mechanism 18. In addition to blowing the capsules from the joiner mechanism 17 to the conveyor belt 318 of the conveyor mechanism 18, the air blast serves the further important purpose that it blows clean the parted surfaces of the upper and lower carriers 302 and 302a and the inside surfaces of the upper and lower joiner blocks 303–303x and 304–304x, so that when they are brought together to receive the next batch of capsule portions to be joined there will be no interference from any waste particles of any sort and the upper and lower carriers 302 and 302a will come into perfect contact along line 308. The upward stroke of the joiner mechanism 17 now starts and, as the lower carrier 302a is raised by the lift rods 313 and 313a, the lower carrier 302a contacts upper carrier 302 on line 308 and compression springs 307 and 307a are released from their compressed position. As the joiner mechanism continues to rise, the parting actuator rods 305 and 305a break contact with the heads 312 and 312a of the bolts 310 and 310a. This again allows compression springs 307 and 307a to hold the two carriers 302 and 302a together. The joiner mechanism 17 then proceeds to its extreme upper position to receive the next group of capsule caps and body portions. This completes the operational cycle of the joiner mechanism 17. As this mechanism handles an amount of capsule portions which come from only one pin bar, it will be understood that this mechanism operates one cycle for each machine cycle.

*Conveyor mechanism*

The purpose of the conveyor mechanism is to receive the joined capsule portions which have been ejected from the joiner mechanism by the blast of air and to carry the assembled capsules on its moving conveyor belt out of the capsule-making machine to a suitable discharge point or station. Referring to Figs. 43 and 44, the construction of the conveyor mechanism 18 is as follows: Bevel gear 321, which is mounted on the front end of the left-hand turret indexing shaft 52, drives bevel gear 323, the conveyor drive shaft 322, which latter is suitably supported in bearings in the outboard bracket 324 and the conveyor drive housing 337. Suitably mounted for rotation on the end of outboard bracket 324 is the outboard idler pulley 325. The outboard conveyor bracket 324 is itself mounted on the face of the front main frame plate 286a, disposed on the outside face of the front main frame 3. Mounted on the inside face of the rear main frame 4 is a bracket 336 which holds the inboard idler pulley 335. Mounted on the conveyor drive shaft 322 are idler pulley links 328 and 328a, which mount the tightener pulley 327 on pin 331. Pin 329 on the ends of links 328 and 328a holds one end of spring 330, the other end of which is mounted on the inside face of the front main frame plate 386a. Conveyor guide bracket 333 is supported by the front support bracket 332, mounted on the inside face of the front main frame plate 286a and by the rear support bracket 332a, mounted on the inside face of the rear main frame plate 286. The operation of the conveyor mechanism 18 is as follows: The left-hand turret indexing shaft 52 is being continuously driven, as has been previously described, and drive shaft 322 is driven by the bevel gears 321 and 323. The drive shaft 322 drives pulley 325 in a counter-clockwise direction, which drives the upper horizontal portion of the continuous conveyor belt 318 in the direction of the arrow on Fig. 44. This movement of the conveyor belt 318 is continuous and the conveyor belt is held taut in its movement by the pull of spring 330, on tightener pulley 327, through links 328 and 328a. When the joiner mechanism 17 travels down to the extreme lowermost position of its reciprocating movement and separates the air blast from the air outlet 319, the joined capsules are blown out of the joiner mechanism 17 on to the conveyor belt 318. The conveyor guide bracket, which is transversely mounted across the machine is in position to guide the capsules as they are being blown out of the joiner mechanism 17 on to the conveyor belt 318. If the guide were not in such position, a strong blast of air might blow the capsules past or over the conveyor belt 318, which is prevented by the arrangement described. Fig. 44, illustrates the conveyor mechanism 18 as just having received a group of capsules from the joiner mechanism 17. That group is shown lying on the conveyor belt 318 to the left of reference line 334. The capsules lying on the conveyor belt 318, to the right of reference line 334, are from the previous group of capsules which had been ejected from the joiner mechanism 17 during the previous cycle of operation. The velocity of the conveyor belt is such that as the last capsule of the previous group has passed reference line 334, the joiner mechanism 17 has ejected the next group of capsules. This results in a continuous supply of capsules coming along conveyor belt 318, as shown in Fig. 44. The conveyor belt 318 extends out past the line of the outside face of the front main frame 3 and the capsules can be unloaded from the belt at that point in any suitable manner to complete the process of the making of the capsules in my new capsule making machine.

*Indexing turret unit*

Figure 50:
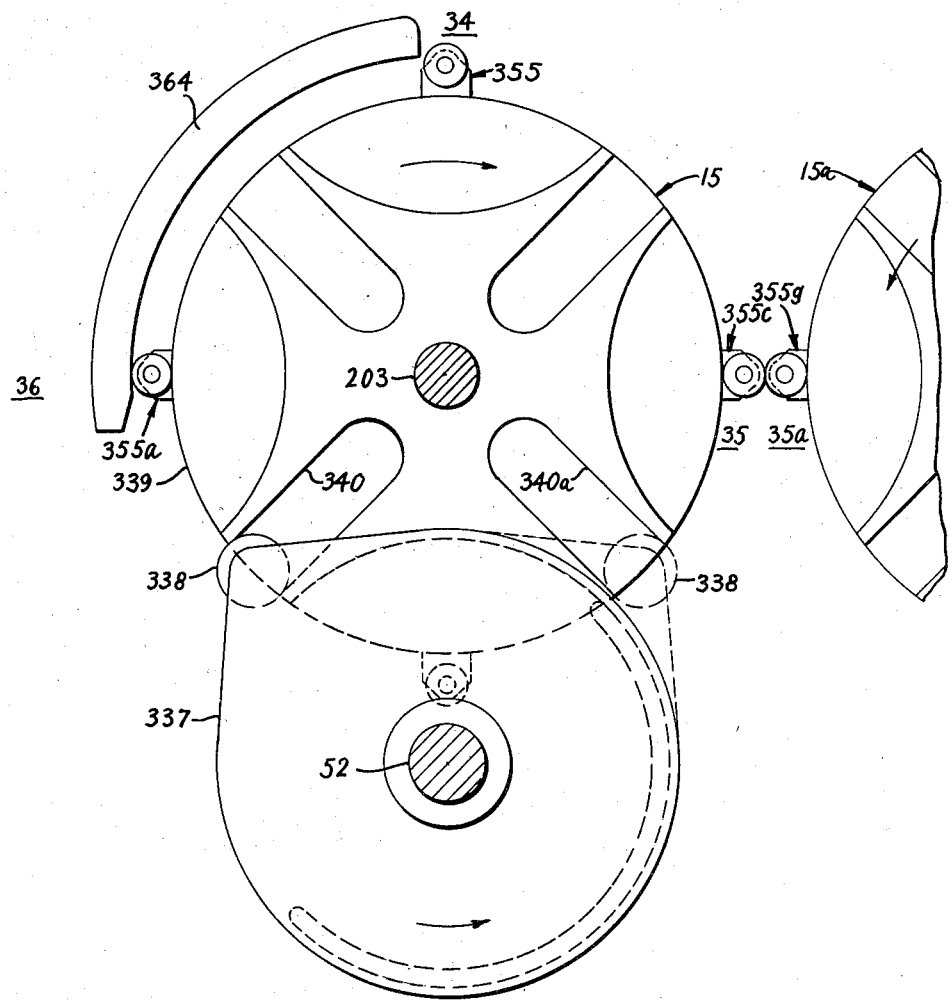
Fig. 50 is a partial front elevation of the left-hand indexing turret and a portion of the right-hand turret with the front main frame plate cut away to show the front face of the indexing turret and its Geneva star movement as it has just completed the indexing of the turret, the dotted position of the Geneva mechanism being shown in the position in which it is just starting to index the turret.

The purpose of the indexing turret unit is to carry the capsule portions from the stripping station to the cutting station and finally to the joining station. This is accomplished by the turret unit in a manner whereby a ninety degree indexing action takes place. The turret unit, having four separate but identical collet holding units located ninety degrees apart for handling the capsule portions, indexes ninety degrees and moves the collet holding unit from one station to the next. Referring to Figs. 50, 55 and 56, the construction of the left-hand indexing turret unit 15 is as follows: The left-hand turret unit shaft 203 is transversely mounted in the machine and held in bearings 341 located in bearing carrier 342, which is mounted on the inside face of the front main frame plate 286a and the bearing (not shown) in bearing carrier 343, mounted on the inside face of the rear main frame plate 286. Geneva wheel 339 is mounted on the front end of shaft 203 on bearing 334 and this wheel 339 is securely fastened to the front turret end disk 345. A similar rear turret end disk 345a is securely fastened to collet drive head 346, which is mounted on bearing 347 on the rear end of shaft 203. Transversely mounted between the inside faces of the turret end disks 345 and 345a are four collet bearing retainer bars 348, 348a, 348b and 348c. These form a rigid assembly which is able to rotate freely on shaft 203. Located on the left-hand turret indexing shaft 52 is the Geneva actuator wheel 337 on which is located roller 338 which, in conjunction with the slot 340 in Geneva wheel 339, actuates the turret unit to cause it to index ninety degrees. Securely mounted on the front end of shaft 52 is drive gear 349, which engages gear 350 on turret shaft 203, and drives the turret shaft 203. Securely fastened to rotate with said shaft 203 is bevel gear 351, which is always in engagement with the collet bevel gears 352, 352a, 352b and 352c. The turret unit functions in the following manner: Shaft 52 is being continuously driven from the gear train from the main drive, as previously described, and shaft 52 makes one complete revolution for every machine cycle so that, in consequence thereof, the turret unit 15 indexes ninety degrees on every machine cycle. Referring particularly to Fig. 50, as shaft 52 rotates in the indicated direction, roller 338 on wheel 337 engages slot 340 at the dotted line position shown for roller 338 and rotates wheel 339 until the roller 338 reaches the point shown, whereupon the roller leaves slot 40 at that point and the indexing movement of ninety degrees of the turret unit 15 has been completed. Referring now to Fig. 51, indexing locking arm 353 is mounted on knife shaft 285 of knife mechanism 16. Locking arm 353 is actuated with the knife mechanism and the timing of the actuation is such that when the turret unit 15 is ready to index through ninety degrees the knife mechanism 16 lifts to allow the turret unit 15 to move. Hence, the locking arm 353, which holds the turret unit 15 in a non-rotating locked position by virtue of the end of the arm being in contact with notch 354 in drive head 346, lifts out of the locking notch 354 when the knife mechanism 16 lifts and allows the turret unit 15 to index. The knife mechanism 16 is then lowered to its original position for cutting and arm 353 again falls into notch 354 to lock the turret unit 15 in non-rotating position.

*Collet holding units*

Four collet holding units are provided in the turret indexing unit 15, the purpose of each of which is to receive the capsule portions at the stripping station and hold those capsule portions as they are carried to the cutting station to be cut to their proper length. As the collet holding unit is traveling from the stripping station to the cutting station, the collets are automatically opened to allow the placement mechanism to set the capsules to the proper length. The holding collets then close and securely hold the capsule portions as the capsule portions arrive at the cutting station. At the time that the knife mechanism goes through its cutting operation, the collets holding the capsule portions begin to rotate and are actuated in this rotating movement by the collet drive mechanism, which will later be described. During this rotating motion of the collet, the collets are closed and still hold the capsule portions securely. At the conclusion of the cutting motion of the knife mechanism, the rotating motion of the collets ceases and the collet holding unit indexes to the joiner station. When the collet holding unit arrives at the joiner station, the collets are opened and the joining rod mechanism is actuated to push the capsule portions out of the collets into the joiner mechanism. The collet holding units contain capsule portions from the point of receiving them at the stripping station to the point of the joining station where the capsule portions are pushed out of the collets. The collet holding units travel from the joiner station through a blank station and back to the stripping station with empty collets before the collets receive their next batch of capsule portions, when they again arrive at the stripping station. Referring now to Figs. 50, 53, 54, 55 and 56, the collet holding units 355, 355a, 355b and 355c are constructed in the following manner: The collet holding unit 355 will be described in detail, it being understood that the other collet holding units are identical in construction. Collet bearing retainer bar 348 is securely fastened to the turret end disks 345 and 345a. Bar 348, located transversely across the machine, is formed to carry twenty-five bearings 356–356x, in which the lower end of the capsule collets 357–357x rest. Collet opening actuator slide 358 rides in a slot on the outside face of the front turret end disk 345. Mounted on the end of slide 358 is a roller 359. A similar slide 358a rides in a slot in the rear end disk 345a. Securely fastened to these slides 358 and 358a, by means of locked pins 360 and 360a, is the collet opening bar 361. This construction causes bar 361 to travel with slides 358 and 358a. Collet closing bushings 362–362x are held against the notch in bar 361 by collet springs 363–363x. Mounted on the inside face of the front main frame 3 is collet opening track 364 and a similar track 364a is mounted on the inside face of the rear main frame 4. The collet holding unit 355 functions in the following manner: Collet holding unit 355 will be followed in its operation from the stripping station 36 to the joining station 35 and back again to stripping station 36. As the turret unit 15 indexes and collet holding unit 355 approaches stripping station 36, roller 359 contacts the inside face of track 364 and roller 359 is forced towards the center of the turret unit 15. This causes slides 358 and 358a to travel towards the center of turret unit 15. Bar 361, through bushings 362–362x, compresses springs 363–363x. Collets 357–357x, being securely held in their roller bearings 356–356x, remain in their original position. Inasmuch as the bushings 362–362x have moved towards the center of the turrent unit, the tapered surfaces of collets of 357–357x and bushings 362–362x are no longer in contact. This allows the collets to open to a position at the stripping station 36, as shown in Fig. 53, which permits the bar transfer mechanism 32 to thrust the pin bar with the capsule portions on it through the stripping mechanism 14 and into the collets so that the collets will retain the capsule portions upon the completion of the stripping operation. Rollers 359 and 359a remain in contact with tracks 364 and 364a, thus allowing the collets to remain open during the travel of the collet holding unit 355 from the stripping station 36 to the cutting station 34. During the period when the collets are held open, the placement rod mechanism positions the capsule portions in the collets at their proper lengths and approximately five degrees before the complete ninety degree indexing of the turret unit 15 is completed, rollers 359 and 359a leave tracks 364 and 364a and the collets close and hold the capsule portions at their proper lengths for cutting. When the rollers 359 and 359a leave tracks 364 and 364a, the compressed springs 363–363x return to their normal position and cause bushings 362–362x and bar 361 to travel away from the center of turret unit 15 and then bushings 362–362x resume contact on the tapered surfaces of the collets 357–357x and the collets close on the capsule portions. The previously described cutting operation then takes place with collets 357–357x closed on the capsule portions and, upon completion of the cutting operation, the turret unit 15 indexes ninety degrees to bring the collet holding unit 355 to the joining station 35. Upon reaching the joining station 35, roller 359 on slide 358 contacts an identical roller of a collet holding unit of the right-hand turret unit 15a, which has also just indexed a collet holding unit to its joining station 35a. This brings the rollers to the positions illustrated in Fig. 50 at joining stations 35 and 35a. The contacting of the rollers causes the slides 358 and 358a of collet holding unit 355 to move towards the center of the turret unit 15 and again, by the same actuation motion previously described, collets 357–357x are opened at the joining station 35. The joining rod mechanism at this time is actuated to push the capsule portions out of the collets into the joining mechanism 17. At the conclusion of the ejection of the capsule portions from the collets, the turret unit 15 indexes, and collet holding unit 355 travels to a blank station where it reamins idle during the one machine cycle during which it is at this blank station. At the next indexing of the turret unit 15, this collet holding unit 355 travels from the blank station to the stripping station 36 and is ready to go through its turret cycle again. This turret cycle consists of four machine cycles.

The complete turret cycle for one collet holding unit, such as collet holding unit 355, involves four ninety degree indexing movements of the turret unit 15. One indexing movement takes place during one machine cycle so that collet holding unit 355 starts at stripping station 36 and after four complete machine cycles is back at stripping station 36. All the other collet holding units 355a, 355b and 355c to 355g follow an identical cycle and are identically constructed and actuated during the turret cycle.

*Collet drive mechanism*

The purpose of the collect drive mechanisms, of which there are four in the turret indexing unit 15, is to drive the collets of their respective collet holding units in a rotating motion at the cutting station to allow the capsule portions to be cut by the knife mechanism. The cutting motion of the knife mechanism is a horizontal motion across the face of the open end of the capsule portion and the rotating motion supplied to the holding collets by the collet drive mechanism causes the capsule portions to rotate as the cutting knives approach the capsule portions and travel across the face of the end of the capsule portions. This provides a cutting operation similar to that of a screw machine lathe. Referring now to Figs. 51, 52, 55 and 56, there are four identical outlet drive mechanisms in the turret unit 15. Each collet drive mechanism actuates a collet holding unit. Collet drive mechanism 365 actuates collet holding unit 355 and collet drive mechanism 365a actuates collet holding unit 355a; similarly, collet drive mechanism 365b actuates collet holding unit 355b and collet driving mechanism 365c actuates collet holding unit 355c. The construction of the collet drive mechanism 365 will be described in detail, it being understood that the other collet drive mechanisms 365a, 365b and 365c are identical in construction. Collet drive spindle 366 is mounted in bearing 368, which is retained in collet drive head 346 by bearing retainer 370. Mounted on the lower end of spindle 366 is bevel gear 352, which is engaged with constantly rotating bevel gear 351. Clutch 372 is mounted on the shank of the spindle 366 and is itself mounted in bearing 367, which is retained in collet drive head 346 by bearing retainer 369. Spring 379, mounted above the clutch 372 on the shank of spindle 366 and retained on spindle 366 by retainer 380, forces the face of clutch 372 to engage with clutch face 371 of spindle 366. Sprocket wheel 373 is tightly fitted on clutch 372 so that it will rotate as one unit. Clutch fork 374 is engaged about the formed shoulder of the sprocket wheel 373 and contacts its face 381. Clutch fork 374 is securely fastened to collet clutch slide 375, which slides in a slot in guide 376, mounted on the bearing retainer 370. Mounted on the lower end of slide 375 is a roller 377, which contacts the cam surface 378 of bearing carrier 343. Mounted on the lower shanks of the capsule collets 357-357x of the collet holding unit 355 are sprocket wheels 382-382x, which are tightly fitted on the shank of collets 357-357x and drive sprocket wheel 375 and sprocket wheels 382-382x are engaged with each other by means of sprocket chain 383. The collet drive mechanism 365 functions in the following manner: Cam surface 378 of bearing carrier 343 is shaped to have a horizontal flat portion across the top of its surface, as shown in Fig. 51. Bearing carrier 343 is rigidly mounted on rear main frame plate 286 and, as the turret unit 15 indexes ninety degrees on every machine cycle, each roller of the four collet drive units reaches this flat face on cam surface 378 as that collet drive unit and its respective collet holding unit reach the cutting station 34. During the rest of the travel of the rollers through their turret cycle, the rollers contact the high face of cam surface 378. The only time that any of the collet drive mechanisms need to function is at the cutting station 34, where the collets must rotate. This is accomplished by controlling a clutch which is activated and de-activated by the cam surface 378. The function of the collet drive mechanism 365 will now be described as that mechanism travels through a complete turret cycle of four indexing movements of turret unit 15. When the roller is in contact with the high face of the cam surface 378, slide 375, through clutch fork 374 contacting shoulder 381 on sprocket wheel 373, holds clutch 372 out of contact with the driving clutch face 371 of spindle 366, and clutch 372 rides up the shank of spindle 366 and holds spring 379 in a compressed position. This disengagement of the clutch allows spindle 366 to rotate continuously but, because of the disengagement of the clutch faces, drive sprocket wheel 373 does not rotate and does not drive the sprocket wheels 382-382x on the capsule collets. Collet drive mechanism 365b, in Fig. 56, illustrates the position which the collet drive mechanism 365 has just been described to have, when its roller 377 is in contact with the high face of cam surface 378. As the turret unit 15 indexes in the direction indicated in Fig. 51 and as collet drive mechanism 365 approaches the cutting station 34 with its respective collet holding unit 355 holding capsule portions in its holding collets 357-357x ready to be cut, roller 377 reaches the low flat face of cam surface 378 and allows spring 379, which had been held in a compressed position, to push clutch 372 down the shank of spindle 366 and the clutch 372 contacts clutch face 371 on spindle 366. Clutch face 371, being the driving face, then drives clutch 372 on which drive sprocket wheel 373 is mounted and drive sprocket wheel 373, in turn, drives collets 357–357x through their respective sprocket wheels 382-382x which are all engaged together by means of sprocket chain 383. At the completion of the cutting operation, the turret unit 15 indexes and roller 377 of collet drive mechanism 365 reaches the high face of the cam surface 378. This again disengages the clutch. Through the rest of the turret cycle, roller 377 is always on the high face of cam surface 378 and hence the clutch remains disengaged until the collet drive mechanism 365 again returns to the cutting station 34. This return of the collet drive mechanism 365 to the cutting station 34 completes the turret cycle for the collet drive mechanism.

*Placement and joining rod mechanism*

The placement and joining rod mechanism fulfills two purposes. The first of these is to position the capsule portions in the holding collets on their way to the cutting station so that the capsule portions will be cut to their proper lengths. This is known as the placement rod operation. The second purpose of the placement and joining rod mechanism is to eject the cut capsule portions from their holding collets when they reach the joining station. This is known as the joining rod operation. The rods which contact the capsule for the placement rod operation and the rods which contact the capsule for the joining rod operation are in all cases the same set of rods but there is a separate placement rod actuator mechanism which actuates the rods in the placement rod operation, and there is a separate joining rod actuator mechanism which actuates the rods in the joining rod operation. Also, the joining rod actuator mechanism used on the end of that machine which makes the cap portions of the capsule is somewhat different from that of the joining rod actuator mechanism used in that end of the machine which makes the body portion of the capsule. In the illustrated machine, the right-hand end of the machine produces the cap portions of the capsules and the left-hand end thereof produces the body portions of the capsules. The reason that the joining rod actuator mechanism for the cap is different from that of the joining rod actuator mechanism for the body is that there must be a difference in timing of the arrival of the cap and body portions in the joining mechanism because in the joining operation of the two portions of the capsules the body portions must be pushed into the cap portions of the capsule, the caps must arrive in the joining mechanism before the bodies so that, when the bodies arrive, they can be pushed directly into the caps. The difference in the joining rod actuator mechanism takes care of the difference in timing. That difference in the joining rod actuator mechanism is the only difference between the right-hand end of the machine and the left-hand end of the machine. Referring now to Figs. 51, 52, 53, 54, 55 and 56, there are two sets of rods in the left-hand turret indexing unit 15. Each set works in conjunction with a pair of collet holding units which are located opposite one another in the turret unit 15. The construction of the set of rods which works with the collet holding units 355 and 355b consists of a pair of rack slides, front slide 384 and rear slide 384a, which are guided in slots on the inside faces of the front and rear turret end disks 345 and 345a, respectively. Transversely mounted between the front and rear slides 384 and 384a are rod carrier bars 385 and 385b in which rods 386–386x are mounted in rod carrier bar 385, and rods 387–387x are mounted in rod carrier bar 385b. The rods are mounted by retainer washers which hold them in position in these rod carrier bars. The other ends of the bars fits through their respective openings in their respective collets and it is through the back end of the collets that the rods move back and forth to position and to eject the capsule portions. The other sets of rods which work with the collet holding units 355a and 355c are identically constructed.

The placement rod actuator mechanism is constructed of placement rod actuator shafts 388, 388a, 388b and 388c mounted through the turret end disks 345 and 345a and collet drive head 346 in such manner that they can freely rotate. Mounted past the outside face of collet drive head 346 on shafts 388, 388a, 388b and 388c are placement rod actuator arms 389, 389a, 389b and 389c, respectively, with rollers on each of the arms. The arms are tightly fitted on the shafts so as to rotate the shaft upon actuation of the arms. Mounted on shafts 388, 388a, 388b and 388c adjacent to the inside face of the front turret end disk 345 are gears 390, 390a, 390b and 390c, which are mounted to rotate with the shafts 388–388c, and gears 390 and 390b are engaged with the gear teeth of the front rack slide 384; similar gears mounted adjacent to the inside face of the rear turret end disk 345a are similarly engaged with the rear rack slide 384a. Placement rod actuator cam 391 is mounted on the inside face of the rear main frame plate 286 against a vertical notch 392 in place 286 so that cam 391 can be locked in a variable vertical position depending upon the adjustment necessary for the different lengths of capsules being made. Referring particularly to Fig. 54, the placement rod holding mechanism which works with the rods of the collet holding units 355 and 355b consists of blocks 393, 393a, 393b and 393c, which are firmly mounted near the front end of bars 348 and 348b, respectively. Bars 394 and 394a are spring-loaded against the opposite faces of the rod carrier bars 385 and 385b by springs mounted in blocks 393–393c. A similar holding mechanism is mounted near the rear of the bars 348 and 348b (not shown). There is a similar set of placement rod holding mechanisms which work in conjunction with the rods of the collet holding units 355a and 355c, which also are not shown. Referring now to Figs. 60 and 61, the cap joining rod actuator mechanism for the cap portion of the capsule is located on the right-hand end of the machine. This mechanism consists of roller 395 and crank wheel 202a of the right-hand bar transfer mechanism 32a.

Roller 395 rides in slot 396 of link 397 which is also the actuating link for the right-hand bar transfer mechanism 32a. One end of link 397 rides in the guide block 398 and the other end is mounted on the bar transfer indexing shaft 205a. Link rod 399 is mounted on shaft 205a and carries bracket 405 on its shank in such manner that bracket 405 is loosely fitted on the link rod 399 and is retained only by nut 400. Bracket 407 is attached to actuator slide 402 through slot 407 in the rear main frame 4 and slide 402 is appropriately guided in its reciprocating movement in an open slot on the inside face of the rear main frame 4. Face 403 of slide 402 is in line with the rear rack slide 348a in order to contact end 407a of rack slide 384a. The body joining rod actuator mechanism, located in the left-hand end of the machine, is constructed in exactly the same manner, except that in place of the link 397, shown in Fig. 61, link 204, shown in Fig. 26, is used instead. Link 204 is stud-mounted in crank wheel 202 by means of a stud and has a crank motion, whereas link 397, shown in Fig. 61, has a slot 396 which carries the roller 395 mounted on crank wheel 202, and link 397 is guided in the guide block 398. This gives link 397 a horizontal reciprocating motion. Use of the different links give a difference in the timing of the actuation of the joining rod operation for the different ends of the machine and this will be later described more fully. There is also a pull-out mechanism, shown in Figs. 53 and 54. The purpose of the pull-out mechanism is to pull the rods out of the joining mechanism 17 when a very short capsule is being made and the timing of the start of the descent of the joining mechanism 17 necessitates that the rod be pulled out immediately. This is accomplished by cam face 408 mounted on shaft 203, shown in Figs. 53 and 54, and cam face 408a, which is not shown, is mounted on the other end of shaft 203. These cam faces contact the ends of each end rod of the set of rods which are opposite those rods which are in the joining mechanism 17 and, during the counter-clockwise rotation of shaft 203, these cam faces force the rods out of the joining mechanism 17. The function of the placement and joining rod mechanism will be described at the same time and in conjunction with the placement rod holding mechanism and the pull-out mechanism. The placement rod operation and the joining rod operation will also be described at the same time because, during one turret cycle of four indexing movements of the turret unit 15, equivalent to four machine cycles, one group of rods 386–386x which works with a particular collet holding unit 355 is actuated by the placement rod actuator mechanism for one placement rod operation during the first indexing movement of the turret unit 15 of the turret cycle, and then that same group of rods 386–386x is actuated by the joining rod actuator mechanism for the joining rod operation at the end of the second indexing movement of the turret cycle. During the third and fourth indexing movements of the turret cycle of the turret unit 15, that group of rods 386–386x does not function any further, but the group of rods mounted directly opposite the first-mentioned group, that is, group 387–387x, goes through a placement operation during the third indexing movement of the turret unit 15 and a joining rod operation at the end of the fourth indexing movement of the turret cycle of the turret unit 15. The starting point of the turret cycle will be taken at the point at which the bar transfer mechanism 32 has thrust the pin bar through the stripping mechanism 14 and the body portions of the capsules have been placed in the open collets of the collet holding unit 355, while collet holding unit 355 is shown in the position of the collet holding unit 355a of Fig. 54, that being the stripping station 36. At that time, the rods 386–386x are in the positions of the rods 309–309x of Fig. 54. As the bar transfer mechanism 32 begins to withdraw from the stripping mechanism 14, the turret unit 15 begins its ninety degree indexing movement in the indicated direction and the placement actuator arm 389 starts from the position of arm 389a, shown in Fig. 52, and, as the turret unit 15 indexes, the center of the placement rod actuator shaft 388 follows path 409 from the point at which shaft 388a is shown in Fig. 52 to the position of shaft 388 shown in Fig. 51. During the travel of the arm 388, the roller thereon reaches the dotted line position 410, shown in Fig. 52, where cam 391 begins to force shaft 388 to rotate in a clockwise direction by forcing the placement arm actuator 389 down to the position shown in Fig. 51. The clockwise rotation of shaft 388 turns gear 390 which, being geared to rack slide 384, causes the front slide 384 and the rear slide 384a to travel in a radial direction away from the center of turret shaft 293. The rod carrier bars 385 and 385b, being mounted on the rack slides 384 and 384a, are also carried along in the same direction. As a consequence, rods 386–386x are moved from the position of rods 409–409x, shown in Fig. 54, to the position of rods 386–386x, shown in Fig. 53. The ends of the rods 386–386x contact the closed ends of the body portions of the capsules which are being held in the holding collets of holding collet unit 355 through the back end of the collet, and the rods push the body to a particular position in the collet so that it will be cut at the proper length when it reaches the cutting station 34. Approximately five degrees before the turret unit 15 completes its first ninety degree indexing movement of the turret cycle, the collets opening, actuator roller 359 leaves track 364a and thus causes the holding collets of the collet holding unit 355 to close firmly about the bodies and hold them in the position in which they have been positioned by rods 386–386x. At this time, the placement actuator rod arm 389 is in the dotted line position shown in Fig. 51 in contact with cam 391. The cam 391 is set at such a point that, when the placement actuator arm 389 reaches that point, the bodies will have been placed in the correct position. There is no further rotation of shaft 388 after that point is reached because the holding collets have now been closed and firmly hold the bodies in the placed position. The dotted line position is one in which the radial line from the center of shaft 293 is perpendicular to the angular cam face of cam 391 at the point of contact of the roller on arm 389. Therefore, the remainder of the indexing movement of turret unit 15, which carries the center of shaft 388 concentrically about shaft 293 will carry the center of shaft 388 away from cam 391 and hence there will be no further contact of the roller on the cam 391 from that point to the end of the indexing movement. This prevents any danger of the rods pushing through the closed ends of the capsule portions after the holding collets have closed and held the capsule portions firmly. When the roller of arm 388 has left the contact of cam 391 and the turret unit 15 goes on to complete its indexing movement, slide racks 384 and 384a are in a vertical position, as shown in Fig. 53, at the cutting station 34, and the rods 386–386x are also all in a vertical position. The holding mechanism then is the only element which holds these rods 386–386x in the position to which they have been actuated because, otherwise, the weight of the parts would cause them to drop down. But, as shown in Fig. 54, bars 394 and 394a, through frictional contact on the side of rod carrier bars 385 and 385b and a similar pair of bars on the far side of the carrier bars 394 and 394a, hold rod carrier bars 394 and 394a in their position and only the placement rod actuating mechanism or the joining rod actuating mechanism will cause them to change their position. During the second indexing movement of the turret cycle of turret unit 15, the collet holding unit 355 travels from the cutting station 34 to the joining station 35 with the cut capsule portions held in the holding collets and rods 386–386x stationary in their longitudinal position through the indexing movement but, upon the completion of the indexing movement, the joining rod actuating mechanism begins its motion. Referring now to Figs. 60 and 61, the cap joining actuating mechanism will be described: This is located in the right-hand end of the machine and actuates the slide racks 407 and 407a of the right-hand turret indexing unit 15a. Link 397 is in position shown in Fig. 61 when the joining rod actuating mechanism begins its motion. Crank wheel 202a begins its clockwise rotation and roller 395, in slot 396, rides up slot 396 and causes link 397 to travel to the position shown in Fig. 60. When roller 395 reaches the dotted line position shown in Fig. 60, link 397 has reached its maximum forward position and, because of the shape of slot 396, the link 397 has reached its most forward position approximately thirty-five degrees before the crank wheel 202a has rotated 180 degrees. As link 397 moves towards its forward position, bracket 401 remains in its position, as shown in Fig. 61, and link rod 399 travels forward until the nut 400 contacts the back face of bracket 401 and then carries bracket 401 forward, which, in turn, moves slide 402 forward, towards the center of the machine. Face 403 on slide 402 contacts the end of rack slide 407a of the right-hand indexing turret unit 15a and pushes slide 407a towards the center of the machine. The respective rods mounted on the rod carrier bars of the front and rear rack slides 407 and 407a are actuated to perform the joining rod operation on the cap portions of the capsule. This joining operation will bring the cap portions into the joiner mechanism 17 from the right-hand turret unit 15a, as shown in Fig. 53, before the body portions of the capsules have entered the joiner mechanism 17 from the left-hand turret unit 15. The actuation of the joining rod operation for the body portions of the capsule which takes place in the left-hand end of the machine is exactly the same, except that as link 204, shown in Fig. 26, is used, the maximum forward position of the joining rod actuator mechanism will be reached at the time that the 180 degree rotation of the crank wheel is completed from the crank wheel starting position. There are identical parts on the body joining rod actuating mechanisms, the same as link rod 399, bracket 401, nut 400 and slide 402, which operate in a like manner to cause the left-hand slide 411, shown in Figs. 53 and 54, to contact the rack slide 384 when it is in the stripping station position with face 472. The movement of the slide 411 to its maximum forward position will carry rack slide 384 and rods 386–386x to the position of the rods shown in Fig. 54 at the joining station 35 and this movement of the rods is completed at the moment that the crank wheel 202, in Fig. 26, has reached its dotted line position. This movement of the rod has accomplished the ejection of the body portions of the capsules from their respective holding collets of holding collet unit 355 at the joining station 35 and also pushes the body portions into the joining mechanism 17, where the cap portions, having arrived approximately 35 degrees before, are already in their position in the joining blocks and hence the body portions are pushed into the joiner mechanism and through into the cap portions of the capsule. This assembles the two portions of the capsules into one piece and completes the joining rod operation. At this time, the turret unit 15 is ready to start its third ninety degree indexing movement of its turret cycle but in certain cases where the capsule portions being made are very short the maximum forward position of the joining rod actuating mechanism will carry the rods in the joining rod operation to a forward position which will cause the ends of the rods to enter into the joiner mechanism 17 and, as the joiner mechanism 17 must begin its downward reciprocating movement immediately, the pull-out mechanism consists of cam faces which contact the ends of rods 386-386x and push the whole rod mechanism out away from the joining mechanism 17. Nut 400 on link rod 399 is the adjustable element which will adjust the maximum forward position of the joining rod actuator mechanism properly for the length of capsule being made at that time. The pull-out mechanism, having pushed the whole rod mechanism out away from the joining mechanism 17, allows joining mechanism 17 to start on its downward reciprocating movement without hindrance and also allows the turret unit 15 to start its third ninety degree indexing movement of the turret cycle. During this third and fourth indexing movement of the turret unit 15, rods 386-386x do not function any more in any placement rod operations or any joining rod operations but they are tied up with the group of rods 387-387x through their being attached to the same pair of rack slides 384 and 384a and rods 387-387x, being at the stripping station 36 at the start of the third indexing movement of the turret cycle, start through a placement rod operation identical with that of the previously described placement rod operation which rods 386-386x have gone through. When rods 387-387x are actuated to position their respective capsule portions in their respective capsule portions in their respective collet holding units, those rods move away from the center of shaft 203 but, since rods 386-386x are integrally tied on the same rack slides 384 and 384a, these rods are moved back towards the center of shaft 203 and that movement, through gear 390, moves the placement rod actuator arm 389. Then upon the completion of the placement rod operation and the subsequent fourth ninety degree indexing movement of the turret cycle, the joining rod operation by rods 387-387x takes place. This causes the placement rod actuator arm 389 to move from the position of arm 389a shown in Fig. 51, to the position shown for arm 389a in Fig. 52. This puts actuator arm 389 in a position so that, at the start of the first indexing movement of the next turret cycle, placement rod actuator arm 389 is in the correct starting position for the next placement rod actuating movement. This completes the description of one complete turret cycle and the actuating movements and operations of the placement and joining rod mechanism. The placement and joining rod mechanism constitutes that element in the turret unit 15 which controls the capsule portions from the point in the process of the stripping portions at stripping station 36 to the other point in the process at which the capsule portions are ejected into the joining mechanism 17 where these capsule portions are finally joined and blown out of the joiner mechanism on to the conveyor mechanism 18 and thence carried from the machine.

It is to be understood that the foregoing is illustrative and not restrictive and that modifications thereof can be made without departing from the invention as defined by the appended claims. While the embodiment of the invention as above described, and as illustrated in the drawings, represents the best mode of carrying out the invention of which I am now aware, nevertheless it will be clear to those skilled in this art that I am not limited to the constructional details set forth as various equivalent elements and structural features can be employed while still retaining the advantages and benefits of the invention which, for the first time, has made it possible to carry out the production of hard-shell gelatine capsules in a comparatively simple and inexpensive machine occupying little floor space, as compared with prior machines, not only without sacrificing accuracy and speed of production but actually markedly increasing both accuracy and speed of production, thus accomplishing the objects and advantages hereinbefore stated.

The terms "gelatine" and "hard-shell gelatine capsules" as employed herein include not only conventional gelatine capsules and the gelatine solutions from which they are made but other gelatinous materials suitable for the manufacture of capsules, such as methyl cellulose and pectin.

I claim:

1. In a machine for making hard gelatin capsules wherein a succession of pin bars, each provided with a group of pins, is adapted to be moved into and out of dipping position and then through a drying kiln to a stripping station, an indexing turret unit mechanism having four separate identical collet holding units spaced 90° apart, openable, closeable and rotatable collets in said collet holding units and means for opening, closing and rotating said collets in the required sequence for processing capsule portions therein stripped from said pins at said stripping stations, and means for turning the indexing turret unit mechanism through successive 90° angles and cutting said capsule portions to length and joining them with interfitting capsule portions simultaneously fabricated by said machine during indexing movements.

2. In a machine for making hard gelatin capsules wherein a succession of pin bars, each provided with a group of pins, is adapted to be moved into and out of dipping position and then through a drying kiln to a stripping station, an indexing turret unit mechanism having four separate identical collet holding units spaced 90° apart, openable and closeable collets in said collet holding units and means for introducing capsule portions into said collets to subject them to finishing operations and for ejecting them therefrom, and means for turning the indexing turret unit mechanism through successive 90° angles and cutting said capsule portions to length and joining them with interfitting capsule portions simultaneously fabricated by said machine during indexing movements.

3. The construction defined by claim 2 in which means is provided for opening and closing said collets in synchronism with turret unit mechanism indexing movements.

4. The construction defined by claim 2 in which means is provided for adjusting the position of each capsule portion and for cutting it to required length.

5. The construction defined by claim 2 in which split bushings are provided each having two concentric portions for the reception of capsule portions to be joined and said ejecting means advancing such capsule portions into said bushings with the capsule cap portion slightly ahead of the capsule body portion to be joined therewith.

6. The construction defined by claim 2 in which split bushings are provided each having two concentric portions for the reception of capsule portions to be joined and said ejecting means advancing such capsule portions into said bushings with the capsule cap portion slightly ahead of the capsule body portion to be joined therewith and means for lowering such bushings into proximity with a conveyor for removal of joined capsules.

7. The construction defined by claim 2 in which split bushings are provided each having two concentric portions for the reception of capsule portions to be joined and said ejecting means advancing such capsule portions into said bushings with the capsule cap portion slightly ahead of the capsule body portion to be joined therewith and means for slightly separating said bushings and for subjecting the capsule portions therein to pneumatic cleaning.

References Cited in the file of this patent
UNITED STATES PATENTS

| | | |
|---|---|---|
| 592,967 | Freeman | Nov. 2, 1897 |
| 961,936 | Colton et al. | June 21, 1910 |
| 1,076,459 | Scott | Oct. 21, 1913 |
| 1,478,866 | Bausman | Dec. 25, 1923 |
| 1,770,102 | Edmunds | July 8, 1930 |
| 1,787,777 | Colton | Jan. 6, 1931 |
| 1,978,829 | Wilkie | Oct. 30, 1934 |
| 2,193,750 | Welker | Mar. 12, 1940 |
| 2,575,789 | Bogin | Nov. 20, 1951 |